US012092800B2

(12) United States Patent
Sisto et al.

(10) Patent No.: US 12,092,800 B2
(45) Date of Patent: Sep. 17, 2024

(54) OPTO-MECHANICS OF PANORAMIC CAPTURE DEVICES WITH ABUTTING CAMERAS

(71) Applicant: Circle Optics, Inc., Rochester, NY (US)

(72) Inventors: Eugene Sisto, Rochester, NY (US); Andrew F. Kurtz, Macedon, NY (US); Allen Krisiloff, Rochester, NY (US); Thomas Bidwell, Bergen, NY (US); John Bowron, Burlington (CA); Zakariya Niazi, Rochester, NY (US); Robert Stanchus, Wolcott, NY (US); James Mazzarella, Fairport, NY (US); Robert Baldino, Spencerport, NY (US); Deanan DaSilva, Playa del Rey, CA (US); Jose Manuel Sasian-Alvarado, Tucson, AZ (US)

(73) Assignee: Circle Optics, Inc., Rochester, NY (US)

( * ) Notice: Subject to any disclaimer, the term of this patent is extended or adjusted under 35 U.S.C. 154(b) by 183 days.

(21) Appl. No.: 17/622,393

(22) PCT Filed: Jun. 23, 2020

(86) PCT No.: PCT/US2020/039197
§ 371 (c)(1),
(2) Date: Dec. 23, 2021

(87) PCT Pub. No.: WO2020/263865
PCT Pub. Date: Dec. 30, 2020

(65) Prior Publication Data
US 2022/0357645 A1    Nov. 10, 2022

Related U.S. Application Data

(60) Provisional application No. 62/972,532, filed on Feb. 10, 2020, provisional application No. 62/952,973, (Continued)

(51) Int. Cl.
*G02B 13/06* (2006.01)
*G02B 7/02* (2021.01)
(Continued)

(52) U.S. Cl.
CPC ............ *G02B 13/06* (2013.01); *G02B 7/021* (2013.01); *G02B 13/18* (2013.01); (Continued)

(58) Field of Classification Search
None
See application file for complete search history.

(56) References Cited

U.S. PATENT DOCUMENTS 3,524,697 A    8/1970  Isshiki et al.
4,930,864 A    6/1990  Kuster et al.
(Continued)

FOREIGN PATENT DOCUMENTS

DE    202017104934 U1    12/2017
DE    102017011352 A1    6/2019
(Continued)

OTHER PUBLICATIONS

Japanese Office Action dated Dec. 5, 2023 for Japanese Application No. 2021-577338, a foreign counterpart to U.S. Appl. No. 17/622,450, 19 pages.
(Continued)

*Primary Examiner* — Paul M Berardesca
(74) *Attorney, Agent, or Firm* — Lee & Hayes, P.C.

(57) ABSTRACT

A low parallax imaging device includes a plurality of imaging lens elements arranged to capture adjacent fields of
(Continued)

US 12,092,800 B2
Page 2 view. In some examples, adjacent imaging lens elements may contact at datum features to maintain a desired spacing. The spacing may allow for partial overlapping of low-parallax volumes associated with the respective imaging lens elements.

20 Claims, 29 Drawing Sheets

Related U.S. Application Data filed on Dec. 23, 2019, provisional application No. 62/952,983, filed on Dec. 23, 2019, provisional application No. 62/865,741, filed on Jun. 24, 2019.

(51) Int. Cl.
| | |
|---|---|
| *G02B 13/18* | (2006.01) |
| *G02B 17/08* | (2006.01) |
| *G03B 37/04* | (2021.01) |
| *H04N 23/55* | (2023.01) |
| *H04N 23/698* | (2023.01) |
| *H04N 23/90* | (2023.01) |

(52) U.S. Cl.
CPC ......... *G02B 17/0856* (2013.01); *G03B 37/04* (2013.01); *H04N 23/55* (2023.01); *H04N 23/698* (2023.01); *H04N 23/90* (2023.01)

(56) References Cited

U.S. PATENT DOCUMENTS

| | | | |
|---|---|---|---|
| 5,023,725 | A | 6/1991 | McCutchen |
| 5,555,431 | A | 9/1996 | Kim |
| 5,900,988 | A | 5/1999 | Ohshita |
| 6,141,034 | A | 10/2000 | McCutchen |
| 7,136,236 | B2 | 11/2006 | Ohashi |
| 7,515,177 | B2 | 4/2009 | Yoshikawa |
| 9,001,187 | B2 | 4/2015 | Wilson et al. |
| 9,237,317 | B2 | 1/2016 | Hollinger |
| 9,339,194 | B2 | 5/2016 | Adams |
| 9,451,162 | B2 | 9/2016 | Van Hoff et al. |
| 9,911,454 | B2 | 3/2018 | van Hoff et al. |
| 10,291,828 | B1 | 5/2019 | Hsu et al. |
| 10,341,559 | B2 | 7/2019 | Niazi |
| 2003/0231409 | A1 | 12/2003 | Amery et al. |
| 2004/0201769 | A1 | 10/2004 | Yoshikawa et al. |
| 2005/0088762 | A1 | 4/2005 | Ohashi |
| 2007/0053037 | A1 | 3/2007 | Kang |
| 2007/0091195 | A1 | 4/2007 | Yoshikawa |
| 2008/0297612 | A1 | 12/2008 | Yoshikawa |
| 2010/0067070 | A1 | 3/2010 | Mamada et al. |
| 2011/0211106 | A1 | 9/2011 | Marks et al. |
| 2012/0062708 | A1 | 3/2012 | Johnson et al. |
| 2014/0104378 | A1 | 4/2014 | Kauff et al. |
| 2014/0111680 | A1 | 4/2014 | Sutton et al. |
| 2014/0132788 | A1 | 5/2014 | Ramsay |
| 2014/0153916 | A1 | 6/2014 | Kintner |
| 2016/0307372 | A1 | 10/2016 | Pitts et al. |
| 2016/0352982 | A1 | 12/2016 | Weaver et al. |
| 2017/0059966 | A1 | 3/2017 | Wallace |
| 2017/0331986 | A1* | 11/2017 | Houba .................. H04N 23/698 |
| 2018/0007245 | A1 | 1/2018 | Rantala et al. |
| 2018/0190321 | A1 | 7/2018 | Van Hoff et al. |
| 2019/0098276 | A1 | 3/2019 | Duggan et al. |
| 2019/0191059 | A1* | 6/2019 | Park ........................ H04N 23/90 |
| 2019/0235214 | A1* | 8/2019 | Kirejevas ................ G03B 37/00 |
| 2020/0088976 | A1* | 3/2020 | Song ...................... H04N 23/90 |
| 2021/0168284 | A1* | 6/2021 | Sjölund ................ H04N 13/243 |
| 2022/0252848 | A1 | 8/2022 | Kurtz et al. |
| 2023/0090281 | A1 | 3/2023 | Kurtz |
| 2023/0152672 | A1 | 5/2023 | Bidwell |
| 2023/0236493 | A1 | 7/2023 | Muir |

FOREIGN PATENT DOCUMENTS

| | | | |
|---|---|---|---|
| EP | 1593999 | A1 | 11/2005 |
| EP | 1770435 | A1 | 4/2007 |
| JP | 2003162018 | A | 6/2003 |
| JP | 2004184862 | A | 7/2004 |
| JP | 2006030664 | A | 2/2006 |
| JP | 2007110228 | A | 4/2007 |
| JP | 2014119707 | A | 6/2014 |
| JP | 2016208294 | A | 12/2016 |
| JP | 2016538790 | A | 12/2016 |
| JP | 2017120326 | A | 7/2017 |
| JP | 2017519250 | A | 7/2017 |
| WO | 2017126455 | A1 | 7/2017 |
| WO | 2018006938 | A1 | 1/2018 |
| WO | WO2018193713 | A1 | 10/2018 |
| WO | WO2020263865 | A1 | 12/2020 |

OTHER PUBLICATIONS

Invitation to Pay Fees dated Aug. 10, 2020 for Application PCT/US20/39197, "Opto-Mechanics of Panoramic Capture Devices With Abutting Cameras", 2 pages.
International Preliminary Report on Patentability for PCT Application No. PCT/US20/39200, dated Jan. 6, 2021.
PCT Search Report and Written Opinion dated Aug. 25, 2020 for PCT Application No. PCT/US20/39200, 10 pages.
PCT Search Report and Written Opinion dated Oct. 26, 2020 for PCT application No. PCT/US20/39197, 13 pages.
PCT Search Report and Written Opinion dated Apr. 27, 2021 for PCT Application No. PCT/US21/17284, 10 pages.
PCT Search Report and Written Opinion dated Mar. 25, 2021 for PCT application No. PCT/US20/66702, 14 pages.
Extended European Search Report dated Aug. 7, 2023 for European Patent Application No. 20832799.9, 09 pgs.
Extended European Search Report dated Jul. 11, 2023 for European Patent Application No. 20832012.7, 8 pages.
Japanese Office Action mailed Apr. 2, 2024 for Japanese Application No. 2021-577377, a foreign counterpart to U.S. Appl. No. 17/622,393, 7 pages.
Japanese Office Action mailed Dec. 5, 2023 for Japanese Application No. 2021-577338, a foreign counterpart to U.S. Appl. No. 17/622,450, 19 pages.
Office Action for U.S. Appl. No. 17/908,158, mailed on Mar. 14, 2024, Bidwell, "Mounting Systems for Multi-Camera Imagers", 14 Pages.
Office Action for Japanese Application No. 2021-577347, Dated May 21, 2024, 18 pages.
Office Action for U.S. Appl. No. 17/622,450, mailed on Jun. 10, 2024, Kurtz, "Multi-camera Panoramic Image Capture Devices with a Faceted Dome", 16 Pages.
Search Report for European Application No. 20905649.8, Dated Apr. 17, 2024, 9 pages.
Office Action for Japanese Application No. 2021-577338, Dated Jun. 25, 2024, 15 pages.

\* cited by examiner

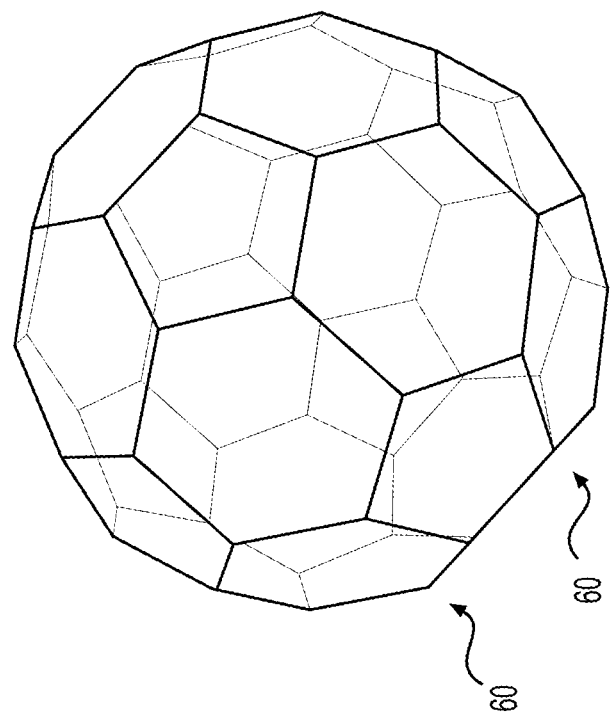
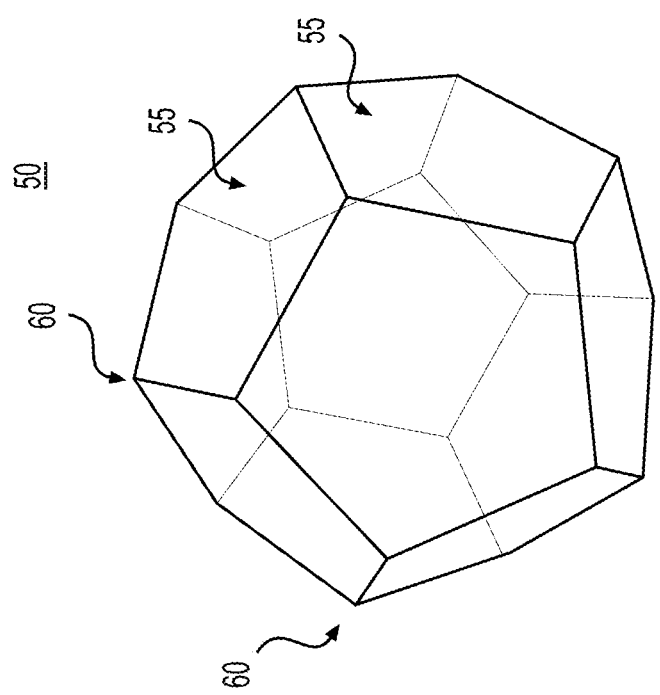
FIG. 4

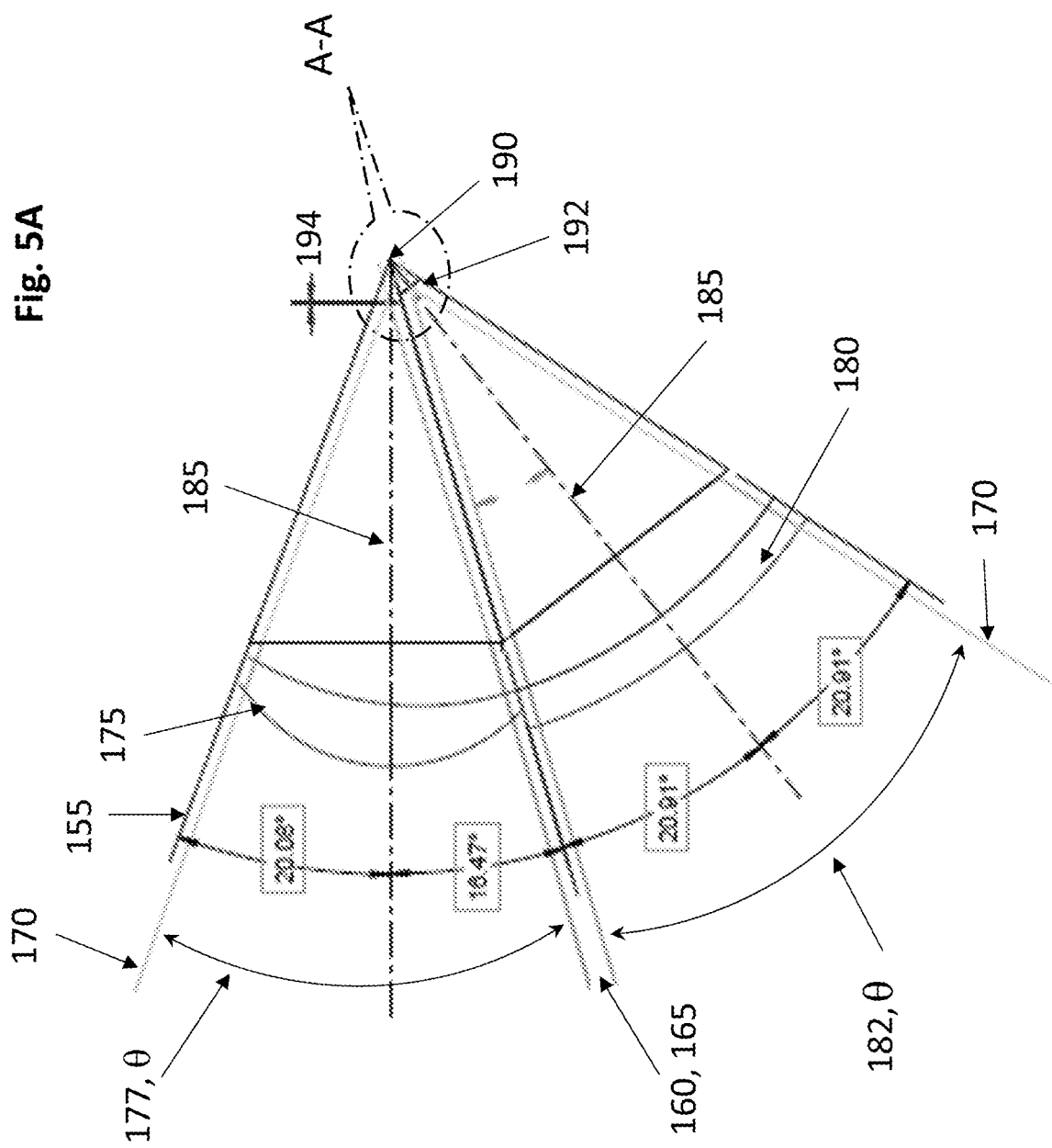

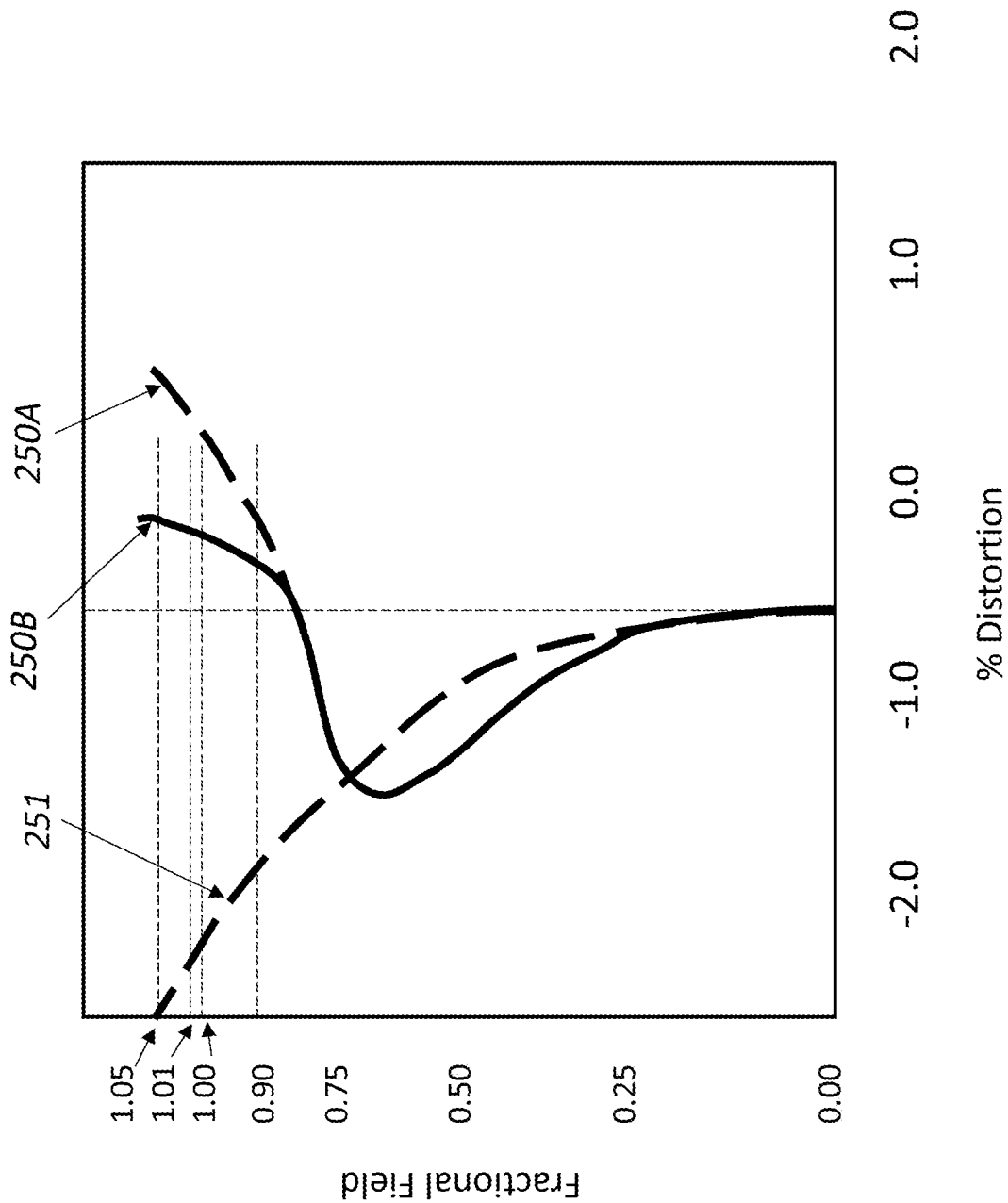

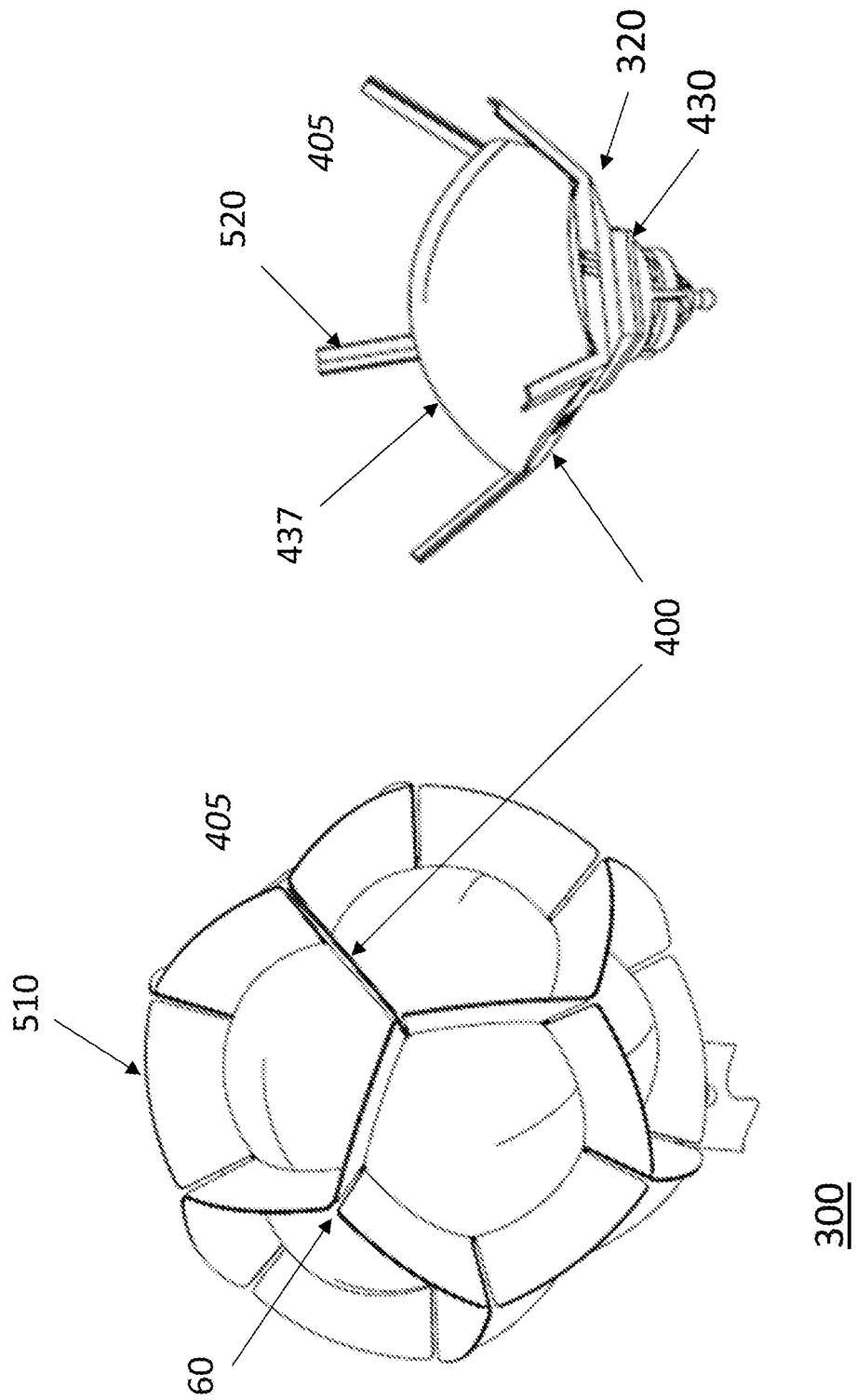

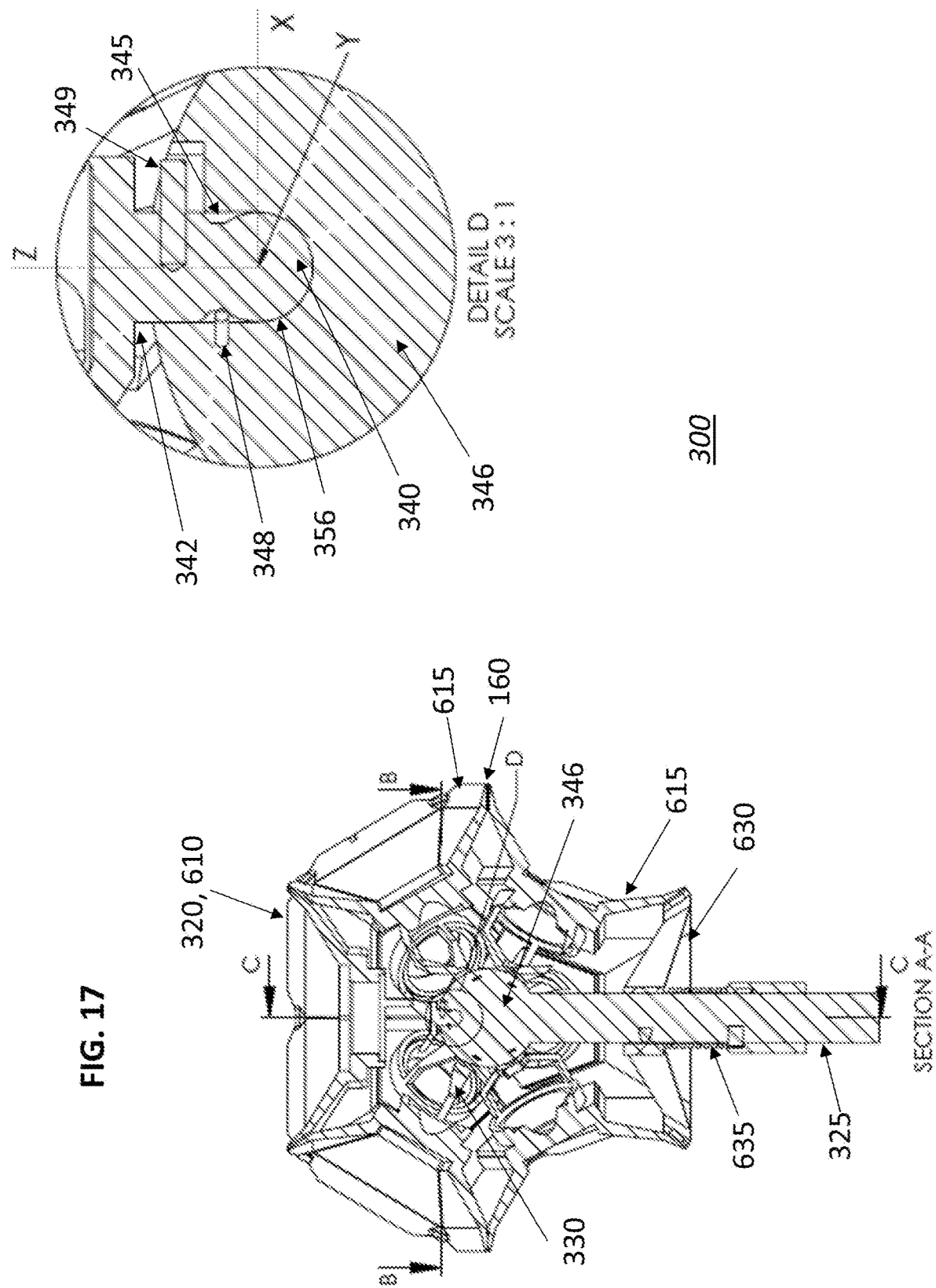

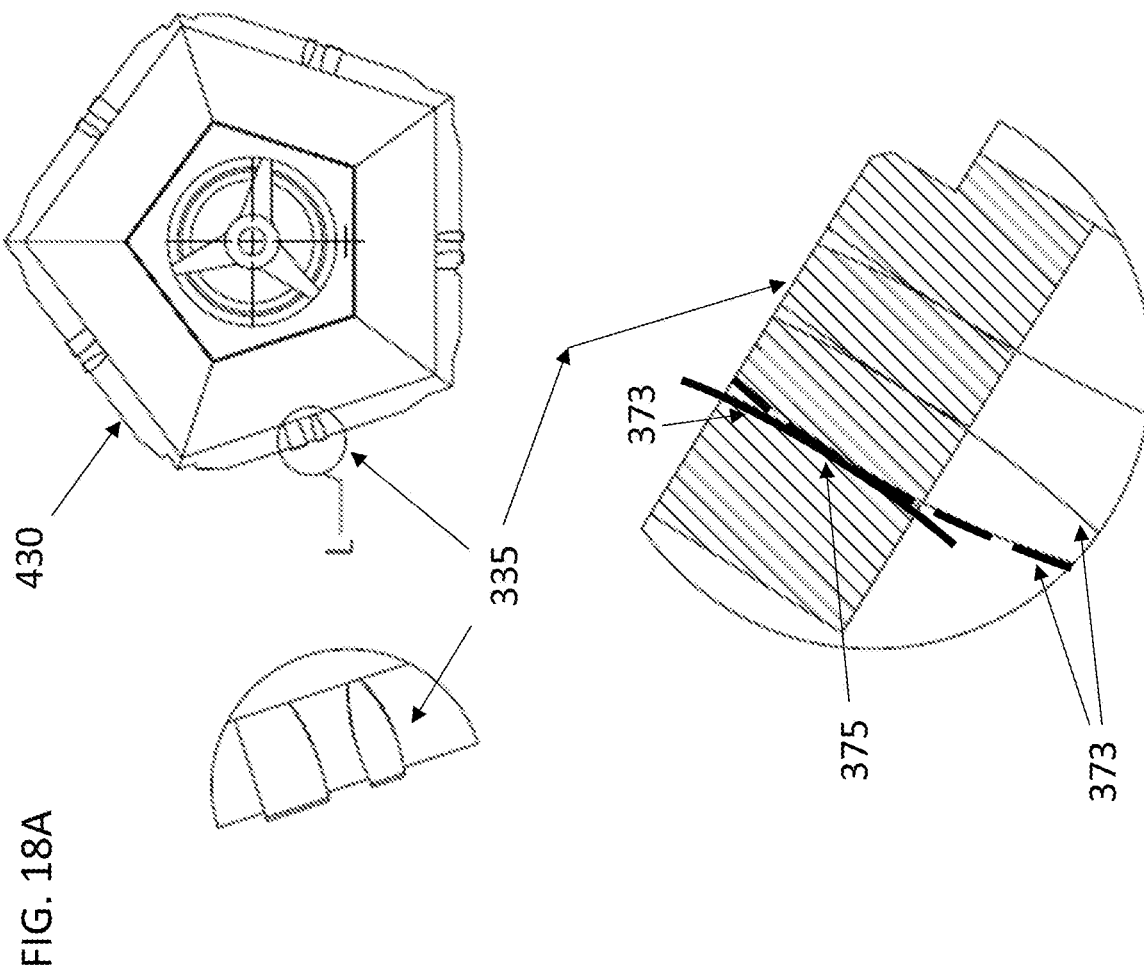
FIG. 18A
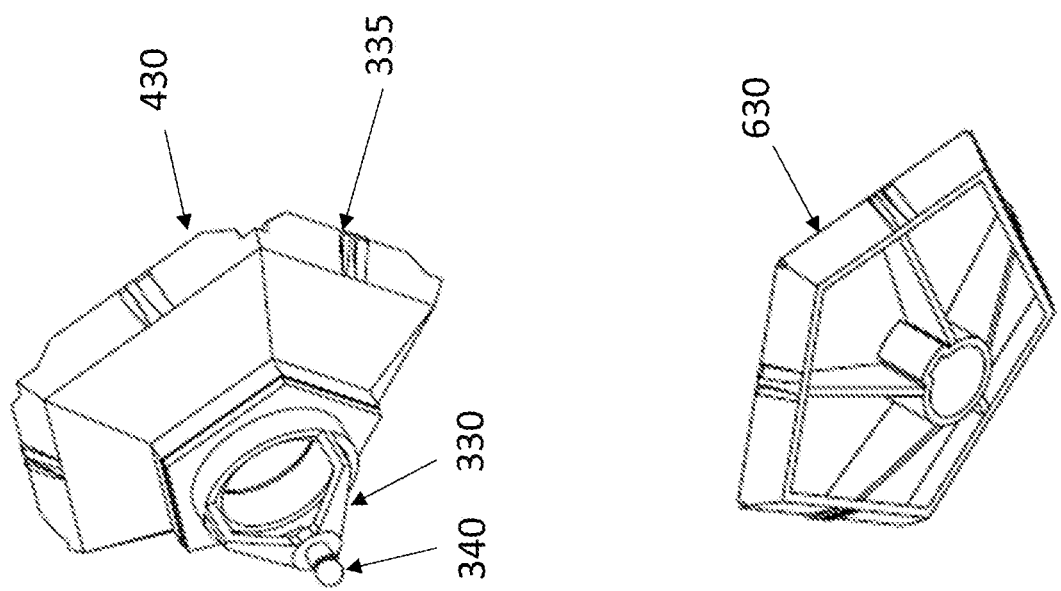

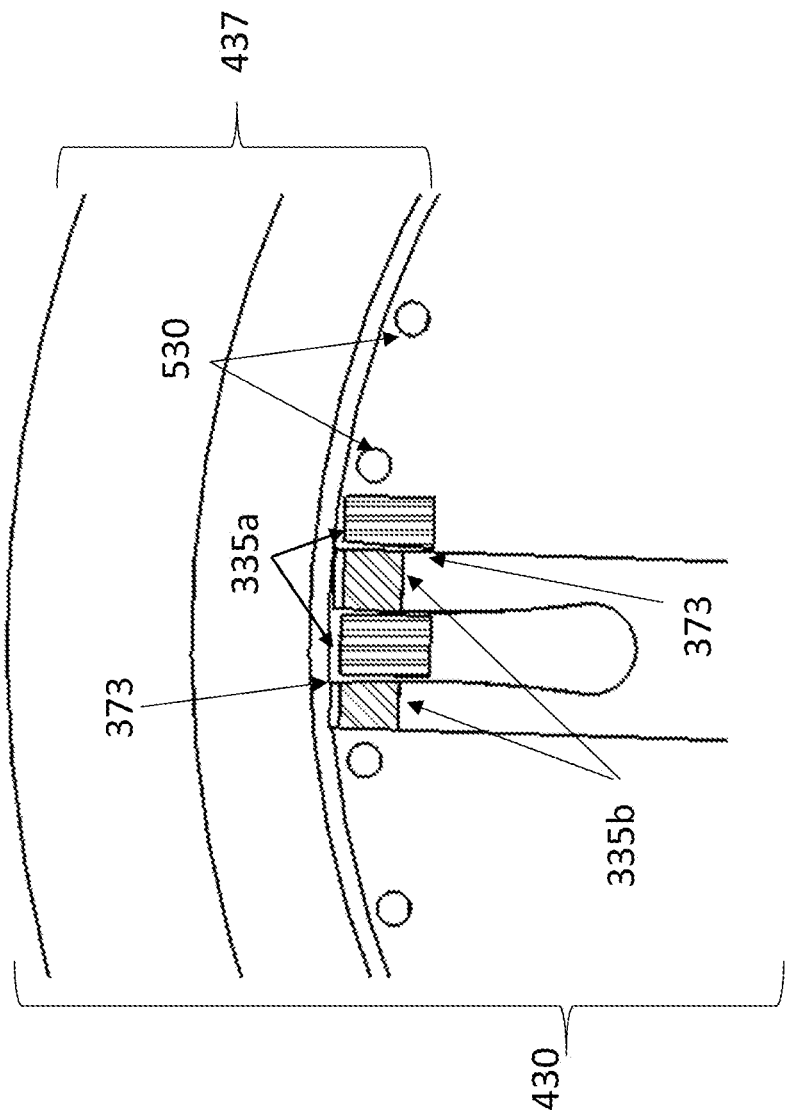

OPTO-MECHANICS OF PANORAMIC CAPTURE DEVICES WITH ABUTTING CAMERAS

CROSS REFERENCE TO RELATED APPLICATIONS

This application is a 35 U.S.C. § 371 National Stage Entry of, and claims priority to, International Application No. PCT/US2020/039197, filed Jun. 23, 2020, which claims benefit of priority of: U.S. Provisional Patent Application Ser. No. 62/865,741, filed Jun. 24, 2019, entitled "Opto-Mechanics of Panoramic Capture Devices with Abutting Cameras;" U.S. Provisional Patent Application Ser. No. 62/952,973, filed Dec. 23, 2019, entitled "Opto-Mechanics of Panoramic Capture Devices with Abutting Cameras;" U.S. Provisional Patent Application Ser. No. 62/952,983, filed Dec. 23, 2019, entitled "Multi-camera Panoramic Image Capture Devices with a Faceted Dome;" and U.S. Provisional Patent Application Ser. No. 62/972,532, filed Feb. 10, 2020, entitled "Integrated Depth Sensing and Panoramic Camera System," the entirety of each of which is incorporated herein by reference.

TECHNICAL FIELD

The present disclosure relates to panoramic low-parallax multi-camera capture devices having a plurality of adjacent and abutting polygonal cameras. The disclosure also relates the opto-mechanical design of cameras that capture incident light from a polygonal shaped field of view to form a polygonal shaped image.

BACKGROUND

Panoramic cameras have substantial value because of their ability to simultaneously capture wide field of view images. The earliest such example is the fisheye lens, which is an ultra-wide-angle lens that produces strong visual distortion while capturing a wide panoramic or hemispherical image. While the field of view (FOV) of a fisheye lens is usually between 100 and 180 degrees, the approach has been extended to yet larger angles, including into the 220-270° range, as provided by Y. Shimizu in U.S. Pat. No. 3,524,697. As an alternative, there are mirror or reflective based cameras that capture annular panoramic images, such as the system suggested by P. Greguss in U.S. Pat. No. 4,930,864. While these technologies have continued to evolve, it is difficult for them to provide a full hemispheric or spherical image with the resolution and image quality that modern applications are now seeking.

As another alternative, panoramic multi-camera devices, with a plurality of cameras arranged around a sphere or a circumference of a sphere, are becoming increasingly common. However, in most of these systems, including those described in U.S. Pat. Nos. 9,451,162 and 9,911,454, both to A. Van Hoff et al., of Jaunt Inc., the plurality of cameras are sparsely populating the outer surface of the device. In order to capture complete 360-degree panoramic images, including for the gaps or seams between the adjacent individual cameras, the cameras then have widened FOVs that overlap one to another. In some cases, as much as 50% of a camera's FOV or resolution may be used for camera to camera overlap, which also creates substantial parallax differences between the captured images. Parallax is the visual perception that the position or direction of an object appears to be different when viewed from different positions. Then in the subsequent image processing, the excess image overlap and parallax differences both complicate and significantly slow the efforts to properly combine, tile or stitch, and synthesize acceptable images from the images captured by adjacent cameras.

There are also panoramic multi-camera devices in which a plurality of cameras is arranged around a sphere or a circumference of a sphere, such that adjacent cameras are abutting along a part or the whole of adjacent edges. As an example, U.S. Pat. No. 7,515,177 by K. Yoshikawa depicts an imaging device with a multitude of adjacent image pickup units (cameras). Images are collected from cameras having overlapping fields of view, so as to compensate for mechanical errors.

More broadly, in a multi-camera device, mechanical variations in the assembly and alignment of individual cameras, and of adjacent cameras to each other, can cause real physical variations to both the cameras themselves, and to the seam widths and parallelism of the camera edges along the seams. These variations can then affect the FOVs captured by the individual cameras, the parallax errors in the images captured by adjacent cameras, the extent of "blind spots" in the FOV corresponding to the seams, the seam widths, and the amount of image overlap that is needed to compensate. Thus, there are opportunities to improve panoramic multi-camera devices and the low-parallax cameras thereof, relative to the optical and opto-mechanical designs, and other aspects as well.

BRIEF DESCRIPTION OF DRAWINGS

FIG. 4 depicts two polyhedron shapes, that of a regular dodecahedron and a truncated icosahedron, to which a multi-camera capture device can be designed and fabricated.

FIG. 5A and FIG. 5B depict the optical geometry for fields of view for adjacent hexagonal and pentagonal lenses, as can occur with a device having the geometry of a truncated icosahedron. FIG. 5B depicts an expanded area of FIG. 5A with greater detail.

FIG. 6 depicts distortion correction curves plotted on a graph showing a percentage of distortion relative to a fractional field.

FIG. 14A depicts a 3D view of a multi-camera capture device with fins.

FIG. 14B depicts a multi-camera capture device with pins.

FIG. 17 depicts a cross-sectional view of a portion of an assembly of an improved multi-camera panoramic image capture device, and a portion thereof in detail.

FIG. 18A depicts a series of views of components and features of a lens housing and a channel loading support, that can be used during assembly of an improved multi-camera panoramic image capture device.

FIG. 18B-1 depicts a cross-sectional views of an alternate version of the lens housings and the interaction thereof, at or near a seam, to that shown in FIG. 10.

FIG. 18B-2 depicts a cross-sectional views of an alternate version of the channel to channel datums to those shown in FIG. 18A.

DETAILED DESCRIPTION

Figure 1:
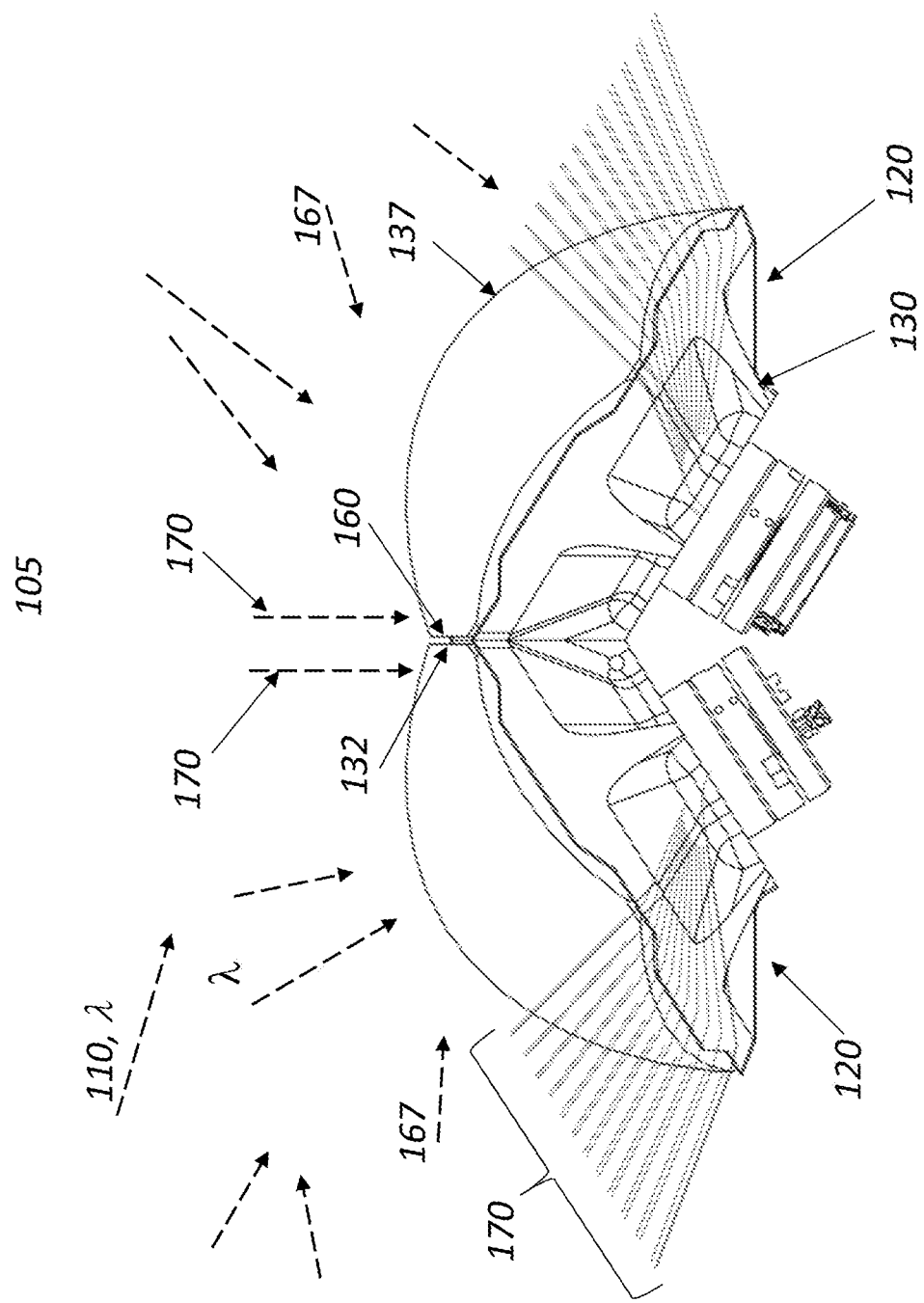
FIG. 1 depicts a 3D view of a portion of a multi-camera capture device, and specifically two adjacent cameras thereof.

As is generally understood in the field of optics, a lens or lens assembly typically comprises a system or device having multiple lens elements which are mounted into a lens barrel or housing, and which work together to produce an optical image. An imaging lens captures a portion of the light coming from an object or plurality of objects that reside in object space at some distance(s) from the lens system. The imaging lens can then form an image of these objects at an output "plane"; the image having a finite size that depends on the magnification, as determined by the focal length of the imaging lens and the conjugate distances to the object(s) and image plane, relative to that focal length. The amount of image light that transits the lens, from object to image, depends in large part on the size of the aperture stop of the imaging lens, which is typically quantified by one or more values for a numerical aperture (NA) or an f-number (F# or F/#).

The image quality provided by the imaging lens depends on numerous properties of the lens design, including the selection of optical materials used in the design, the size, shapes (or curvatures) and thicknesses of the lens elements, the relative spacing of the lens elements one to another, the spectral bandwidth, polarization, light load (power or flux) of the transiting light, optical diffraction or scattering, and/or lens manufacturing tolerances or errors. The image quality is typically described or quantified in terms of lens aberrations (e.g., spherical, coma, or distortion), or the relative size of the resolvable spots provided by the lens, which is also often quantified by a modulation transfer function (MTF).

In a typical electronic or digital camera, an image sensor is nominally located at the image plane. This image sensor is typically a CCD or CMOS device, which is physically attached to a heat sink or other heat removal means, and also includes electronics that provide power to the sensor, and read-out and communications circuitry that provide the image data to data storage or image processing electronics. The image sensor typically has a color filter array (CFA), such as a Bayer filter within the device, with the color filter pixels aligned in registration with the image pixels to provide an array of RGB (Red, Green, Blue) pixels. Alternative filter array patterns, including the CYGM filter (cyan, yellow, green, magenta) or an RGBW filter array (W=white), can be used instead.

In typical use, many digital cameras are used by people or remote systems in relative isolation, to capture images or pictures of a scene, without any dependence or interaction with any other camera devices. In some cases, such as surveillance or security, the operation of a camera may be directed by people or algorithms based on image content seen from another camera that has already captured overlapping, adjacent, or proximate image content. In another example, people capture panoramic images of a scene with an extended or wide FOV, such as a landscape scene, by sequentially capturing a sequence of adjacent images, while manually or automatically moving or pivoting to frame the adjacent images. Afterwards, image processing software, such as Photoshop or Lightroom, can be used to stitch, mosaic, or tile the adjacent images together to portray the larger extended scene. Image stitching or photo stitching is the process of combining multiple photographic images with overlapping fields of view to produce a segmented panorama or high-resolution image. Image quality improvements, including exposure or color corrections, can also be applied, either in real time, or in a post processing or image rendering phase, or a combination thereof.

Unless the objects in a scene are directionally illuminated and/or have a directional optical response (e.g., such as with reflectance), the available light is plenoptic, meaning that there is light travelling in every direction, or nearly so, in a given space or environment. A camera can then sample a subset of this light, as image light, with which it provides a resulting image that shows a given view or perspective of the different objects in the scene at one or more instants in time. If the camera is moved to a different nearby location and used to capture another image of part of that same scene, both the apparent perspectives and relative positioning of the objects will change. In the latter case, one object may now partially occlude another, while a previously hidden object becomes at least partially visible. These differences in the apparent position or direction of an object are known as parallax. In particular, parallax is a displacement or difference in the apparent position of an object viewed along two different lines of sight and is measured by the angle or semi-angle of inclination between those two lines.

In a stereoscopic image capture or projection system, dual view parallax is a cue, along with shadowing, occlusion, and perspective, that can provide a sense of depth. For example, in a stereo (3D) projection system, polarization or spectrally encoded image pairs can be overlap projected onto a screen to be viewed by audience members wearing appropriate glasses. The amount of parallax can have an optimal range, outside of which, the resulting sense of depth can be too small to really be noticed by the audience members, or too large to properly be fused by the human visual system.

Whereas, in a panoramic image capture application, parallax differences can be regarded as an error that can complicate both image stitching and appearance. In the example of an individual manually capturing a panoramic sequence of landscape images, the visual differences in perspective or parallax across images may be too small to notice if the objects in the scene are sufficiently distant (e.g., optically at infinity). An integrated panoramic capture device with a rotating camera or multiple cameras has the potential to continuously capture real time image data at high resolution without being dependent on the uncertainties of manual capture. But such a device can also introduce its own visual disparities, image artifacts, or errors, including those of parallax, perspective, and exposure. Although the resulting images can often be successfully stitched together with image processing algorithms, the input image errors complicate and lengthen image processing time, while sometimes leaving visually obvious residual errors.

To provide context, FIG. 1 depicts a portion of an improved integrated panoramic multi-camera capture device 100 having two adjacent cameras 120 in housings 130 which are designed for reduced parallax image capture. These cameras are alternately referred to as image pick-up units, or camera channels, or objective lens systems. The cameras 120 each have a plurality of lens elements (see FIG. 2) that are mounted within a lens barrel or housing 130. The adjacent outer lens elements 137 have adjacent beveled edges 132 and are proximately located, one camera channel to another, but which may not be in contact, and thus are separated by a gap or seam 160 of finite width. Some portion of the available light (☐), or light rays 110, from a scene or object space 105 will enter a camera 120 to become image light that was captured within a constrained FOV and directed to an image plane, while other light rays will miss the cameras entirely. Some light rays 110 will propagate into the camera and transit the constituent lens elements as edge-of-field chief rays 170, or perimeter rays, while other light rays can potentially propagate through the lens elements to create stray or ghost light and erroneous bright spots or images. As an example, some light rays (167) that are incident at large angles to the outer surface of an outer lens element 137 can transit a complex path through the lens elements of a camera and create a detectable ghost image at the image plane 150.

Figure 2A:
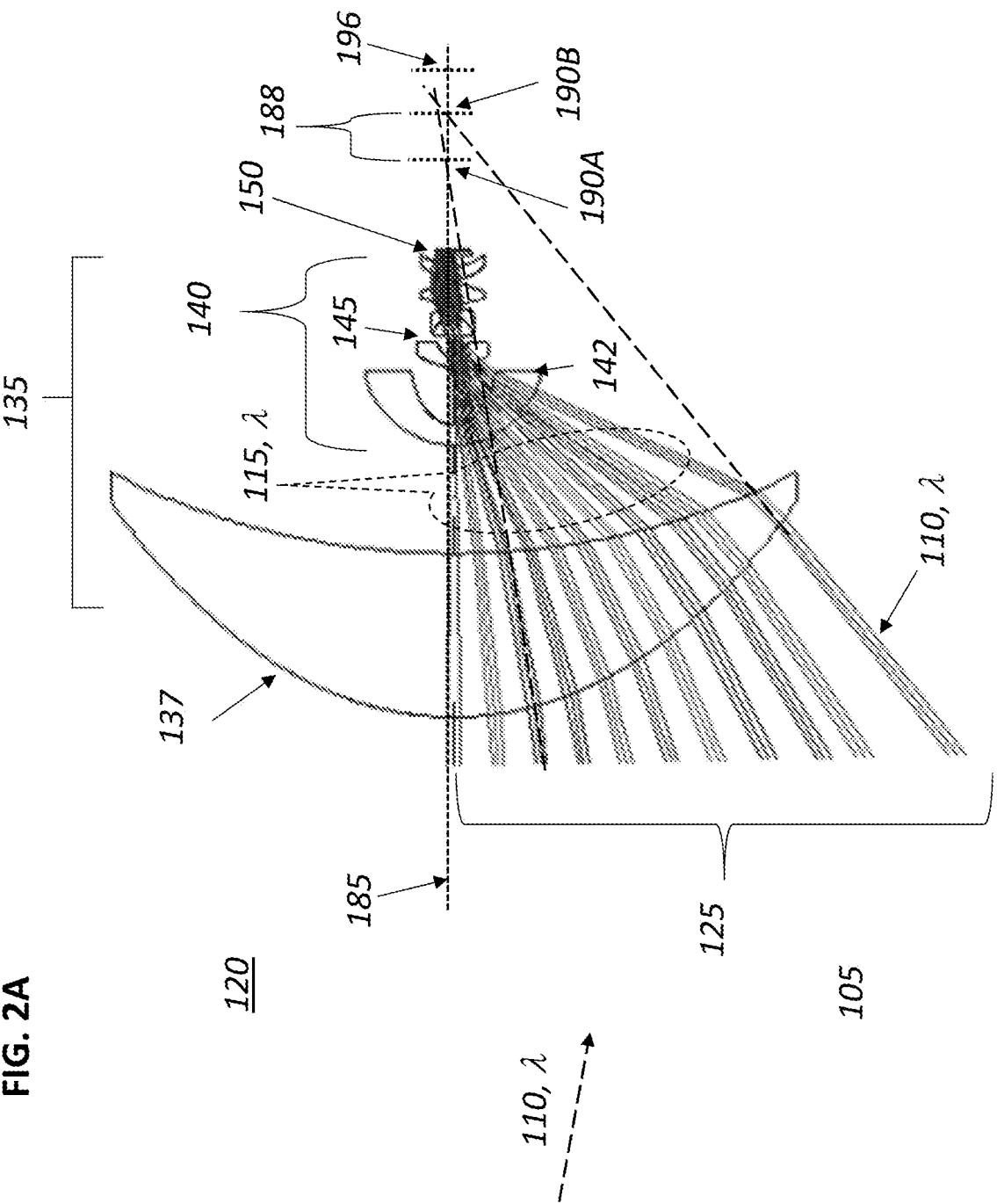
FIGS. 2A and 2B depict portions of camera lens assemblies in cross-section, including lens elements and ray paths.
Figure 2B:
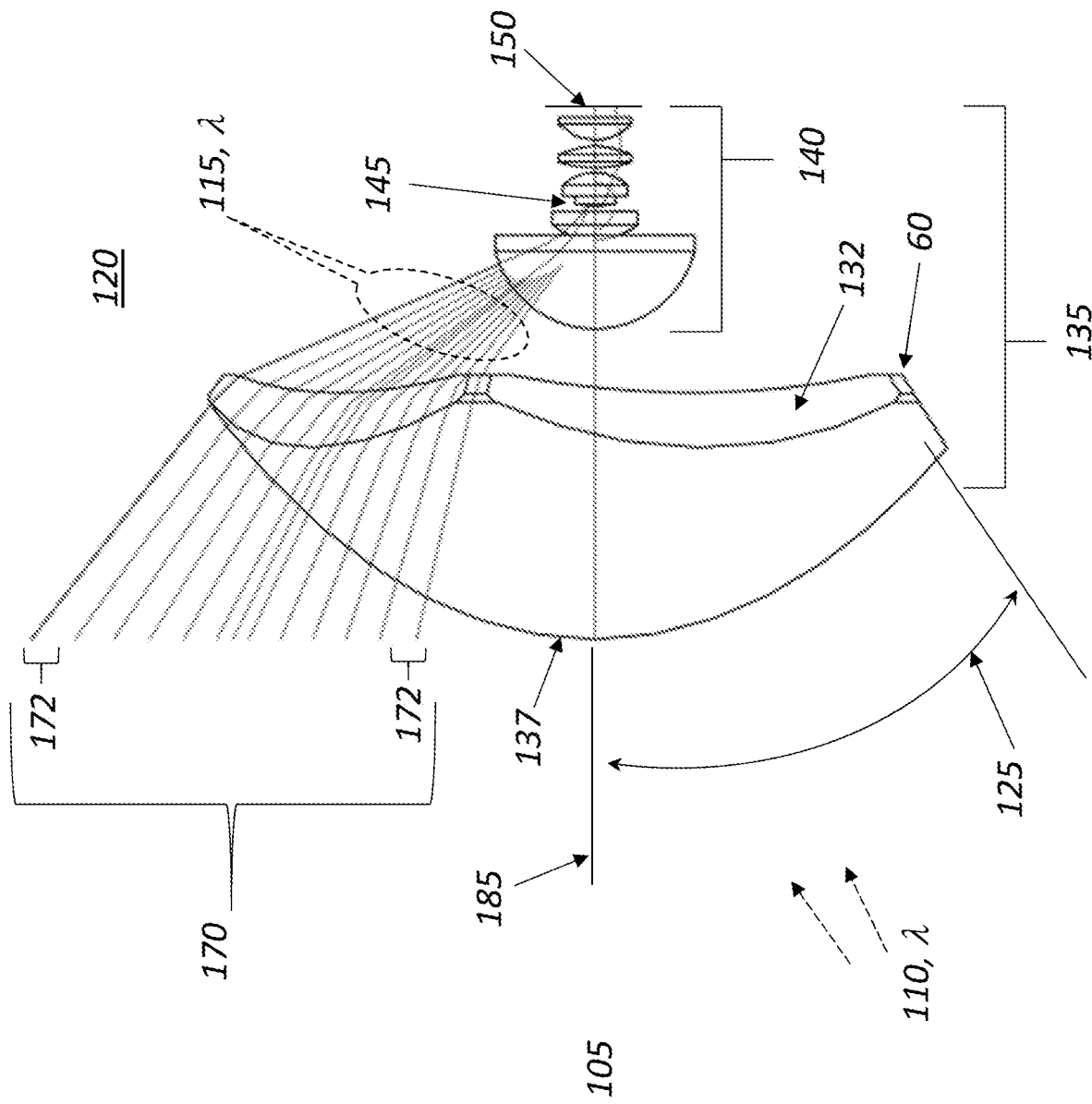

In greater detail, FIG. 2A depicts a cross-section of part of a camera 120 having a set of lens elements 135 mounted in a housing (130, not shown) within a portion of an integrated panoramic multi-camera capture device 100. A fan of light rays 110 from object space 105, spanning the range from on axis to full field off axis chief rays, are incident onto the outer lens element 137, and are refracted and transmitted inwards. This image light 115 that is refracted and transmitted through further inner lens elements 140, through an aperture stop 145, converges to a focused image at or near an image plane 150, where an image sensor (not shown) is typically located. The lens system 120 of FIG. 2A can also be defined as having a lens form that consists of outer lens element 137 or compressor lens element, and inner lens elements 140, the latter of which can also be defined as consisting of a pre-stop wide angle lens group, and a post-stop eyepiece-like lens group. This compressor lens element (137) directs the image light 115 sharply inwards, compressing the light, to both help enable the overall lens assembly to provide a short focal length, while also enabling the needed room for the camera lens housing or barrel to provide the mechanical features necessary to both hold or mount the lens elements and to interface properly with the barrel or housing of an adjacent camera. The image light that transited a camera lens assembly from the outer lens element 137 to the image plane 150 will provide an image having an image quality, that can be quantified by an image resolution, image contrast, a depth of focus, and other attributes, whose quality was defined by the optical aberrations (e.g., astigmatism, distortion, or spherical) and chromatic or spectral aberrations, encountered by the transiting light at each of the lens elements (137, 140) within a camera 120. FIG. 2B depicts a fan of chief rays 170, or perimeter rays, incident along or near a beveled edge 132 of the outer lens element 137 of the camera optics (120) depicted in FIG. 2A. FIG. 2B also depicts a portion of a captured, polygonal shaped or asymmetrical, FOV 125, that extends from the optical axis 185 to a line coincident with an edge ray.

In the camera lens design depicted in FIG. 2A, the outer lens element 137 functions as a compressor lens element that redirects the transiting image light 115 towards a second lens element 142, which is the first lens element of the group of inner lens elements 140. In this design, this second lens element 142 has a very concave shape that is reminiscent of the outer lens element used in a fish-eye type imaging lens. This compressor lens element directs the image light 115 sharply inwards, or bends the light rays, to both help enable the overall lens assembly to provide a short focal length, while also enabling the needed room for the camera lens housing 130 or barrel to provide the mechanical features necessary to both hold or mount the lens elements 135 and to interface properly with the barrel or housing of an adjacent camera. However, with a good lens and opto-mechanical design, and an appropriate sensor choice, a camera 120 can be designed with a lens assembly that supports an image resolution of 20-30 pixels/degree, to as much as 110 pixels/degree, or greater, depending on the application and the device configuration.

The resultant image quality from these cameras will also depend on the light that scatters at surfaces, or within the lens elements, and on the light that is reflected or transmitted at each lens surface. The surface transmittance and camera lens system efficiency can be improved by the use of anti-reflection (AR) coatings. The image quality can also depend on the outcomes of non-image light. Considering again FIG. 1, other portions of the available light can be predominately reflected off of the outer lens element 137. Yet other light that enters a camera 120 can be blocked or absorbed by some combination of blackened areas (not shown) that are provided at or near the aperture stop, the inner lens barrel surfaces, the lens element edges, internal baffles or light trapping features, a field stop, or other surfaces. Yet other light that enters a camera can become stray light or ghost light 167 that is also potentially visible at the image plane.

The aggregate image quality obtained by a plurality of adjacent cameras 120 within an improved integrated panoramic multi-camera capture device 100 (e.g., FIG. 1) can also depend upon a variety of other factors including the camera to camera variations in the focal length and/or track length, and magnification, provided by the individual cameras. These parameters can vary depending on factors including the variations of the glass refractive indices, variations in lens element thicknesses and curvatures, and variations in lens element mounting. As an example, images that are tiled or mosaiced together from a plurality of adjacent cameras will typically need to be corrected, one to the other, to compensate for image size variations that originate with camera magnification differences (e.g., ±2%).

The images produced by a plurality of cameras in an integrated panoramic multi-camera capture device 100 can also vary in other ways that effect image quality and image mosaicing or tiling. In particular, the directional pointing or collection of image light through the lens elements to the image sensor of any given camera 120 can vary, such that the camera captures an angularly skewed or asymmetrical FOV (FOV↔) or mis-sized FOV (FOV±). The lens pointing variations can occur during fabrication of the camera (e.g., lens elements, sensor, and housing) or during the combined assembly of the multiple cameras into an integrated panoramic multi-camera capture device 100, such that the alignment of the individual cameras is skewed by misalignments or mounting stresses. When these camera pointing errors are combined with the presence of the seams 160 between cameras 120, images for portions of an available landscape or panoramic FOV that may be captured, may instead be missed or captured improperly. The variabilities of the camera pointing, and seams can be exacerbated by mechanical shifts and distortions that are caused by internal or external environmental factors, such as heat or light (e.g., image content), and particularly asymmetrical loads thereof.

Figure 3:
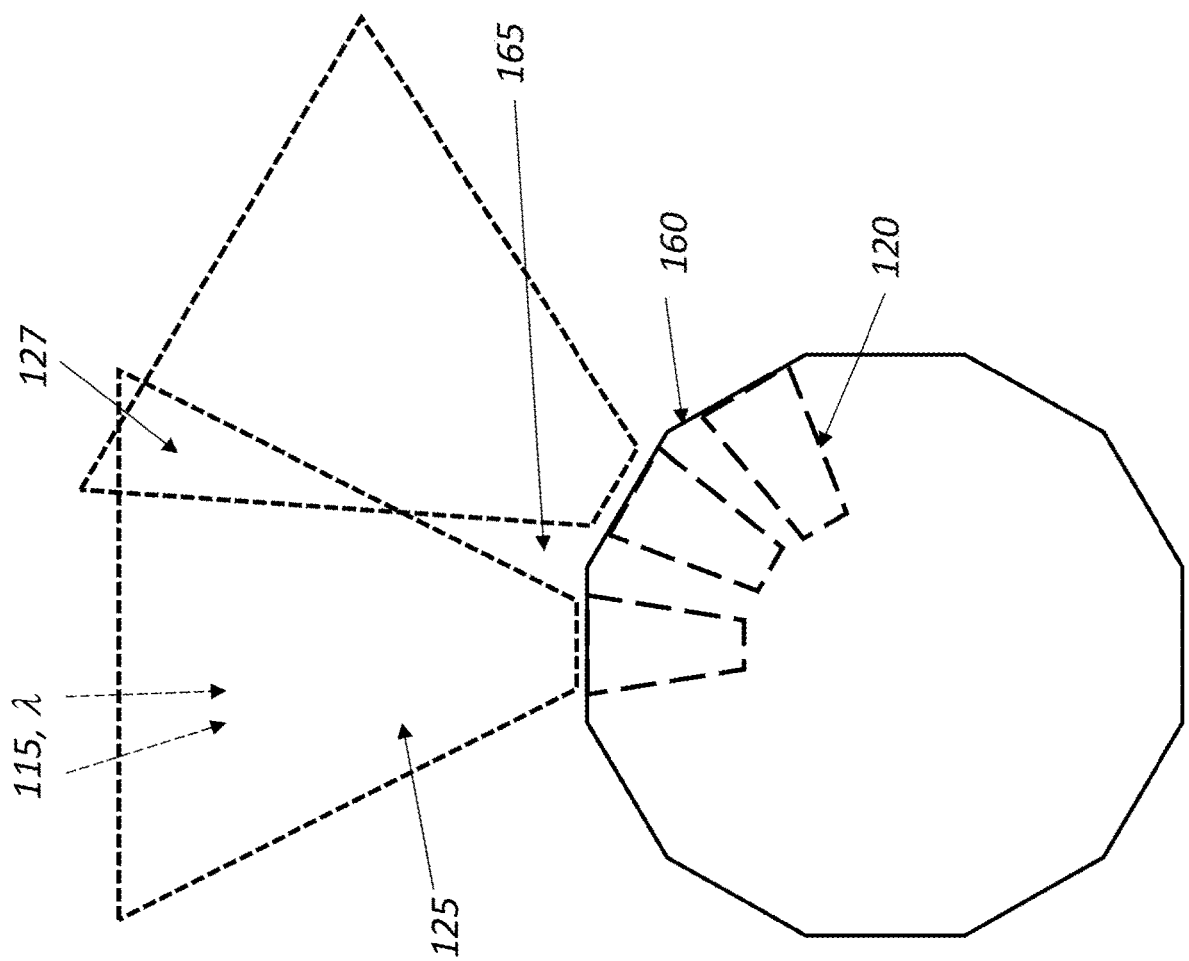
FIG. 3 depicts a cross-sectional view of a portion of a standard multi-camera capture device showing FOV overlap, Fields of view, overlap, seams, and blind regions.

In comparison to the FIG. 1 system, in a typical commercially available panoramic camera, the seams between cameras are outright gaps that can be 30-50 mm wide, or more. In particular, as shown in FIG. 3, a panoramic multi-camera capture device 101 can have adjacent cameras 120 or camera channels separated by large gaps or seams 160, between which there are blind spots or regions 165 from which neither camera can capture images. The actual physical seams 160 between adjacent camera channels or outer lens elements 137 (FIG. 1 and FIG. 3) can be measured in various ways; as an actual physical distance between adjacent lens elements or lens housings, as an angular extent of lost FOV, or as a number of "lost" pixels. However, the optical seam, as the distance between outer chief rays of one camera to another can be larger yet, due to any gaps in light acceptance caused by vignetting or coating limits. For example, anti-reflection (AR) coatings are not typically deposited to the edges of optics, but an offsetting margin is provided, to provide a coated clear aperture (CA).

To compensate for both camera misalignments and the large seams 160, and to reduce the size of the blind regions 165, the typical panoramic multi-camera capture devices 101 (FIG. 3) have each of the individual cameras 120 capture image light 115 from wide FOVs 125 that provide overlap 127, so that blind regions 165 are reduced, and the potential capturable image content that is lost is small. As another example, in most of the commercially available multi-camera capture devices 101, the gaps are 25-50+ mm wide, and the compensating FOV overlap between cameras is likewise large; e.g., the portions of the FOVs 125 that are overlapping and are captured by two adjacent cameras 120 can be as much as 10-50% of a camera's FOV. The presence of such large image overlaps from shared FOVs 125 wastes potential image resolution and increases the image processing and image stitching time, while introducing significant image parallax and perspective errors. These errors complicate image stitching, as the errors must be corrected or averaged during the stitching process. In such systems, the parallax is not predictable because it changes as a function of object distance. If the object distance is known, the parallax can be predicted for given fields of view and spacing between cameras. But because the object distance is not typically known, parallax errors then complicate image stitching. Optical flow and common stitching algorithms determine an object depth and enable image stitching, but with processing power and time burdens.

Similarly, in a panoramic multi-camera capture device 100, of the type of FIG. 1, with closely integrated cameras, the width and construction at the seams 160 can be an important factor in the operation of the entire device. However, the seams can be made smaller than in FIG. 3, with the effective optical seam width between the FOV edges of two adjacent cameras determined by both optical and mechanical contributions. For example, by using standard optical engineering practices to build lens assemblies in housings, the mechanical width of the seams 160 between the outer lens elements 137 of adjacent cameras might be reduced to 4-6 mm. For example, it is standard practice to assemble lens elements into a lens barrel or housing that has a minimum radial width of 1-1.5 mm, particularly near the outermost lens element. Then accounting for standard coated clear apertures or coating margins, and accounting for possible vignetting, aberrations of the entrance pupil, front color, chip edges, and trying to mount adjacent lens assemblies or housings in proximity by standard techniques. Thus, when accounting for both optics and mechanics, an optical seam width between adjacent lenses can easily be 8-12 mm or more.

But improved versions of the panoramic multi-camera capture device (300) of the type of FIG. 1, with optical and opto-mechanical designs that enable significantly smaller seams, and with further improved parallax performance, are possible. As a first example, for the present technology for improved polygonal shaped cameras, during early stages of fabrication of outer lens elements 137, these lenses can have a circular shape and can be AR coated to at or near their physical edges. When these lenses are subsequently processed to add the polygonal shape defining beveled edges 132 (e.g., FIG. 2B), a result can be that the AR coatings will essentially extend to the beveled lens edges. The effective optical or coated clear apertures can then defined by any allowances for mechanical mounting or for the standard edge grind that is used in optics manufacturing to avoid edge chipping. With this approach, and a mix of other techniques that will be subsequently discussed, the optical seams can be reduced to 1-5 mm width.

Figure 8:
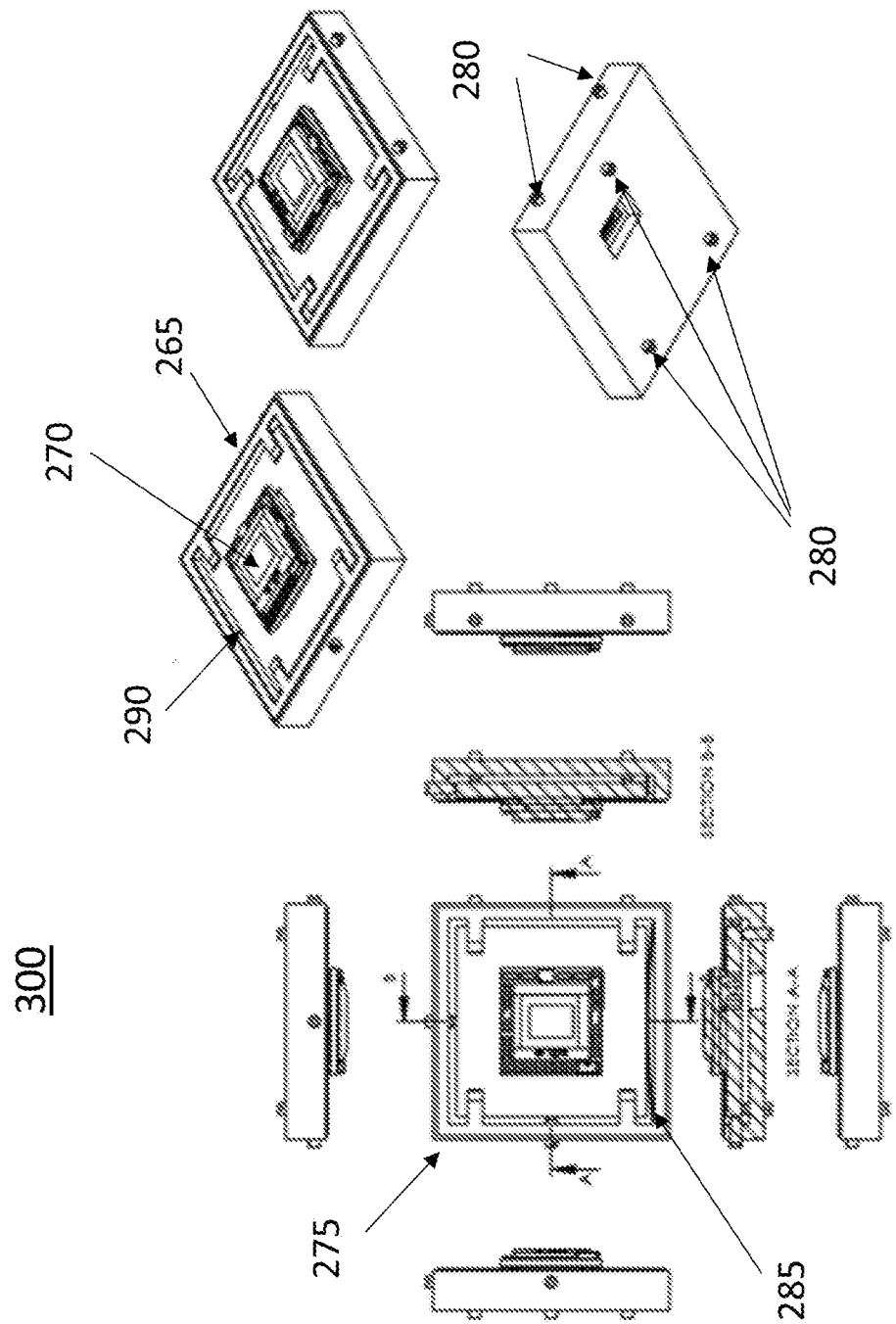
FIG. 8 depicts an image sensor with a sensor mount having adjustors.
Figure 9:
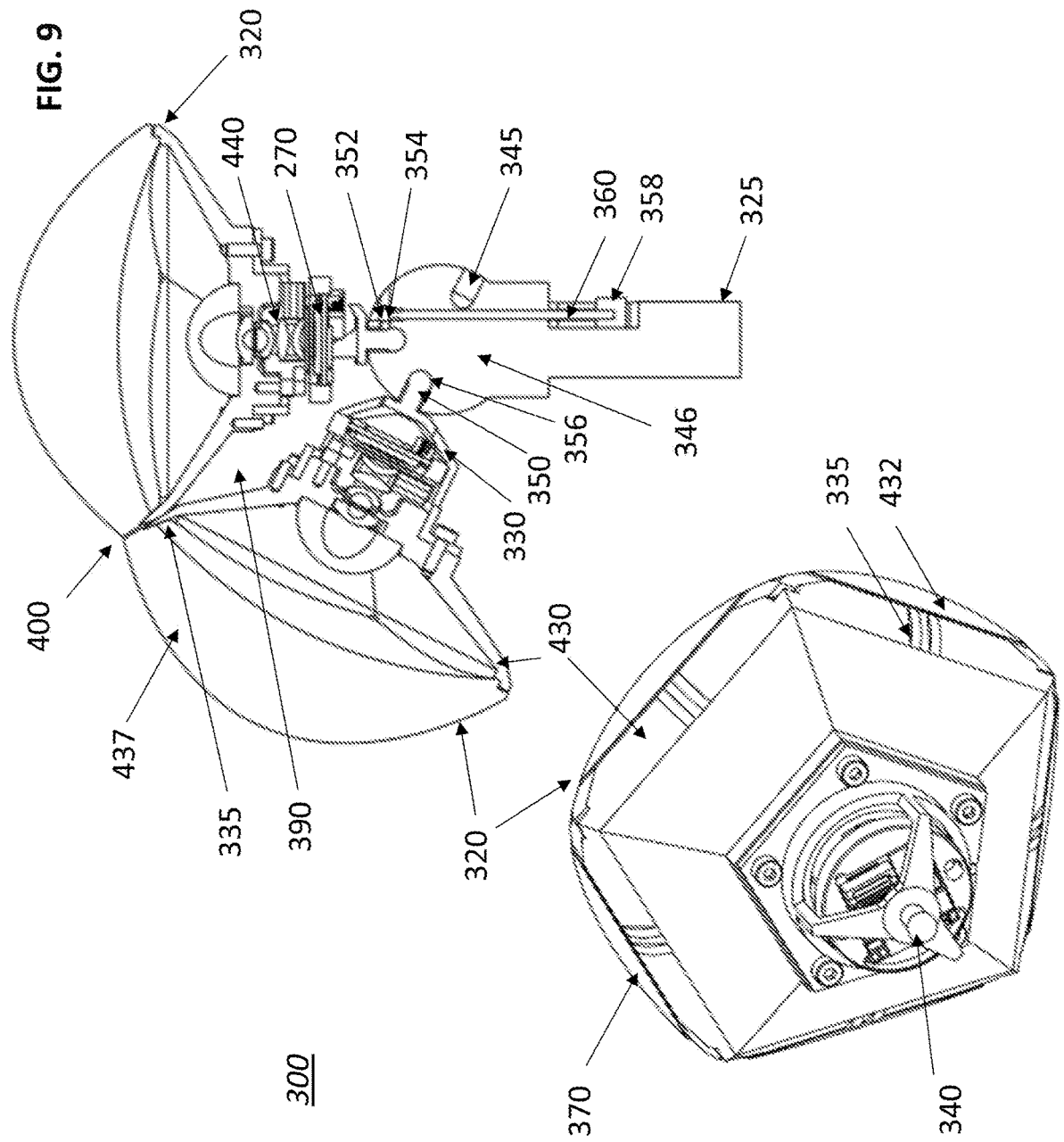
FIG. 9 depicts a cross-sectional view of an improved opto-mechanics construction for a multi-camera capture device, and a 3D view of a camera channel thereof.

Aspects of the present disclosure produce high quality low-parallax panoramic images from an improved multi-camera panoramic capture device (300), for which portions of a first example are shown in FIG. 8 and FIG. 9. This broad goal can be enabled by developing a systemic range of design strategies to inform both the optical and opto-mechanical lens design efforts, and the opto-mechanical device design and fabrication efforts, as well as strategies for improved image capture and processing. This goal can also be enabled by providing for both initial and ongoing camera and device calibration. In broad terms, the image processing or rendering of images is a method to generate quality images from the raw captured image data that depends on the camera intrinsics (geometric factors such as focal length and distortion), the camera extrinsics (geometric factors such as camera orientation to object space), other camera parameters such as vignetting and transmission, and illumination parameters such as color and directionality. With respect to an improved multi-camera panoramic capture device 300, the use of fiducials in determining and tracking a center pixel or an image centroid, exposure correction, and knowledge of the camera intrinsics for any given camera 320 in a device, are all assists towards completing reliable and repeatable tiling of images obtained from a plurality of adjacent cameras. Thus the subsequent discussions are broadly focused on providing optical (camera or objective lens) designs that can enable the desired image quality, as well as camera and device assembly approaches, management of key tolerances, camera calibration, knowledge of camera intrisincs and extriniscs, and other factors that can likewise affect the resultant device performance. The improved panoramic multi-camera capture devices of the present invention can be used to support a wide variety of applications or markets, including cinematic image capture, augmented reality or virtual reality (VR) image capture, surveillance or security imaging, sports or event imaging, mapping or photogrammetry, vehicular navigation, and robotics.

Before exploring opto-mechanical means for enabling improved panoramic multi-camera capture devices (300), means for providing cameras 120 that are improved for use in these systems are developed. Accordingly, the goals include providing improved cameras (320) having both reduced parallax errors and image overlap. As one aspect of the present approach, a goal is to reduce the residual parallax error for the edge chief rays collected respectively by each camera in an adjacent pair. The parallax error is defined as the change in parallax with respect to object distance (e.g., that the chief ray trajectory with respect to a near distance (e.g., 3 feet) from the device, versus a far distance (e.g., 1 mile), is slightly different). For example, as one goal or target for reduced parallax, or to have effectively no parallax error, or to be "parallax-free", is that the chief rays of adjacent cameras should deviate from parallelism to each other by ≤0.5-2.0 deg., and preferably by ≤0.01-0.1 deg. Alternately, or equivalently, the parallax error, as assessed as a perspective error in terms of location on the image plane, should be reduced to ≤2 pixels, and preferably to ≤0.5 pixel. As another aspect of the present approach, the width of the seams 160 between adjacent cameras (e.g., 120, 320) assembled into their own lens housings are to be reduced. The goal is to reduce the width of the seams, both in terms of their absolute physical width, and their optical width or an effective width. For example, a goal is to reduce a seam 160 between adjacent outer lens elements 137 to having a maximum gap or an actual physical seam width in a range of only ≈0.5-3.0 mm, and to then reduce the maximum optical seam width to a range of about only 1-6 mm. As an example, these reduced seams widths can translate to a reduced angular extent of lost FOV of only 0.25-1.0°, or a number of "lost" pixels of only 2-20 pixels. For example, for a device providing 8k pixels around a 360-degree panorama equirectangular image, a loss of only 2-4 pixels at the seams can be acceptable as the residual image artifacts can be difficult to perceive. The actual details or numerical targets for effectively no-parallax error, or for the maximum optical seam width, depend on many factors including the detailed opto-mechanical designs of the improved cameras (320) and overall device (300), management of tolerances, possible allowances for a center offset distance or an amount of extended FOV (215) and the targets for low parallax therein, and the overall device specifications (e.g., diameter, sensor resolution or used sensor pixels within an imaged FOV or a Core FOV 205 (FIG. 7)). Further goals, enabled by some combination of the above improvements, are for each camera to reliably and quickly provide output images from an embedded sensor package that are cropped down to provide core FOV images, and then that each cropped image can be readily seamed or tiled with cropped images provided by adjacent cameras, so as to readily provide panoramic output images from an improved multi-camera capture device (300) in real time.

Figure 15:
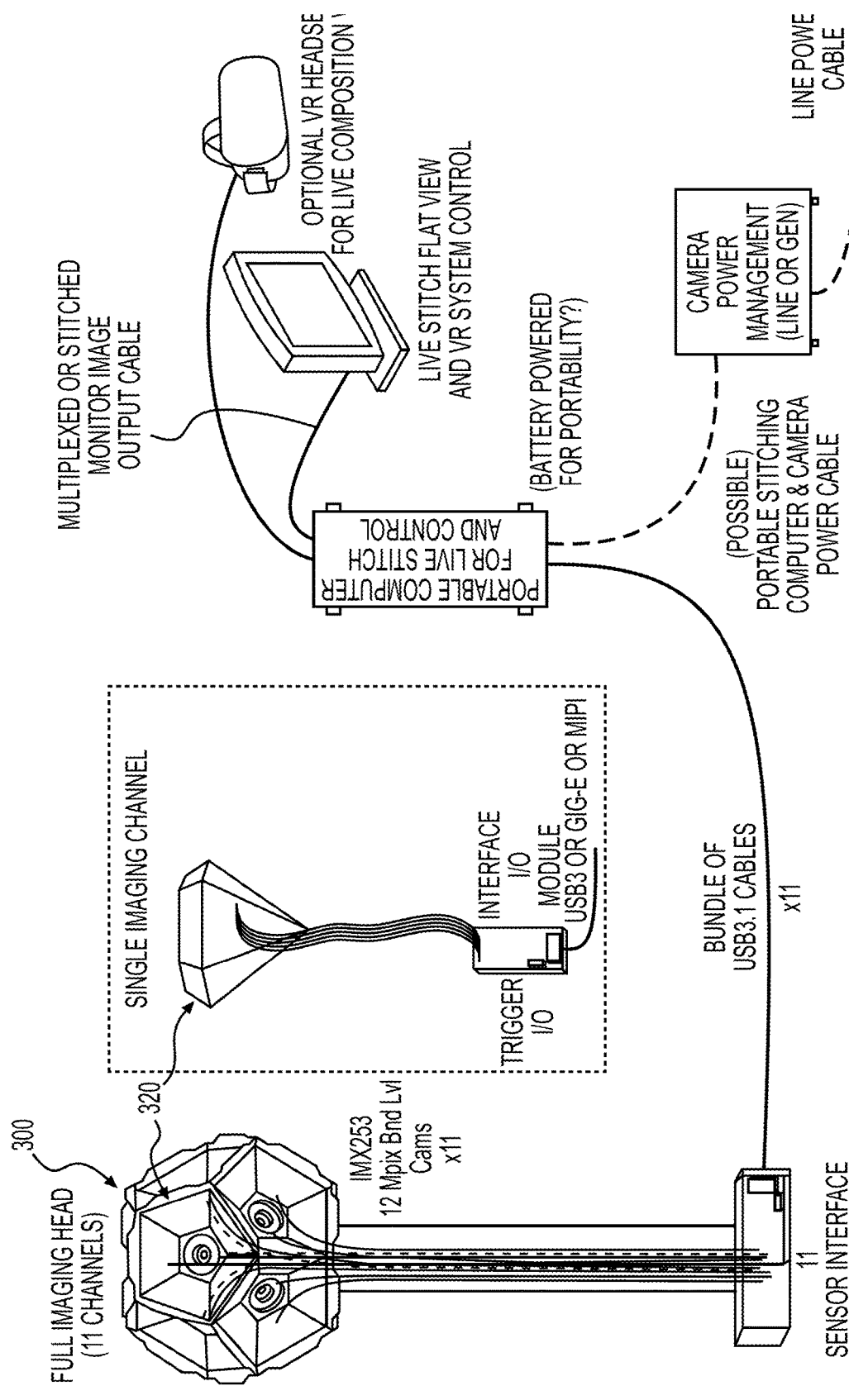
FIG. 15 depicts an electronics system diagram for a multi-camera capture device.

An improved panoramic multi-camera capture device 300, such as that of FIG. 13 and FIG. 15, can have a plurality of cameras arranged around a circumference of a sphere to capture a 360-degree annular FOV. Alternately, a panoramic multi-camera capture device can have a plurality of cameras arranged around a spherical or polyhedral shape. A polyhedron is a three-dimensional solid consisting of a collection of polygons that are contiguous at the edges. One polyhedral shape, as shown in FIG. 4, is that of a dodecahedron 50, which has 12 sides or faces, each shaped as a regular pentagon 55, and 20 vertices or corners (e.g., a vertex 60). A panoramic multi-camera capture device formed to the dodecahedron shape has cameras with a pentagonally shaped outer lens elements that nominally image a 69.1° full width field of view. Another shape is that of a truncated icosahedron, like a soccer ball, which as is also shown in FIG. 4, and has a combination of 12 regular pentagonal sides or faces, 20 regular hexagonal sides or faces, 60 vertices, and 90 edges. More complex shapes, with many more sides, such as regular polyhedra, Goldberg polyhedra, or shapes with octagonal sides, or even some irregular polyhedral shapes, can also be useful. For example, a Goldberg chamfered dodecahedron is similar to the truncated icosahedron, with both pentagonal and hexagonal facets, totaling 42 sides. But in general, the preferred polyhedrons for the current purpose have sides or faces that are hexagonal or pentagonal, which are generally roundish shapes with beveled edges 132 meeting at obtuse corners. Other polyhedral shapes, such as an octahedron or a regular icosahedron can be used, although they have triangular facets. Polyhedral facets with more abrupt or acute corners, such as square or triangular faces, can be easier to fabricate, as compared to facets with pentagonal and or hexagonal facets, as they have fewer edges to cut to provide polygonal edges on the outermost lens element, so as to define a captured polygonal FOV. However, greater care can then be needed in cutting, beveling, and handling the optic because of those acute corners. Additionally, for lens facets with large FOVs and acute facet angles, it can be more difficult to design the camera lenses and camera lens housings for optical and opto-mechanical performance. Typically, a 360° polyhedral camera will not capture a full spherical FOV as at least part of one facet is sacrificed to allow for support features and power and communications cabling, such as via a mounting post. However, if the device communicates wirelessly, and is also hung by a thin cable to a vertex, the FOV lost to such physical connections can be reduced.

As depicted in FIG. 1 and FIG. 2B, a camera channel 120 can resembles a frustum, or a portion thereof, where a frustum is a geometric solid (normally a cone or pyramid) that lies between one or two parallel planes that cut through it. In that context, a fan of chief rays 170 corresponding to a polygonal edge, can be refracted by an outer compressor lens element 137 to nominally match the frustum edges in polyhedral geometries.

To help illustrate some issues relating to camera geometry, FIG. 5A illustrates a cross-sections of a pentagonal lens 175 capturing a pentagonal FOV 177 and a hexagonal lens 180 capturing a hexagonal FOV 182, representing a pair of adjacent cameras whose outer lens elements have pentagonal and hexagonal shapes, as can occur with a truncated icosahedron, or soccer ball type panoramic multi-camera capture devices (e.g., 100, 300). The theoretical hexagonal FOV 182 spans a half FOV of 20.9°, or a full FOV of 41.8°

(□₁) along the sides, although the FOV near the vertices is larger. The pentagonal FOV 177 supports 36.55° FOV (□₂) within a circular region, and larger FOVs near the corners or vertices. Notably, in this cross-section, the pentagonal FOV 177 is asymmetrical, supporting a 20-degree FOV on one side of an optical axis 185, and only a 16.5-degree FOV on the other side of the optical axis.

Optical lenses are typically designed using programs such as ZEMAX or Code V. Design success typically depends, in part, on selecting the best or most appropriate lens parameters, identified as operands, to use in the merit function. This is also true when designing a lens system for an improved low-parallax multi-camera panoramic capture device (300), for which there are several factors that affect performance (including, particularly parallax) and several parameters that can be individually or collectively optimized, so as to control it. One approach targets optimization of the "NP" point, or more significantly, variants thereof.

As background, in the field of optics, there is a concept of the entrance pupil, which is a projected image of the aperture stop as seen from object space, or a virtual aperture which the imaged light rays from object space appear to propagate towards before any refraction by the first lens element. By standard practice, the location of the entrance pupil can be found by identifying a paraxial chief ray from object space 105, that transits through the center of the aperture stop, and projecting or extending its object space direction forward to the location where it hits the optical axis 185. In optics, incident Gauss or paraxial rays are understood to reside within an angular range ≤10° from the optical axis, and correspond to rays that are directed towards the center of the aperture stop, and which also define the entrance pupil position. Depending on the lens properties, the entrance pupil may be bigger or smaller than the aperture stop, and located in front of, or behind, the aperture stop.

By comparison, in the field of low-parallax cameras, there is a concept of a no-parallax (NP) point, or viewpoint center. Conceptually, the "NP Point" has been associated with a high FOV chief ray or principal ray incident at or near the outer edge of the outermost lens element, and projecting or extending its object space direction forward to the location where it hits the optical axis 185. For example, depending on the design, camera channels in a panoramic multi-camera capture device can support half FOVs with non-paraxial chief rays at angles >31° for a dodecahedron type system (FIG. 4) or >20° for a truncated icosahedron type system (see FIG. 4 and FIG. 5A). This concept of the NP point projection has been applied to the design of panoramic multi-camera capture devices, relative to the expectations for chief ray propagation and parallax control for adjacent optical systems (cameras). It is also stated that if a camera is pivoted about the NP point, or a plurality of camera's appear to rotate about a common NP point, then parallax errors will be reduced, and images can be aligned with little or no parallax error or perspective differences. But in the field of low parallax cameras, the NP point has also been equated to the entrance pupil, and the axial location of the entrance pupil that is estimated using a first order optics tangent relationship between a projection of a paraxial field angle and the incident ray height at the first lens element (see FIGS. 2A, 2B).

Thus, confusingly, in the field of designing of low-parallax cameras, the NP point has also been previously associated with both with the projection of edge of FOV chief rays and the projection of chief rays that are within the Gauss or paraxial regime. As will be seen, in actuality, they both have value. In particular, an NP point associated with the paraxial entrance pupil can be helpful in developing initial specifications for designing the lens, and for describing the lens. An NP point associated with non-paraxial edge of field chief rays can be useful in targeting and understanding parallax performance and in defining the conical volume or frustum that the lens assembly can reside in.

The projection of these non-paraxial chief rays can miss the paraxial chief ray defined entrance pupil because of both lens aberrations and practical geometry related factors associated with these lens systems. Relative to the former, in a well-designed lens, image quality at an image plane is typically prioritized by limiting the impact of aberrations on resolution, telecentricity, and other attributes. Within a lens system, aberrations at interim surfaces, including the aperture stop, can vary widely, as the emphasis is on the net sums at the image plane. Aberrations at the aperture stop are often somewhat controlled to avoid vignetting, but a non-paraxial chief ray need not transit the center of the aperture stop or the projected paraxially located entrance pupil.

To expand on these concepts, and to enable the design of improved low parallax lens systems, it is noted that the camera lens system 120 in FIG. 2A depicts both a first NP point 190A, corresponding to the entrance pupil as defined by a vectoral projection of paraxial chief rays from object space 105, and an offset second NP point 190B, corresponding to a vectoral projection of a non-paraxial chief rays from object space. Both of these ray projections cross the optical axis 185 in locations behind both the lens system and the image plane 150. As will be subsequently discussed, the ray behavior in the region between and proximate to the projected points 190A and 190B can be complicated and neither projected location or point has a definitive value or size. A projection of a chief ray will cross the optical axis at a point, but a projection of a group of chief rays will converge towards the optical axis and cross at different locations, that can be tightly clustered (e.g., within a few or tens of microns), where the extent or size of that "point" can depends on the collection of proximate chief rays used in the analysis. Whereas, when designing low parallax imaging lenses that image large FOVs, the axial distance or difference between the NP points 190A and 190B that are provided by the projected paraxial and non-paraxial chief rays can be significantly larger (e.g., millimeters). Thus, as will also be discussed, the axial difference represents a valuable measure of the parallax optimization (e.g., a low parallax volume 188) of a lens system designed for the current panoramic capture devices and applications. As will also be seen, the design of an improved device (300) can be optimized to position the geometric center of the device, or device center 196, outside, but proximate to this low parallax volume 188, or alternately within it, and preferably proximate to a non-paraxial chief ray NP point.

As one aspect, FIG. 5A depicts the projection of the theoretical edge of the fields of view (FOV edges 155), past the outer lens elements (lenses 175 and 180) of two adjacent cameras, to provide lines directed to a common point (190). These lines represent theoretical limits of the complex "conical" opto-mechanical lens assemblies, which typically are pentagonally conical or hexagonally conical limiting volumes. Again, ideally, in a no-parallax multi-camera system, the entrance pupils or NP points of two adjacent cameras are co-located. But to avoid mechanical conflicts, the mechanics of a given lens assembly, including the sensor package, should generally not protrude outside a frustum of a camera system and into the conical space of an adjacent lens assembly. However, real lens assemblies in a multi-camera panoramic capture device are also separated by seams 160. Thus, the real chief rays 170 that are accepted at the lens edges, which are inside of both the mechanical seams and a physical width or clear aperture of a mounted outer lens element (lenses 175 and 180), when projected generally towards a paraxial NP point 190, can land instead at offset NP points 192, and be separated by an NP point offset distance 194.

Figure 5B:
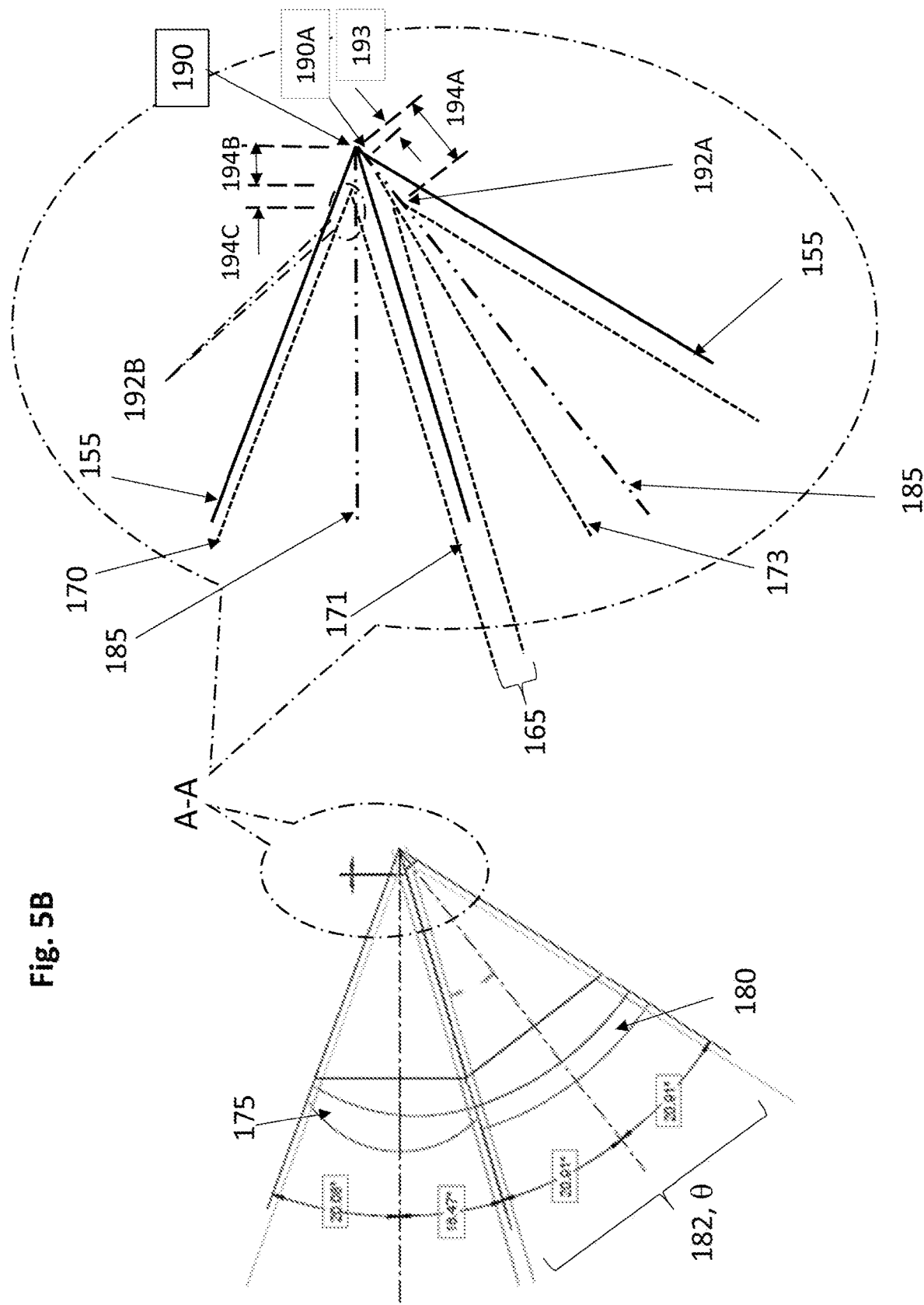

This can be better understood by considering the expanded area A-A in proximity to a nominal or ideal point NP 190, as shown in detail in FIG. 5B. Within a hexagonal FOV 182, light rays that propagate within the Gauss or paraxial region (e.g., paraxial ray 173), and that pass through the nominal center of the aperture stop, can be projected to a nominal NP point 190 (corresponding to the entrance pupil), or to an offset NP point 190A at a small NP point difference or offset 193 from a nominal NP point 190. Whereas, the real hexagonal lens edge chief rays 170 associated with a maximum inscribed circle within a hexagon, can project to land at a common offset NP point 192A that can be at a larger offset distance (194A). The two adjacent cameras in FIGS. 5A,B also may or may not share coincident NP points (e.g., 190). Distance offsets can occur due to various reasons, including geometrical concerns between cameras (adjacent hexagonal and pentagonal cameras), geometrical asymmetries within a camera (e.g., for a pentagonal camera), or from limitations from the practical widths of seams 160, or because of the directionality difference amongst aberrated rays.

As just noted, there are also potential geometric differences in the projection of incident chief rays towards a simplistic nominal "NP point" (190). First, incident imaging light paths from near the corners or vertices or mid-edges (mid-chords) of the hexagonal or pentagonal lenses may or may not project to common NP points within the described range between the nominal paraxial NP point 190 and an offset NP point 192B. Also, as shown in FIG. 5B, just from the geometric asymmetry of the pentagonal lenses, the associated pair of edge chief rays 170 and 171 for the real accepted FOV, can project to different nominal NP points 192B that can be separated from both a paraxial NP point (190) by an offset distance 194B and from each other by an offset distance 194C.

As another issue, during lens design, the best performance typically occurs on axis, or near on axis (e.g., ≤0.3 field (normalized)), near the optical axis 185. In many lenses, good imaging performance, by design, often occurs at or near the field edges, where optimization weighting is often used to force compliance. The worst imaging performance can then occur at intermediate fields (e.g., 0.7-0.8 of a normalized image field height). Considering again FIG. 5A,B, intermediate off axis rays, from intermediate fields (θ) outside the paraxial region, but not as extreme as the edge chief rays (10°<θ<20.9°), can project towards intermediate NP points between a nominal NP point 190 and an offset NP point 192B. But other, more extreme off axis rays, particularly from the 0.7-0.8 intermediate fields, that are more affected by aberrations, can project to NP points at locations that are more or less offset from the nominal NP point 190 than are the edge of field offset NP points 192B. Accounting for the variations in lens design, the non-paraxial offset "NP" points can fall either before (closer to the lens) the paraxial NP point (the entrance pupil) as suggested in FIG. 5B, or after it (as shown in FIG. 2A).

Figure 5C:
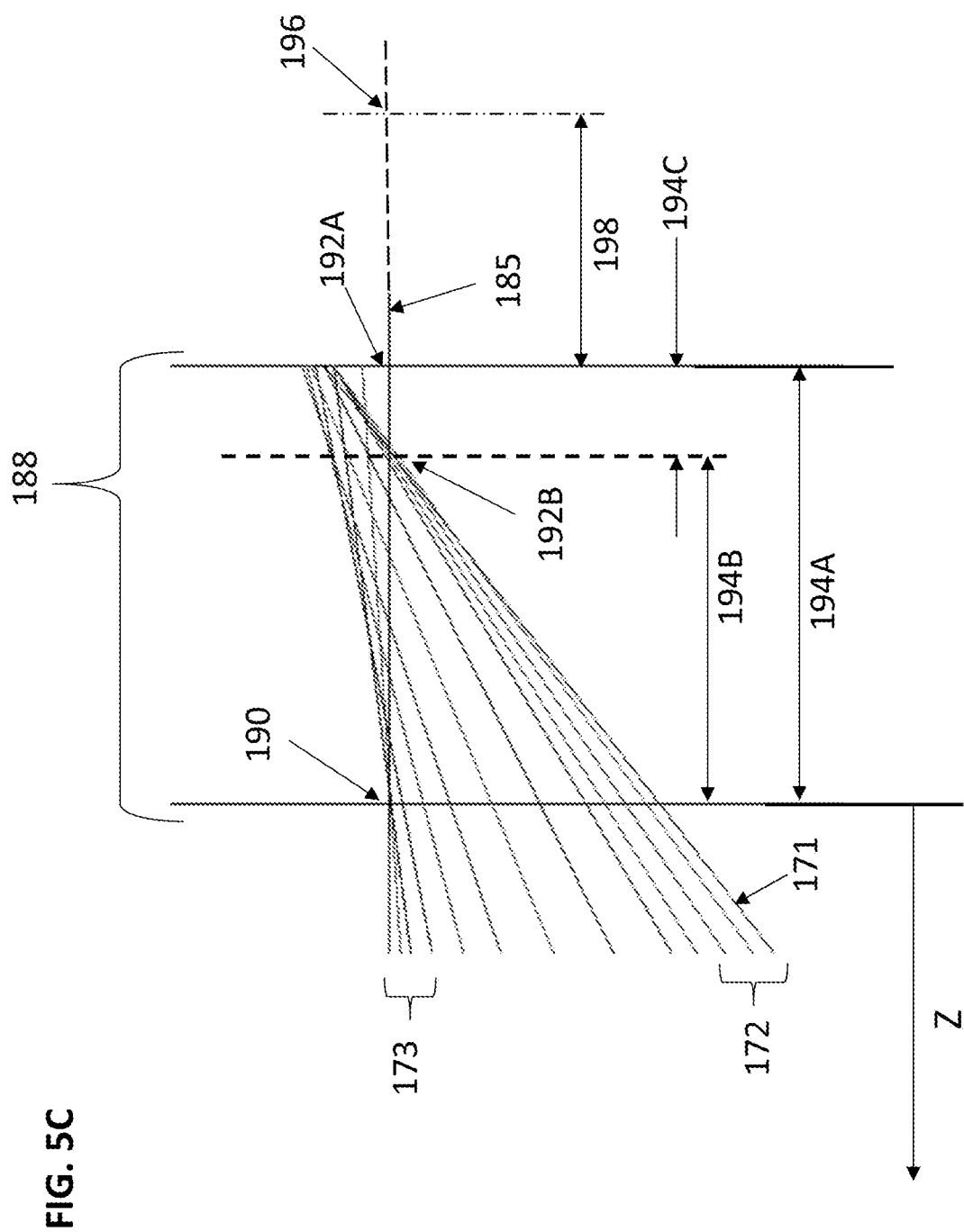
FIG. 5C depicts an example of a low parallax (LP) volume located near both a paraxial NP point or entrance pupil and a device center.

This is shown in greater detail in FIG. 5C, which essentially illustrates a further zoomed-in region A-A of FIG. 5B, but which illustrates an impact from vectoral projected ray paths associated with aberrated image rays, that converge at and near the paraxial entrance pupil (190), for an imaging lens system that was designed and optimized using the methods of the present approach. In FIG. 5C, the projected ray paths of green aberrated image rays at multiple fields from a camera lens system converge within a low parallax volume 188 near one or more "NP" points. Similar illustrations of ray fans can also be generated for Red or Blue light. The projection of paraxial rays 173 can converge at or near a nominal paraxial NP point 190, or entrance pupil, located on a nominal optical axis 185 at a distance Z behind the image plane 150. The projection of edge of field rays 172, including chief rays 171, converge at or near an offset NP point 192B along the optical axis 185. The NP point 192B can be quantitatively defined, for example, as the center of mass of all edge of field rays 172. An alternate offset NP point 192A can be identified, that corresponds to a "circle of least confusion", where the paraxial, edge, and intermediate or mid-field rays, aggregate to the smallest spot. These different "NP" points are separated from the paraxial NP point by offset distances 194A and 194B, and from each other by an offset distance 194C. Thus, it can be understood that an aggregate "NP point" for any given real imaging lens assembly or camera lens that supports a larger than paraxial FOV, or an asymmetrical FOV, is typically not a point, but instead can be an offset low parallax (LP) smudge or volume 188.

Within a smudge or low parallax volume 188, a variety of possible optimal or preferred NP points can be identified. For example, an offset NP point corresponding to the edge of field rays 172 can be emphasized, so as to help provide improved image tiling. An alternate mid-field (e.g., 0.6-0.8) NP point (not shown) can also be tracked and optimized for. Also the size and position of the overall "LP" smudge or volume 188, or a preferred NP point (e.g., 192B) therein, can change depending on the lens design optimization. Such parameters can also vary amongst lenses, for one fabricated lens system of a given design to another, due to manufacturing differences amongst lens assemblies. Although FIG. 5C depicts these alternate offset "NP points" 192A,B for non-paraxial rays as being located after the paraxial NP point 190, or further away from the lens and image plane, other lenses of this type, optimized using the methods of the present approach, can be provided where similar non-paraxial NP points 192A,B that are located with a low parallax volume 188 can occur at positions between the image plane and the paraxial NP point.

FIG. 5C also shows a location for a center of the low-parallax multi-camera panoramic capture device, device center 196. Based on optical considerations, an improved panoramic multi-camera capture device 300 can be preferably optimized to nominally position the device center 196 within the low parallax volume 188. Optimized locations therein can include being located at or proximate either of the offset NP points 192A or 192B, or within the offset distance 194B between them, so as to prioritize parallax control for the edge of field chief rays. The actual position therein depends on parallax optimization, which can be determined by the lens optimization relative to spherical aberration of the entrance pupil, or direct chief ray constraints, or distortion, or a combination thereof. For example, whether the spherical aberration is optimized to be over corrected or under corrected, and how weightings on the field operands in the merit function are used, can affect the positioning of non-paraxial "NP" points for peripheral fields or mid fields. The "NP" point positioning can also depend on the management of fabrication tolerances and the residual variations in lens system fabrication. The device center 196 can also be located proximate to, but offset from the low parallax volume 188, by a center offset distance 198. This approach can also help tolerance management and provide more space near the device center 196 for cables, circuitry, cooling hardware, and the associated structures. In such case, the adjacent cameras 120 can then have offset low parallax volumes 188 of "NP" points (FIG. 5D), instead of coincident ones (FIGS. 5A, B). In this example, if the device center 196 is instead located at or proximate to the paraxial entrance pupil, NP point 190, then effectively one or more of the outer lens elements 137 of the cameras 120 are undersized and the desired full FOVs are not achievable. FIG. 13B depicts the possible positioning of a similar lens system 920 with respect to an offset device center 910.

Thus, while the no-parallax (NP) point is a useful concept to work towards, and which can valuably inform panoramic image capture and systems design, and aid the design of low-parallax error lenses, it is idealized, and its limitations must also be understood. Considering this discussion of the NP point(s) and LP smudges, in enabling an improved low-parallax multi-camera panoramic capture device (lens design example to follow; device 300 of FIG. 13A), it is important to understand ray behavior in this regime, and to define appropriate parameters or operands to optimize, and appropriate target levels of performance to aim for. In the latter case, for example, a low parallax lens with a track length of 65-70 mm can be designed for in which the LP smudge is as much as 10 mm wide (e.g., offset distance 194A). But alternate lens designs, for which this parameter is further improved, can have a low parallax volume 188 with a longitudinal LP smudge width or width along the optical axis (offset 194A) of a few millimeters or less.

The width and location of the low parallax volume 188, and the vectoral directions of the projections of the various chief rays, and their NP point locations within a low parallax volume, can be controlled during lens optimization by a method using operands associated with a fan of chief rays 170 (e.g., FIGS. 2A,B). But the LP smudge or LP volume 188 of FIG. 5C can also be understood as being a visualization of the transverse component of spherical aberration of the entrance pupil, and this parameter can be used in an alternate, but equivalent, design optimization method to using chief ray fans. In particular, during lens optimization, using Code V for example, the lens designer can create a special user defined function or operand for the transverse component (e.g., ray height) of spherical aberration of the entrance pupil, which can then be used in a variety of ways. For example, an operand value can be calculated as a residual sum of squares (RSS) of values across the whole FOV or across a localized field, using either uniform or non-uniform weightings on the field operands. In the latter case of localized field preferences, the values can be calculated for a location at or near the entrance pupil, or elsewhere within a low parallax volume 188, depending on the preference towards paraxial, mid, or peripheral fields. An equivalent operand can be a width of a circle of least confusion in a plane, such as the plane of offset NP point 192A or that of offset NP 192B, as shown in FIG. 5C. The optimization operand can also be calculated with a weighting to reduce or limit parallax error non-uniformly across fields, with a disproportionate weighting favoring peripheral or edge fields over mid-fields. Alternately, the optimization operand can be calculated with a weighting to provide a nominally low parallax error in a nominally uniform manner across all fields (e.g., within or across a Core FOV 205, as in FIG. 7). That type of optimization may be particularly useful for mapping applications.

Whether the low-parallax lens design and optimization method uses operands based on chief rays or spherical aberration of the entrance pupil, the resulting data can also be analyzed relative to changes in imaging perspective. In particular, parallax errors versus field and color can also be analyzed using calculations of the Center of Perspective (COP), which is a parameter that is more directly relatable to visible image artifacts than is a low parallax volume, and which can be evaluated in image pixel errors or differences for imaging objects at two different distances from a camera system. The center of perspective error is essentially the change in a chief ray trajectory given multiple object distances—such as for an object at a close distance (3 ft), versus another at "infinity."

In drawings and architecture, perspective, is the art of drawing solid objects on a two-dimensional surface so as to give a correct impression of their height, width, depth, and position in relation to each other when viewed from a particular point. For example, for illustrations with linear or point perspective, objects appear smaller as their distance from the observer increases. Such illustrated objects are also subject to foreshortening, meaning that an object's dimensions along the line of sight appear shorter than its dimensions across the line of sight. Perspective works by representing the light that passes from a scene through an imaginary rectangle (realized as the plane of the illustration), to a viewer's eye, as if the viewer were looking through a window and painting what is seen directly onto the windowpane.

Perspective is related to both parallax and stereo perception. In a stereoscopic image capture or projection, with a pair of adjacent optical systems, perspective is a visual cue, along with dual view parallax, shadowing, and occlusion, that can provide a sense of depth. As noted previously, parallax is the visual perception that the position or direction of an object appears to be different when viewed from different positions. In the case of image capture by a pair of adjacent cameras with at least partially overlapping fields of view, parallax image differences are a cue for stereo image perception, or are an error for panoramic image assembly.

To capture images with an optical system, whether a camera or the human eye, the optical system geometry and performance impacts the utility of the resulting images for low parallax (panoramic) or high parallax (stereo) perception. In particular, for an ideal lens, all the chief rays from object space point exactly towards the center of the entrance pupil, and the entrance pupil is coincident with the center of perspective (COP) or viewpoint center for the resulting images. There are no errors in perspective or parallax for such an ideal lens.

But for a real lens, having both physical and image quality limitations, residual parallax errors can exist. As stated previously, for a real lens, a projection of the paraxial chief rays from the first lens element, will point towards a common point, the entrance pupil, and its location can be determined as an axial distance from the front surface of that first element. Whereas, for a real lens capturing a FOV large enough to include non-paraxial chief rays, the chief rays in object space can point towards a common location or volume near, but typically offset from, the center of the entrance pupil. These chief rays do not intrinsically coincide at a single point, but they can be directed through a small low parallax volume 188 (e.g., the LP "smudge") by appropriate lens optimization. The longitudinal or axial variation of rays within the LP smudge can be determined from the position a chief ray crosses the optic axis. The ray errors can also be measured as a transverse width or axial position of the chief rays within an LP smudge.

Figure 5D:
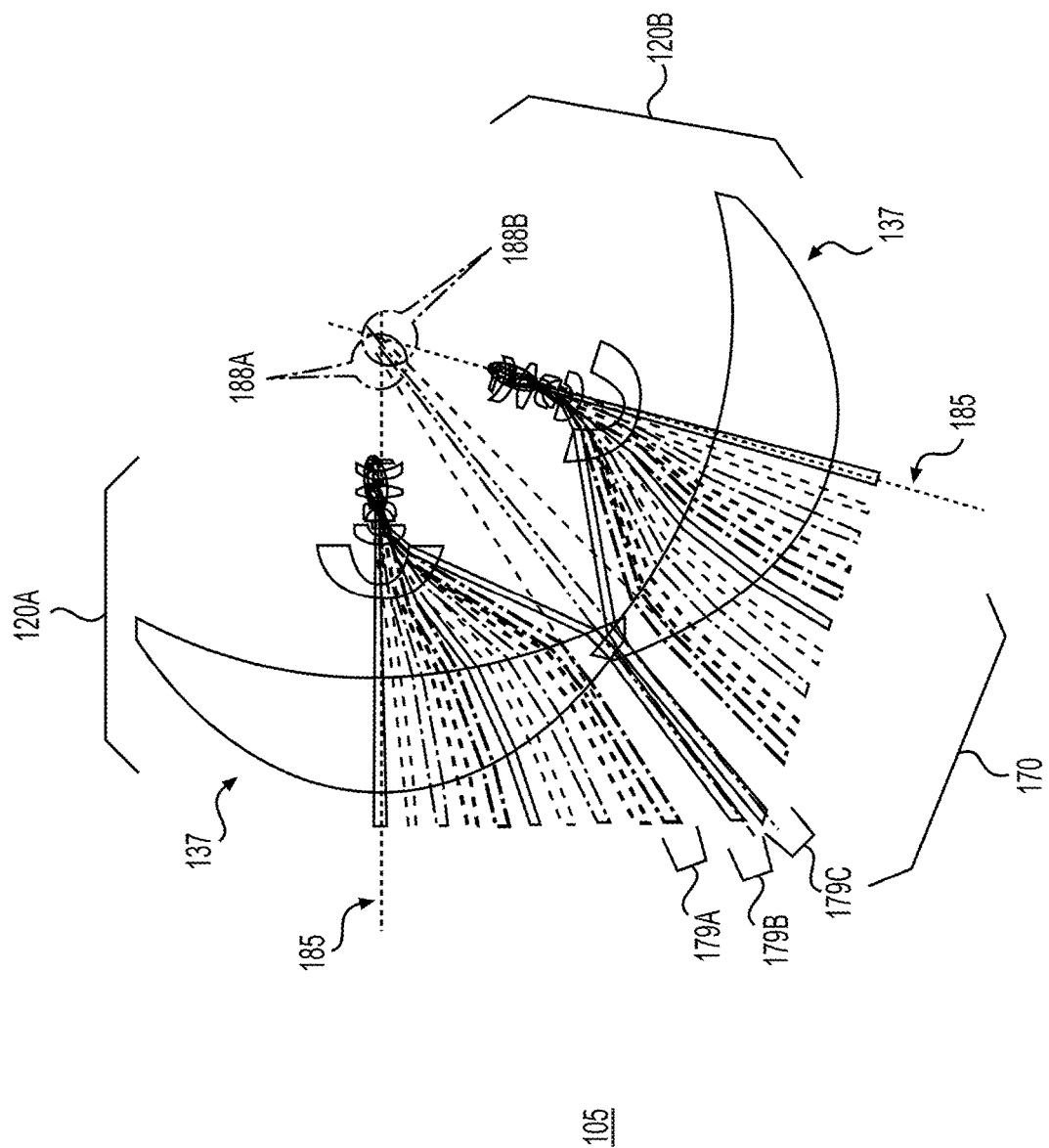
FIG. 5D depicts parallax differences for two adjacent cameras, relative to a center of perspective.

The concept of parallax correction, with respect to centers of perspective, is illustrated in FIG. 5D. A first camera lens 120A collects and images light from object space 105 into at least a Core FOV, including light from two outer ray fans 179A and 179B, whose chief ray projections converge towards a low parallax volume 188A. These ray fans can correspond to a group of near edge or edge of field rays 172, as seen in FIG. 2B or FIG. 5C. As was shown in FIG. 5C, within an LP volume 188, the vectoral projection of such rays from object space, generally towards image space, can cross the optical axis 185 beyond the image plane, at or near an alternate NP point 192B that can be selected or preferred because it favors edge of field rays. However, as is also shown in FIG. 5C, such edge of field rays 172 need not cross the optical axis 185 at exactly the same point. Those differences, when translated back to object space 105, translate into small differences in the parallax or perspective for imaged ray bundles or fans within or across an imaged FOV (e.g., a Core FOV 205, as in FIG. 7) of a camera lens.

A second, adjacent camera lens 120B, shown in FIG. 5D, can provide a similar performance, and image a fan of chief rays 170, including ray fan 179C, from within a Core FOV 205 with a vectoral projection of these chief rays converging within a corresponding low parallax volume 188B. LP volumes 188A and 188B can overlap or be coincident, or be offset, depending on factors including the camera geometries and the seams between adjacent cameras, or lens system fabrication tolerances and compensators, or on whether the device center 196 is offset from the LP volumes 188. The more overlapped or coincident these LP volumes 188 are, the more overlapped are the centers of perspective of the two lens systems. Ray Fan 179B of camera lens 120A and ray fan 179C of camera lens 120B are also nominally parallel to each other; e.g., there is no parallax error between them. However, even if the lens designs allow very little residual parallax errors at the FOV edges, fabrication variations between lens systems can increase the differences.

Analytically, the chief ray data from a real lens can also be expressed in terms of perspective error, including chromatic errors, as a function of field angle. Perspective error can then be analyzed as a position error at the image between two objects located at different distances or directions. Perspective errors can depend on the choice of COP location, the angle within the imaged FOV, and chromatic errors. For example, it can be useful to prioritize a COP so as to minimize green perspective errors. Perspective differences or parallax errors can be reduced by optimizing a chromatic axial position (Dz) or width within an LP volume 188 related to a center of perspective for one or more field angles within an imaged FOV. The center of perspective can also be graphed and analyzed as a family of curves, per color, of the Z (axial) intercept position (distance in mm) versus field angle. Alternately, to get a better idea of what a captured image will look like, the COP can be graphed and analyzed as a family of curves for a camera system, as a parallax error in image pixels, per color, versus field.

Figure 7:
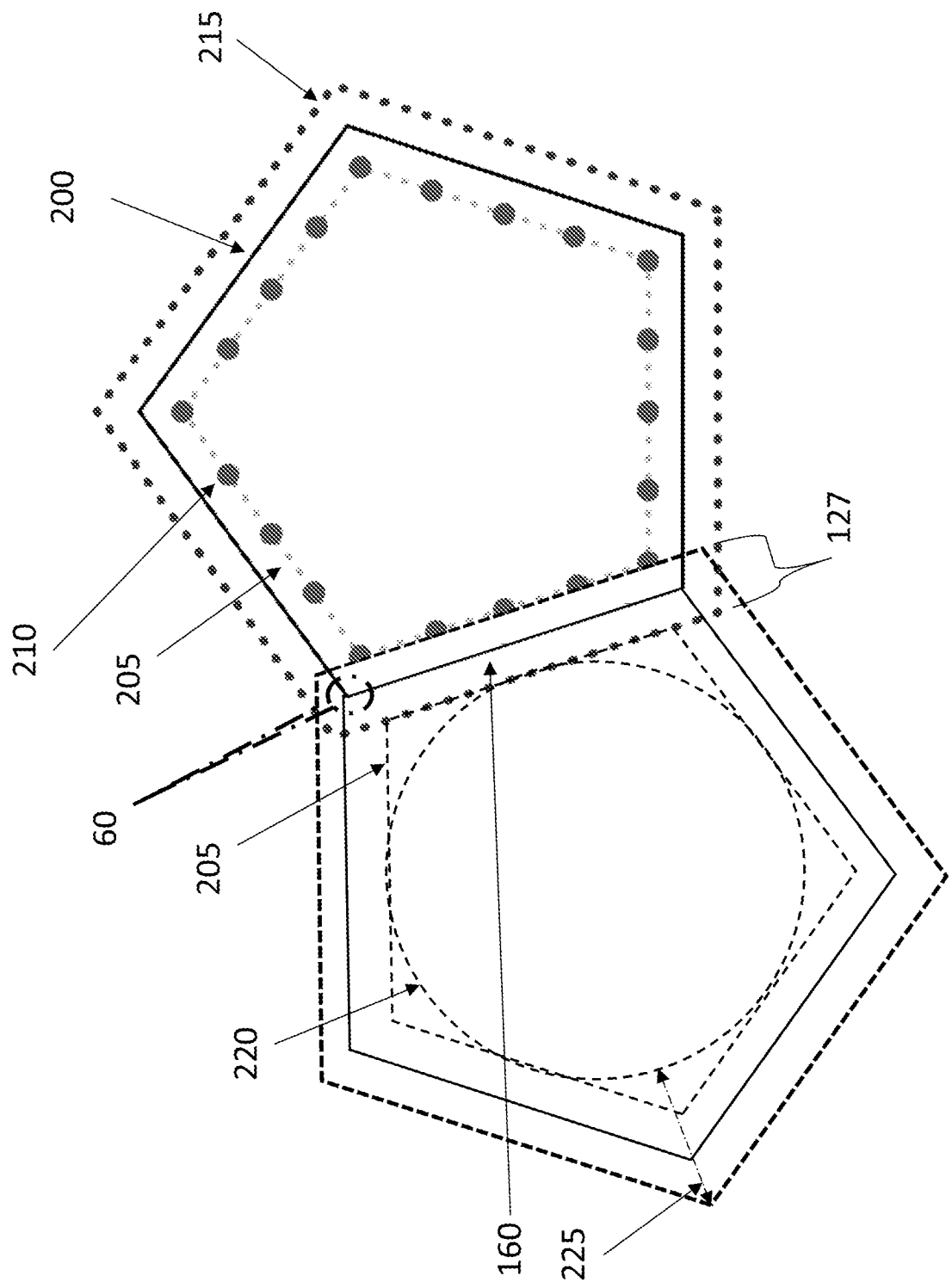
FIG. 7 depicts fields of view for adjacent cameras, including both Core and Extended fields of view (FOV), both of which can be useful for the design of an optimized panoramic multi-camera capture device.

During the design or a camera lens systems, a goal can be to limit the parallax error to a few pixels or less for imaging within a Core FOV 205 (FIG. 7). Alternately, it can be preferable to particularly limit parallax errors in the peripheral fields, e.g., for the outer edges of a Core FOV and for an Extended FOV region (if provided). If the residual parallax errors for a camera are thus sufficiently small, then the parallax differences seen as a perspective error between two adjacent cameras near their shared seam 160, or within a seam related region of extended FOV overlap imaging, can likewise be limited to several pixels or less (e.g., ≤3-4 pixels). Depending on the lens design, device design, and application, it can be possible and preferable to reduce parallax errors for a lens system further, as measured by perspective error, to ≤0.5 pixel for an entire Core FOV, the peripheral fields, or both. If these residual parallax errors for each of two adjacent cameras are small enough, images can be acquired, cropped, and readily tiled, while compensating for or hiding image artifacts from any residual seams 160 or blind regions 165.

In pursuing the design of a panoramic camera of the type of that of FIG. 1, but to enable an improved low-parallax multi-camera panoramic capture device (300), having multiple adjacent cameras, the choices of lens optimization methods and parameters can be important. A camera lens 120, or system of lens elements 135, like that of FIG. 2A, can be used as a starting point. The camera lens has compressor lens element(s), and inner lens elements 140, the latter of which can also be defined as consisting of a pre-stop wide angle lens group, and a post-stop eyepiece-like lens group. In designing such lenses to reduce parallax errors, it can be valuable to consider how a fan of paraxial to non-paraxial chief rays 125 (see FIG. 2A), or a fan of edge chief rays 170 (see FIG. 2B), or localized collections of edge of field rays 172 (see FIG. 5C) or 179 A,B (see FIG. 5D) are imaged by a camera lens assembly. It is possible to optimize the lens design by using a set of merit function operands for a collection or set (e.g., 31 defined rays) of chief rays, but the optimization process can then become cumbersome. As an alternative, in pursuing the design of an improved low-parallax multi-camera panoramic capture device (300), it was determined that improved performance can also be obtained by using a reduced set of ray parameters or operands that emphasizes the transverse component of spherical aberration at the entrance pupil, or at a similar selected surface or location (e.g., at an offset NP point 192A or 192B) within an LP smudge volume 188 behind the lens system. Optimization for a transverse component of spherical aberration at an alternate non-paraxial entrance pupil can be accomplished by using merit function weightings that emphasize the non-paraxial chief rays.

As another aspect, in a low-parallax multi-camera panoramic capture device, the fans of chief rays 170 that are incident at or near a beveled edge of an outer lens element of a camera 120 (see FIG. 2B) should be parallel to a fan of chief rays 170 that are incident at or near an edge 132 of a beveled surface of the outer lens element of an adjacent camera (see FIG. 1). It is noted that an "edge" of an outer lens element 137 or compressor lens is a 3-dimensional structure (see FIG. 2B), that can have a flat edge cut through a glass thickness, and which is subject to fabrication tolerances of that lens element, the entire lens assembly, and housing 130, and the adjacent seam 160 and its structures. The positional definition of where the beveled edges are cut into the outer lens element depends on factors including the material properties, front color, distortion, parallax correction, tolerances, and an extent of any extra extended FOV 215. An outer lens element 137 becomes a faceted outer lens element when beveled edges 132 are cut into the lens, creating a set of polygonal shaped edges that nominally follow a polygonal pattern (e.g., pentagonal or hexagonal).

A camera system 120 having an outer lens element with a polygonal shape that captures incident light from a polygonal shaped field of view can then form a polygonal shaped image at the image plane 150, wherein the shape of the captured polygonal field of view nominally matches the shape of the polygonal outer lens element. The cut of these beveled edges for a given pair of adjacent cameras can affect both imaging and the optomechanical construction at or near the intervening seam 160.

Figure 5E:
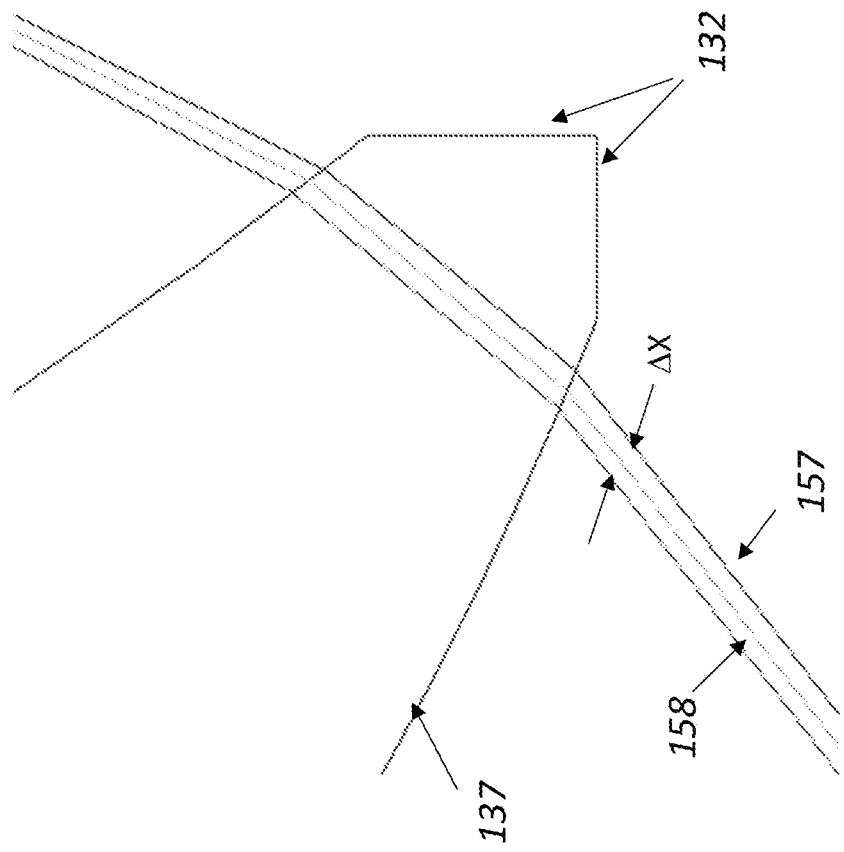
FIG. 5E depicts front color at an edge of an outer compressor lens element.

As another aspect, FIG. 5E depicts "front color", which is a difference in the nominal ray paths by color versus field, as directed to an off axis or edge field point. Typically, for a given field point, the blue light rays are the furthest offset. As shown in FIG. 5E, the accepted blue ray 157 on a first lens element 137 is DX≈1 mm further out than the accepted red ray 158 directed to the same image field point. If the lens element 137 is not large enough, then this blue light can be clipped or vignetted and a color shading artifact can occur at or near the edges of the imaged field. Front color can appear in captured image content as a narrow rainbow-like outline of the polygonal FOV or the polygonal edge of an outer compressor lens element 437 which acts as a field stop for the optical system. Localized color transmission differences that can cause front color related color shading artifacts near the image edges can be caused by differential vignetting at the beveled edges of the outer compressor lens element 137, or from edge truncation at compressor lens elements 438 (FIG. 13A), or through the aperture stop 145. During lens design optimization to provide an improved camera lens (320), front color can be reduced (e.g., to DX≤0.5 mm width) as part of the chromatic correction of the lens design, including by glass selection within the compressor lens group or the entire lens design, or as a trade-off in the correction of lateral color. The effect of front color on captured images can also be reduced optomechanically, by designing an improved camera lens (320) to have an extended FOV 215 (FIG. 7), and also the opto-mechanics to push straight cut or beveled lens edges 132 at or beyond the edge of the extended FOV 215, so that any residual front color occurs outside the core FOV 220. The front color artifact can then be eliminated during an image cropping step during image processing. The impact of front color or lateral color can also be reduced by a spatially variant color correction during image processing. As another option, an improved camera lens (320) can have a color dependent aperture at or near the aperture stop, that can, for example, provide a larger transmission aperture (diameter) for blue light than for red or green light.

Optical performance at or near the seams can be understood, in part, relative to distortion (FIG. 6) and a set of defined fields of view (FIG. 7). In particular, FIG. 7 depicts potential sets of fields of view for which potential image light can be collected by two adjacent cameras. As an example, a camera with a pentagonally shaped outer lens element, whether associated with a dodecahedron or truncated icosahedron or other polygonal lens camera assembly, with a seam 160 separating it from an adjacent lens or camera channel, can image an ideal FOV 200 that extends out to the vertices (60) or to the polygonal edges of the frustum or conical volume that the lens resides in. However, because of the various physical limitations that can occur at the seams, including the finite thicknesses of the lens housings, the physical aspects of the beveled lens element edges, mechanical wedge, and tolerances, a smaller core FOV 205 of transiting image light can actually be imaged. The coated clear aperture for the outer lens elements 137 should encompass at least the core FOV 205 with some margin (e.g., 0.5-1.0 mm). As the lens can be fabricated with AR coatings before beveling, the coatings can extend out to the seams. The core FOV 205 can be defined as the largest low parallax field of view that a given real camera 120 can image. Equivalently, the core FOV 205 can be defined as the sub-FOV of a camera channel whose boundaries are nominally parallel to the boundaries of its polygonal cone (see FIGS. 5A and 5B). Ideally, with small seams 160, and proper control and calibration of FOV pointing, the nominal Core FOV 205 approaches or matches the ideal FOV 200 in size.

During a camera alignment and calibration process, a series of image fiducials 210 can be established along one or more of the edges of a core FOV 205 to aid with image processing and image tiling or mosaicing. The resulting gap between a core FOV 205 supported by a first camera and that supported by an adjacent camera can result in blind regions 165 (FIG. 5A, B). To compensate for the blind regions 165, and the associated loss of image content from a scene, the cameras can be designed to support an extended FOV 215, which can provide enough extra FOV to account for the seam width and tolerances, or an offset device center 196. As shown in FIG. 7, the extended FOV 215 can extend far enough to provide overlap 127 with an edge of the core FOV 205 of an adjacent camera, although the extended FOVs 215 can be larger yet. This limited image overlap can result in a modest amount of image resolution loss, parallax errors, and some complications in image processing as were previously discussed with respect to FIG. 3, but it can also help reduce the apparent width of seams and blind regions. However, if the extra overlap FOV is modest (e.g., ≤5%) and the residual parallax errors therein are small enough (e.g. ≤0.75 pixel perspective error), as provided by the present approach, then the image processing burden can be very modest. Image capture out to an extended FOV 215 can also be used to enable an interim capture step that supports camera calibration and image corrections during the operation of an improved panoramic multi-camera capture device 300. FIG. 7 also shows an inscribed circle within one of the FOV sets, corresponding to a subset of the core FOV 205, that is the common core FOV 220 that can be captured in all directions from that camera. The angular width of the common core FOV 220 can be useful as a quick reference for the image capacity of a camera. An alternate definition of the common core FOV 220 that is larger, to include the entire core FOV 205, can also be useful. The dashed line (225) extending from the common core FOV 220 or core FOV 205, to beyond the ideal FOV 200, to nominally include the extended FOV 215, represents a region in which the lens design can support careful mapping of the chief or principal rays or control of spherical aberration of the entrance pupil, so as to enable low-parallax error imaging and easy tiling of images captured by adjacent cameras.

Across a seam 160 spanning the distance between two adjacent usable clear apertures between two adjacent cameras, to reduce parallax and improve image tiling, it can be advantageous if the image light is captured with substantial straightness, parallelism, and common spacing over a finite distance. The amount of FOV overlap needed to provide an extended FOV and limit blind regions can be determined by controlling the relative proximity of the entrance pupil (paraxial NP point) or an alternate preferred plane within a low parallax volume 188 (e.g., to emphasize peripheral rays) to the device center 196 (e.g., to the center of a dodecahedral shape). The amount of Extended FOV 215 is preferably 5% or less (e.g., ≤1.8° additional field for a nominal Core FOV of 37.5°), such that a camera's peripheral fields are then, for example, ~0.85-1.05). If spacing constraints at the device center, and fabrication tolerances, are well managed, the extended FOV 215 can be reduced to ≤1% additional field. Within an extended FOV 215, parallax should be limited to the nominal system levels, while both image resolution and relative illumination remain satisfactory. The parallax optimization to reduce parallax errors can use either chief ray or pupil aberration constraints, and targeting optimization for a high FOV region (e.g., 0.85-1.0 field), or beyond that to include the extra camera overlap regions provided by an extended FOV 215 (e.g., FIG. 7, a fractional field range of ~0.85-1.05).

In addition, in enabling an improved low-parallax multi-camera panoramic capture device (300), with limited parallax error and improved image tiling, it can be valuable to control image distortion for image light transiting at or near the edges of the FOV, e.g., the peripheral fields, of the outer lens element. In geometrical optics, distortion is a deviation from a preferred condition (e.g., rectilinear projection) that straight lines in a scene remain straight in an image. It is a form of optical aberration, which describes how the light rays from a scene are mapped to the image plane. In general, in lens assemblies used for image capture, for human viewing it is advantageous to limit image distortion to a maximum of +/−2%. In the current application, for tiling or combining panoramic images from images captured by adjacent cameras, having a modest distortion of ≤2% can also be useful. As a reference, in barrel distortion, the image magnification decreases with distance from the optical axis, and the apparent effect is that of an image which has been mapped around a sphere (or barrel). Fisheye lenses, which are often used to take hemispherical or panoramic views, typically have this type of distortion, as a way to map an infinitely wide object plane into a finite image area. Fisheye lens distortion (251) can be large (e.g., 15% at full field or 90° half width (HW)), as a deviation from f-theta distortion, although it is only a few percent for small fields (e.g., ≤30° HW). As another example, in laser printing or scanning systems, f-theta imaging lenses are often used to print images with minimal banding artifacts and image processing corrections for pixel placement. In particular, F-theta lenses are designed with a barrel distortion that yields a nearly constant spot or pixel size, and a pixel positioning that is linear with field angle θ, (h=f*θ).

Thus, improved low-parallax cameras 320 that capture half FOVs of ≤35-40° might have fisheye distortion 251, as the distortion may be low enough. However, distortion can be optimized more advantageously for the design of improved camera lens assemblies for use in improved low-parallax multi-camera panoramic capture devices (300). As a first example, as shown in FIG. 6, it can be advantageous to provide camera lens assemblies with a localized nominal f-theta distortion 250A at or near the edge of the imaged field. In an example, the image distortion 250 peaks at ~0.75 field at about 1%, and the lens design is not optimized to provide f-theta distortion 250 below ~0.85 field. However, during the lens design process, a merit function can be constrained to provide a nominally f-theta like distortion 250A or an approximately flat distortion 250B, for the imaged rays at or near the edge of the field, such as for peripheral fields spanning a fractional field range of ~0.9-1.0. This range of high fields with f-theta type or flattened distortion correction includes the fans of chief rays 170 or perimeter rays of FIG. 2B, including rays imaged through the corners or vertices 60, such as those of a lens assembly with a hexagonal or pentagonal outer lens element 137. Additionally, because of manufacturing tolerances and dynamic influences (e.g., temperature changes) that can apply to a camera 120, including both lens elements 135 and a housing 130, and to a collection of cameras 120 in a panoramic multi-camera capture device, it can be advantageous to extend the region of nominal f-theta or flattened distortion correction in peripheral fields to beyond the nominal full field (e.g., 0.85-1.05). This is shown in FIG. 6, where a region of reduced or flattened distortion extends beyond full field to ~1.05 field. In such a peripheral field range, it can be advantageous to limit the total distortion variation to ≤0.5% or less. Controlling peripheral field distortion keeps the image "edges" straight in the adjacent pentagonal shaped regions. This can allow more efficient use of pixels when tiling images, and thus faster image processing.

The prior discussion treats distortion in a classical sense, as an image aberration at an image plane. However, in low-parallax cameras, this residual distortion is typically a tradeoff or nominal cancelation of contributions from the compressor lens elements (137, or 437 and 438 in FIG. 13A) versus those of the aggregate inner lens elements (140, or 440 in FIG. 13A). Importantly, the ray re-direction caused by the distortion contribution of the outer compressor lens element also affects both the imaged ray paths and the projected chief ray paths towards the low parallax volume. This in turn means that for the design of at least some low-parallax lenses, distortion optimization can affect parallax or edge of field NP point or center of perspective optimization.

The definitions of the peripheral fields or a fractional field range 225 of (e.g., ~0.85-1.05, or including ≤5% extra field), in which parallax, distortion, relative illumination, resolution, and other performance factors can be carefully optimized to aid image tiling, can depend on the device and camera geometries. As an example, for hexagonal shaped lenses and fields, the lower end of the peripheral fields can be defined as ~0.83, and for pentagonal lenses, ~0.8. Although FIG. 7 was illustrated for a case with two adjacent pentagon-shaped outer lens elements and FOV sets, the approach of defining peripheral fields and Extended FOVs to support a small region of overlapped image capture, can be applied to multi-camera capture device designs with adjacent pentagonal and hexagonal cameras, or to adjacent hexagonal cameras, or to cameras with other polygonal shapes or with adjacent edges of any shape or contour generally.

For an Extended FOV 215 to be functionally useful, the nominal image formed onto an image sensor that corresponds to a core FOV 205 needs to underfill the used image area of the image sensor, by at least enough to allow an extended FOV 215 to also be imaged. This can be done to help account for real variations in fabricated lens assemblies from the ideal, or for the design having an offset device center 196, as well as fabrication variations in assembling an improved low-parallax multi-camera panoramic capture device (300). But as is subsequently discussed, prudent mechanical design of the lens assemblies can impact both the imaged field of view of a given camera and the seams between the cameras, to limit mechanical displacements or wedge and help reduce parallax errors and FOV overlap or underlap. Likewise, tuning the image FOV (core FOV 205) size and position with compensators or with fiducials and image centroid tracking and shape tracking can help. Taken together in some combination, optimization of distortion and low or zero parallax imaging over extended peripheral fields, careful mechanical design to limit and compensate for component and assembly variations, and the use of corrective fiducials or compensators, can provide a superior overall systems solution. As a result, a captured image from a camera can readily be cropped down to the nominal size and shape expected for the nominal core FOV 205, and images from multiple cameras can then be mosaiced or tiled together to form a panoramic image, with reduced burdens on image post-processing. However, an extended FOV 215, if needed, should provide enough extra angular width (e.g., $q_1 \leq 5\%$ of the FOV) to match or exceed the expected wedge or tilt angle $q_2$, that can occur in the seams, $q_1 \geq q_2$.

In designing an improved imaging lens of the type that can be used in a low-parallax panoramic multi-camera capture device (100 or 300), several first order parameters can be calculated so as to inform the design effort. A key parameter is the target size of the frustum or conical volume, based on the chosen polygonal configuration (lens size (FOV) and lens shape (e.g., pentagonal)) and the sensor package size. Other key parameters that can be estimated include the nominal location of the paraxial entrance pupil, the focal lengths of the compressor lens group and the wide-angle lens group, and the FOV seen by the wide-angle group.

But the design optimization for an improved camera lens (320) for use in an improved low-parallax panoramic multi-camera capture devices (300) also depends on how the numerous other lens attributes and performance metrics are prioritized. In particular, the relevant system parameters can include the control of parallax or the center of perspective (COP) error at the edges of an imaged field or for inner field locations or both, as optimized using fans of chief rays or spherical aberration of the entrance pupil). These parameters are closely linked with other key parameters including the width and positions of the "LP smudge" or volume 188, the size of any center offset distance between the entrance pupil or LP smudge and the device center 196, the target width of the gaps or seams, the extent of blind regions 165, and the size of any marginal or extended FOV to provide overlap. The relevant performance metrics can include image resolution or MTF, distortion (particularly in the peripheral fields, and distortion of the first compressor lens element and of the compressor lens group), lateral color, relative illumination, front color, and color vignetting, telecentricity, and ghosting. Other relevant design variables can include mechanical and materials parameters such as the number of compressor lens elements, the configuration of the compressor lens group, the wide-angle lens group and eyepiece lens group, glass choices, the allowed maximum size of the first compressor or outer lens element, the sensor package size, the track length, the nominal distance from the image plane to the nearest prior lens element (e.g., working distance), the nominal distance from the image plane to the entrance pupil, the nominal distance from the image plane or the entrance pupil to the polygonal center or device center, manufacturing tolerances and limits, and the use of compensators.

Figure 13A:
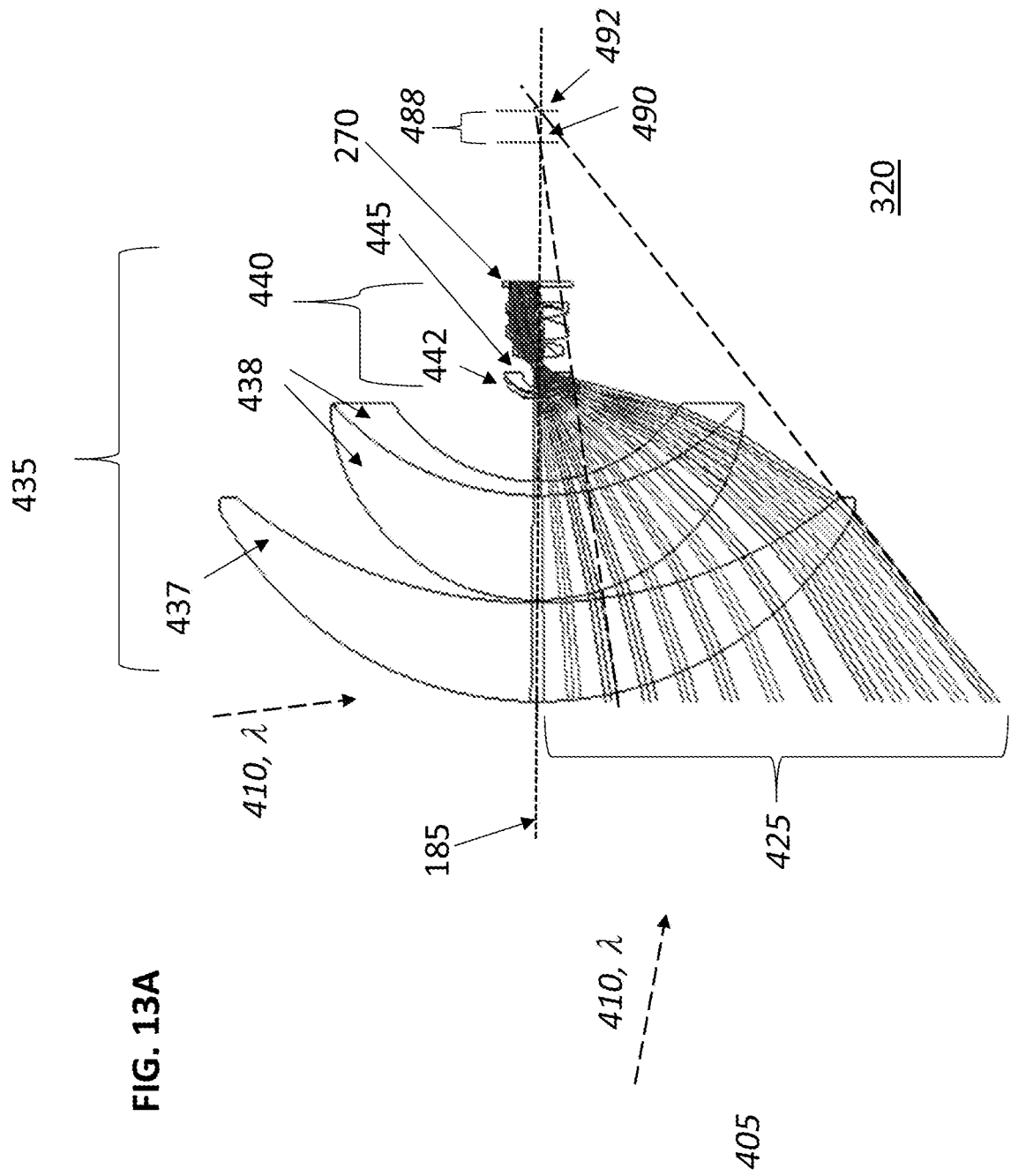
FIG. 13A depicts a cross-section of an improved lens design that shows multi-compressor lens group and that can support a FRU concept.
Figure 13B:
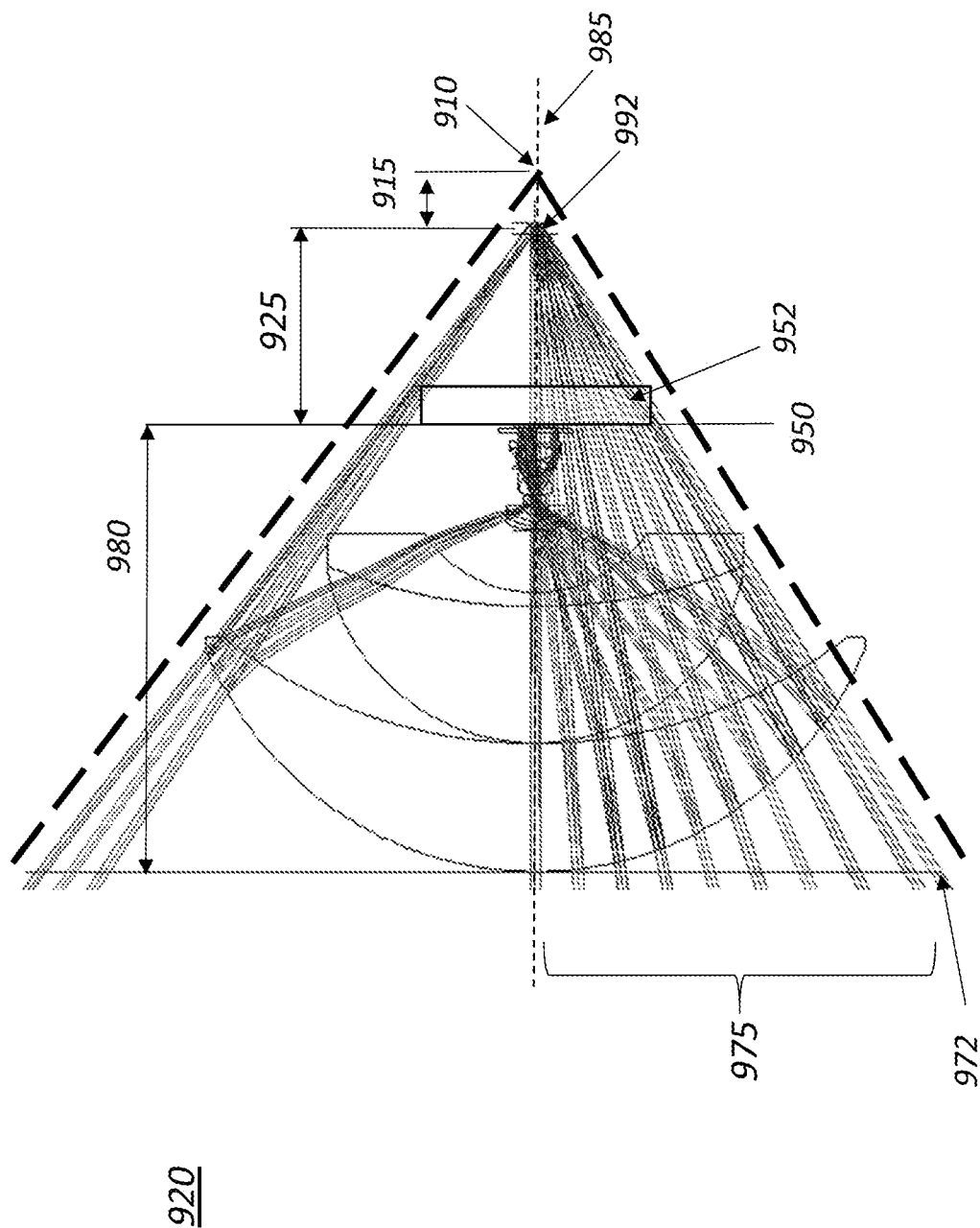
FIG. 13B depicts another improved lens design, relative to an offset device center.

FIG. 13A provides a cross-sectional view of an alternate and improved opto-mechanical design for an improved camera 320 that can be used in an improved panoramic multi-camera capture device 300. In this exemplary design, the camera lens 320 has a lens form in which the compressor lens element has been split into a compressor lens group, including first and second compressor lens elements (437 and 438). The inner lens elements 400 include a wide-angle lens group located prior to the aperture stop 445, that includes a fourth lens element 442, and a post-stop eyepiece lens group. As previously, the lens system provides a paraxial NP point 490 that is offset from a non-paraxial chief ray NP point 492 that lie within a low parallax volume 488. The size or width of this volume, and the location of NP Points of potential interest (e.g., paraxial, mid field, peripheral field, circle of least confusion based) within it, depends on design priorities and parallax optimization (e.g., spherical aberration of the entrance pupil, chief ray fans, distortion). While the lens form of the example camera lens systems designs of FIG. 2A and FIG. 13A are similar, the lenses vary in details and performance, including with their different compressor lens configurations. Because of differences in specifications and optimization methods and priorities, these lenses are also different in cost, performance, and manufacturability.

Depending on priorities, these lens systems can be optimized further, and the different variations of the lens form may be individually better suited for different markets or applications. In general, the outermost lens element, or first compressor lens element, has used Ohara SLAH52, SLAH53, and SLAH63 glasses (or equivalent glasses from Schott Glass (e.g., N-LAF36 and N-LASF43)), which are high index, low dispersion flint glasses with visible spectra refractive indices n~1.80 and an Abbe number Vd ~41.5. It should be understood that other optical materials can be used for the lens elements in the camera lenses 520 generally, including for the compressor lens elements. For example, use of a high index, lower dispersion, mid-crown glass like Ohara SLAL-18 can be helpful for color correction. As another example, lens elements can also be made from optical ceramics such as Alon (n~1.79, Vd~57-72) or Spinel, which are extremely durable materials, similar to sapphire, but with excellent optical transparency, low dispersion, and a controllably modifiable isotropic crystalline structure. It should also be understood that the camera lenses of the present approach can also be designed with optical elements that consist of, or include, refractive, gradient index, glass or optical polymer, reflective, aspheric or free-form, Kinoform, fresnel, diffractive or holographic, sub-wavelength or meta-surface, optical properties. These lens systems can also be designed with achromatic or apochromatic color correction, or with thermal defocus desensitization.

Although FIG. 13A does not depict how the improved camera lens can be mounted within a lens housing, the close proximity of the large outer compressor lens element 437 to the large second compressor lens elements 438 that form a doublet, can require a careful to robustly support these elements in close proximity. As one approach, the first compressor lens element 437 can be positionally centered to the compressor doublet (438), and the doublet can be centered to a primary circular datum on the inside surface of the lens housing. This datum can be tightly tolerance to a channel centering hub 330, so as to reduce tolerance buildup between adjacent camera channels.

While improving the optical design of the camera lens systems is important for enabling improved low-parallax panoramic multi-camera capture devices (300), improving the opto-mechanical design can be equivalently important. As suggested previously, the actual performance of a camera 120 can vary from the designed performance due to materials and fabrication variations amongst the individual lens elements 135 and the housing 130 and its constituent components, and the interactions thereof. As a result of such variations, the image quality (e.g., aberrations, including distortion), focal length (EFL) and magnification, working distance or track length, beam pointing or image location, and other attributes of a camera 120 can vary. These variations also mean that the assembly and performance of a given camera varies from that of another camera with nominally the identical opto-mechanical design. For example, the focal length of a set of nominally identical cameras can vary by ±2%, which in turn will cause a similar variation in the lens magnifications and FOVs. This variation can be reduced or eliminated by designing improved camera lenses varifocally to include a focal length compensator, such as with a lens element whose axial position can be adjusted. Alternately, the cameras 120 can be designed such that nominal image from a nominal camera underfills the image sensor, enough so that the image from a camera with a large (e.g., +2%) focal length lens also underfills a sensor, albeit with less margin. During calibration to determine a FOV, the EFL or magnification of a lens can be measured, and the sensor can also be aligned to be in focus for that lens. Image processing software can then be used to compensate the image for the lens variations, including compensating image size for magnification and distortion variations between lenses.

Considering the opto-mechanics in greater detail, the axial alignment or focal position of an image sensor, relative to an image plane 150 provided by a camera lens assembly (320) can be improved by means of an appropriate mechanism. For example, FIG. 8 and FIG. 9 show a portion of an improved panoramic multi-camera capture device 300, in which an image sensor 270 can be assembled into a sensor package 265 that includes a mount 275 which includes a plate 290, a circular flange, several adjustment screws 280, flexures, or springs 285. For example, three adjustment screws can be used to control X translation along with Z-axis rotation, and another set of three screws can be used to control Z-axis translation along with X-Y axes rotations, and an additional screw is used to control Y axis translation. A pair of springs are used to retain a gimbal plate 290, while also allowing X and Z-axis translations respectively. Other adjustment designs or devices can be used, such as using pins and micrometers or pins and shims, within the tight space constraints that the camera 320 and the overall panoramic multi-camera capture device 300 allows.

Fabrication variations for individual cameras, and the opto-mechanical interactions between them, can have significant impact on the design and performance of a multi-camera capture device 300. During the initial assembly of a multi-camera capture device 300, the interaction of tolerances and mechanical wedge between a housing 430 of a first camera 320 and a housing 430 of a second adjacent and abutting camera 320 can affect the seams 400, the pointing of the Core FOV 205 or Extended FOV 215 of individual cameras (causing FOV overlap or underlap), and thus affect a FOV captured by each of the cameras. Furthermore, co-alignment mounting stresses imparted to adjacent cameras by the close proximity mounting can physically distort one or more of the camera housings, and then potentially also distort or skew the optical imaging function of the camera lenses. As a result, a camera lens system can provide an image to the sensor that is shifted or rotated or tilted out of plane. These potential problems, or the risk of their occurrence, can be exacerbated by environmental influences, such as asymmetrical thermal loading or substantial asymmetrical optical loading.

To counter such issues, an improved multi-camera capture device 300, as shown in FIG. 9, can include features to provide kinematic type mounting of individual cameras 320 or objective lenses. In particular, FIG. 9 depicts two views of a dodecahedron multi-camera capture device 300, including a partial cross-section in which 11 pentagonal cameras 320 are mounted to a central support 325 that occupies the nominal position of a twelfth potential camera channel. Each camera 320 has a separate base lens assembly or housing 430 that consists of a lens mount which mounts the compressor lens (437) while also mounting the inner lens elements 440 that together comprise a base lens assembly. Although for each camera 320, the lens elements and housings 430 fit within the nominal conical space or volume, they need not nominally fill that space. Indeed, the abrupt ray bending provided by the compressor lens elements can mean that the inner lens elements 440 and their housings or barrels underfill the available space, and the overall lens housings 430 can taper further inwards, potentially leaving an open inner volume 390 between adjacent lens assemblies.

The housings 430 or base lens assemblies of FIG. 9 also include a turned section, that can be machined on a CNC multi axis (5-axis) machine, and that mates with a tripod-like channel centering hub 330. The channel centering hubs 330 can be entirely turned on a lathe except for the pentagonal flange, which is completed in a finish operation after the lathe. Being turned on a lathe means that exceptional concentricity and runout can be achieved, helping with the ultimate alignment of the channel. The housing 430 mates with the inside diameter of the channel centering hub 330 which is a key part of a central mount mechanical assembly that is designed to have a fit with it that ranges from a slip fit to a light interference fit, so as to ensure axial alignment without significant variations due to gap tolerances. This same fit reduces perpendicularity errors with respect to the channel axis.

The tripods or channel centering hubs 330 also include a turned section or ball pivot 340 that mates with a socket 345 of a spherical socket array 346 provided on the central support 325. In this system, the camera 320 located in the polar position, opposite the central support 325, is a rigidly placed reference channel. The center support 325 consists of a cylindrically shaped post with a ball on the top. The geometries for the center support 325 and tripods or centering hubs 330 can be designed to provide more space for power and communications cables, cooling lines, and mechanisms to secure the lens housings 430 or cables. In this example, the ball contains sockets 345, each of which can receive a ball pivot 340. The ball pivots 340 are at the ends of extended pins or ball pivot arms 342. Although this ball and socket portion of the center support 325 mount can be expensive to machine, given the precision expected with respect to the position and depth of the sockets, the advantages are that centerline pointing is controlled, while there is only a single part per device 300 that demands exceptional precision. Whereas, each of the camera channels 320 may be machined with less precision, which eases both the fabrication and replacement costs.

The individual camera lens housings 430 of FIG. 9 can also be provided with external or outside channel to channel datums 335, located midway along the pentagonal sides. Each of these channel-to-channel datums 335 can comprise two parallel convexly curved slightly protruding bars that are separated by an intervening groove. These datums are designed to provide both single point or localized kinematic contacts or interactions between lens housings, such that the datum features interweave in such a way that only one part or housing will dominate in terms of tolerance. Since they are interwoven, only the variation of one part will influence the distance between each camera channel, and thus influence the angle between the channels. In particular, if one datum 335 is larger it will dominate because the other will not make contact. Thus, only one tolerance contributes for two parts. That the channel to channel datums 335 are interwoven from one camera 320 to another, also limits lateral movement between mating (pentagonal) faces or sides, while allowing limited angular movement of the lens housings 430.

Individually, and in aggregate, the interactions between camera lens housings 430 or base lens assembly's limits mechanical displacements and wedge or channel pointing errors (roll, pitch and yaw) between cameras due to both the ball and socket arrangement and the datum features (335). Each camera channel assembly works together with its neighbors to limit channel pointing error. The portion of the base lens assembly (430) that holds the outer lens element 437 or compressor lens also has internal functional datums that can locate the compressor lens perpendicular relative, to the optical or mechanical channel axis, and it has additional internal datum features that limit axial misalignment. As will be discussed in subsequent detail with respect to FIG. 16, an additional set of alignment features provided on the ground edges of the compressor lens can function as a datum and interact with these internal datum features to limit pentagonal rotation about the channel axis as well.

The use of the alignment features depicted in FIG. 9, and particularly the ball pivot and socket datums (350 and 356) and the channel to channel datum features 335 reduces the risks of rotation, pivoting, or splay from one camera channel (320) to another. Thus, these features also help enable the seams 400 between cameras 320 to have more consistent thicknesses, with respect to the design values, than may have happened otherwise. The use of the internal features within the lens housing (e.g., compensators, adjustments screws, and shims) and external features between lens housings (e.g., channel to channel datums, ball and socket datums, and a channel loading support) help control Core FOV or Extended FOV pointing, so that one camera channel can be aligned to another adjacent channel. The combined use of channel to channel datums, ball and socket datums (FIG. 10), and a channel loading support (FIG. 17) also can help desensitize the device to mechanical or thermal loads.

Figure 10:
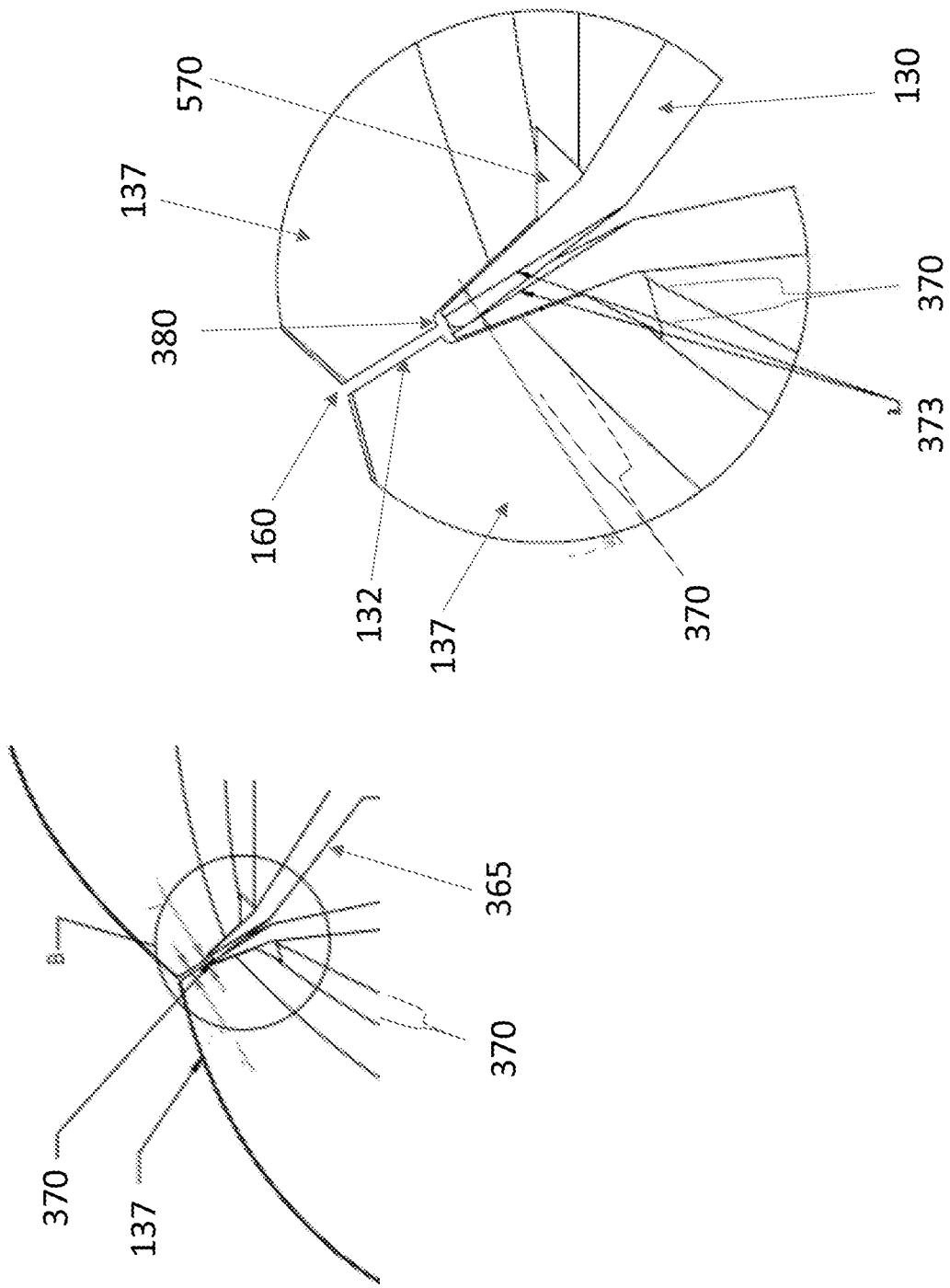
FIG. 10 depicts a cross-sectional view of a seam and two adjacent stepped edge angle compressor lenses, near a seam, and a zoomed in view of a portion (B) thereof.

FIG. 10 depicts a further design option for improving the opto-mechanical design of the outer lens elements 437, or compressor lens elements, in proximity to the seams 400 in an improved multi-camera panoramic image capture device 300. In particular, the edges of an outer lens element 437 can protrude beyond the upper or outer edge of a lens housing 430 such that two adjacent outer lens elements 437 of adjacent cameras 320 can be in near contact at the seams 400. If these outer lens elements 437 are fabricated at least in part with a somewhat compliant material, then some amount of actual physical contact can be allowed. If, however, these outer lens elements 437 are fabricated with a brittle material, such as glass, then greater care is required.

In the configuration of FIG. 10, two adjacent outer lens elements 437 that have protruding edges are in near contact at the seams 400. In a preferred design approach, the opposing edges are provided with a stepped edge angle 365 or structure. In the outermost portion, the two lenses and housing can provide a parallel seam 400 with a width of 1.0 mm or smaller.

In the innermost portion, where the inner beveled edges 370 of the adjacent outer lens elements 437 approach each other, the lens housing 430, channel to channel datums 335, and flat surface datums 670 can be provided. The edge of each outer lens element 437 then has a stepped edge groove 380 that can be filled with a compliant adhesive. Above that, along the edges 432 or seams 400, spanning the outermost edge portion of the adjacent outer lens elements 437, these lens elements can be nearly abutting, and separated by a gap that can be only 0.5 mm wide, or smaller. In practice, the optimization of the seam width can depend on how brittle or compliant the lens material is (glass or polymer), the flexibility of a seam filling adhesive, the use of other protective measures, and the application.

FIG. 17 provides greater detail on how these and other features can be used during alignment and assembly. In particular, FIG. 17 depicts a cross-sectional view of a portion of an improved multi-camera panoramic image capture device 300 of the present approach, in which 11 camera channels 320 are attached to a post or vertical central support 325 through which both wiring and cooling can be provided (see FIG. 15 for more details). FIG. 17 in particular depicts a design for the opto-mechanical hardware, albeit assembled without the lens elements (see FIGS. 9 and 15 for illustrations of opto-mechanical hardware including lens elements). FIG. 18A depicts key elements or components used in this example alignment and assembly approach in yet greater detail.

As shown in FIG. 17, a top camera 320 can be identified as a primary alignment channel 610, while all other camera channels 320 shown are identified as secondary channels 615. In particular, for the primary channel, the ball pivot arm 342 with ball pivot 340 of the channel centering hub 330, mates into a ball socket datum 356 of the ball socket array 346, where it can interact with a locking axial retention pin 348 that slips into an indent between the ball pivot arm 342 and the ball pivot 340, to stop Z-axis (vertical) translation. An anti-rotation keying pin 349 is press fit into a localized hole provided in the ball pivot arm, so as to stop rotation of the primary camera channel 610 about the z-axis. The ball pivot arm 342 of the primary camera channel 610 has a light press fit into its ball socket datum 356, so as to prevent rotations about the X and Y axes.

Alternately, the ball sockets 345 can have a latch mechanism (not shown) to load a ball pivot 340 against a ball socket datum 356, as a means to provide both a loading force and a mechanism that has reduced sensitivity to a mechanical loading force being applied to the camera or the device. For example, a latching mechanism can have latches actuated with linkage assemblies. As compared to using a retention pin, a latching mechanism can be more compliant, robust, and reliable, if a camera channel 320 or the device 300 are impacted by a loading force. It is also noted that the lens housings 430 can also have identifying marks to ease alignment of a housing with adjacent lens housings.

As previously shown in FIG. 9, and shown in yet greater detail in FIG. 18A, each camera channel 320 has a pair of peripheral channel to channel datums 335 on each face, that are small (localized) and nominally centered along the faces or sides of the lens housing. For a pentagonal lens, each of the five sides would have a pair of datums (335). These datums are provided with curved surfaces 373 (shown in bold, and extended, for emphasis) so as to enable point to point type contact (375). In particular, each pair of channel to channel datums 335 has side faces which act as lateral datums between camera channels. They are curved to accommodate relative angular movement between channels. Each side datum only has an effective single point of contact 375 where each of their mating datum radial surfaces meet. Since the radii are very large, the datum surfaces approach a straight line. Thus, any shifting of the camera channels relative to each other that could result in an angular or centerline offset can then only have a minute effect on the relative lateral offset of a given camera channel.

As further shown in FIG. 17, an improved multi-camera panoramic image capture device 300 can also have a channel loading support 630 that biases all secondary channels 615 against the primary channel 610. The channel loading support 630 employs peripheral datum pairs that are nominally identical to the channel to channel datums 335 used on each channel. The channel loading support 630 can also have a spring element 635 to facilitate loading of the secondary channels 615 against the primary channel 610. The channel loading support 630 can also utilize a key feature for anti-rotation, although using a keyed support may impart superfluous constraints.

The primary alignment channel 610 (see FIG. 17) is aligned and locked into place when its ball pivot arm 342 and ball pivot 340 are engaged with the pins (348, 349) of the channel centering hub 330. The secondary camera channels 615 are then added, and are loosely aligned with their ball pivots 340 fit against datums within the sockets of the channel centering hub 330. When the channel loading support 330 is added, at the seams 400, it nudges the secondary channels 615 both against the primary channel 610 and each other. The relative size of the ball socket 345 to the ball pivots 340 of the secondary channels are provided so that the secondary channels 615 are constrained by the ball socket 345 in only the Z-direction.

Then at the seams 400, for any two faces of adjacent camera channels (610, 615) to be parallel to each other, the configuration requires that at least three camera channels have their peripheral channel to channel datums 335, with points of contact 375, in contact with opposing channel to channel datums 335 with their points of contact 375. This effectively constrains the secondary channels 615 for three degrees of freedom (DOF). It is recognized that applying traditional kinematic mechanical design principles, in which motion and constraints in 6 DOF can be precisely limited with little crosstalk, can be tricky in a device that can intrinsically locate a multitude of complex polygonal faces (e.g., hexagonal or pentagonal) in close proximity. In a case where more than 3 camera channels are in close proximity, if not in contact, with each other, the camera channels could become over constrained. Because the system can then be only quasi-kinematic, mechanical stresses and strains could then cause component mis-alignment or damage. These potential problems can be overcome by a variety of methods. As one example, the relatively small size and centered locations of the channel to channel datums 335 can limit any angular or spatial misalignment to relatively small amounts. As another example, a compliant material such as RTV can be applied in the seams 400 to absorb some stresses or strains, while the lens housings 430 can be designed and fabricated to be sufficiently rigid to resist deformations, mis-alignments, or damage. Seam width variations, including dynamic ones caused by thermal or mechanical loads, can also be compensated by providing improved cameras 320 that capture image light 415 with an extended FOV 215.

As shown in FIG. 18A, a point of contact can occur along a line across the radial surface of a datum. Thus, each channel to channel datum 335 makes "line" contact with an adjacent set of channel to channel datums 335 if the mating surfaces are perfectly parallel. If not, only point contact is made. Typically, the peripheral channel to channel datums 335 only contact an opposing face at one point. For each channel to channel datum pair, only a single datum is likely to contact due to dimensional variations. This is an asset of this design approach, since only a single datum can influence the gap or seam 400 between adjacent camera channels. This approach can be used in various designs for an improved multi-camera panoramic image capture device 300, including a device with a "soccer ball" or truncated icosahedron (FIG. 4) geometry, where the primary alignment (camera) channel can be an external hexagonally shaped lens. This approach can also be used in the construction of "hemi-spherical" devices (see FIG. 21).

Figures 1, 18B:
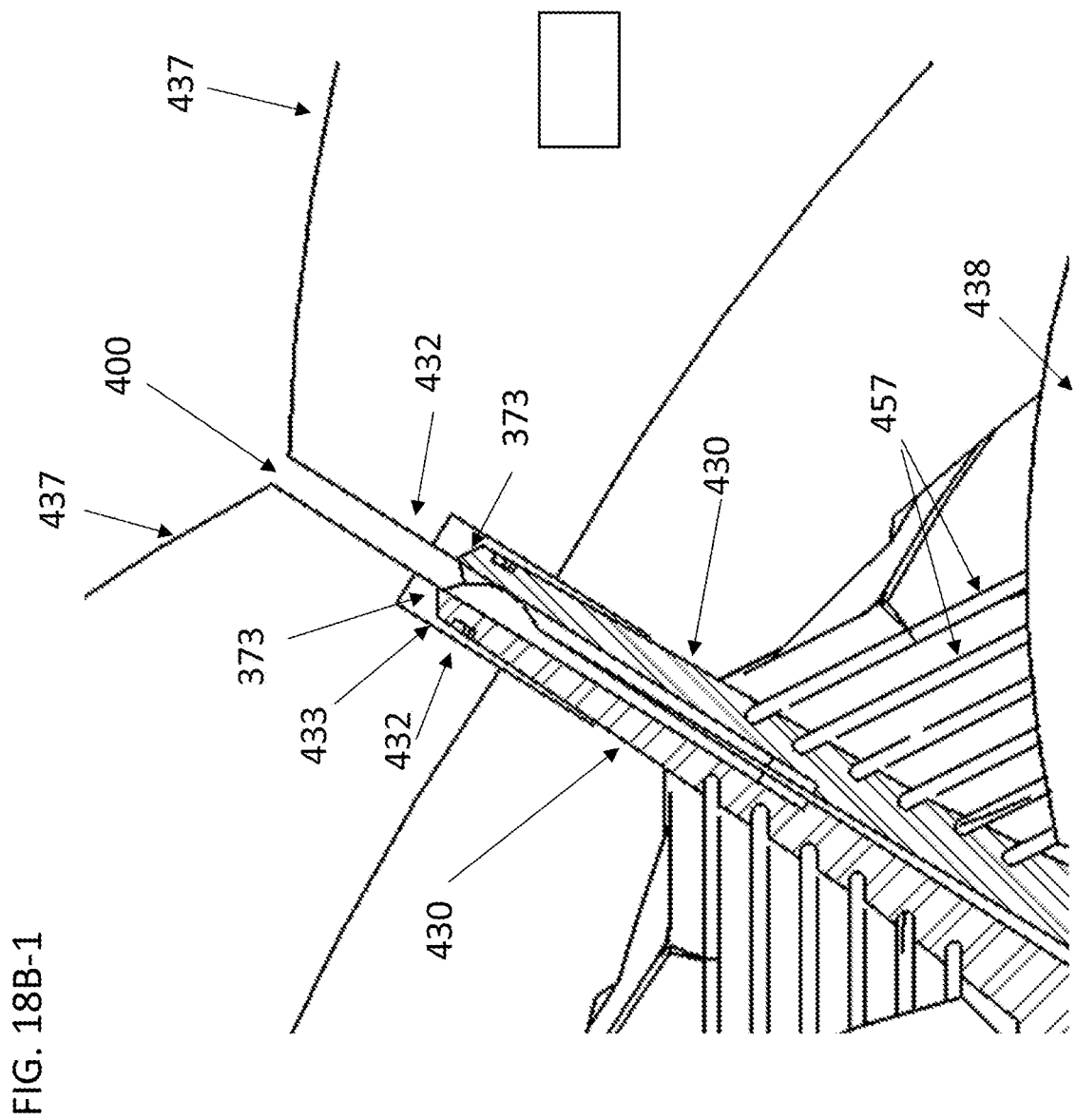

FIG. 18B-1 depicts an across seam cross-sectional view of an alternate or refined version of the construction of lens housings 430, and their interface near a seam 400, to that shown in FIG. 10 and FIG. 18A. In particular, FIG. 18B-1 depicts portions of two adjacent lens housings 430, located around a seam 400, where each housing support an outer compressor lens element 437 and at least a second compressor lens element 438. The lens housings 430 include internal light traps 457 and sides that extend up into grooves 433 that have been cut into the edges 432 of the outer lens elements 437. The outer walls of the lens housings 430 are tapered, expanding towards the device center, so as to provider greater mechanical rigidity and robustness. The interaction of two pairs of adjacent channel to channel datums 335 can be seen in cross-section.

FIG. 18B-2 depicts an alternate cross-sectional view of these same components, but cut along or within a seam 400, to show the interaction of channel to channel datums 335. As in FIG. 18A, the adjacent pair channel to channel datums 335*a* and 335*b*, each have curved surfaces 373 that interact locally to help register or align adjacent camera channels together. In this example, to further reduce the potential for over-constraint, the channel to channel datum pairs are asymmetrical and partially offset and are thus more likely to provide localized point contacts and less likely to cause over-constraint. It is noted that the circular holes 530 provide access through a side wall of a lens housing 430, to enable application of adhesive or RTV used in mounting an outer lens element 437 to the housing.

Figure 16:
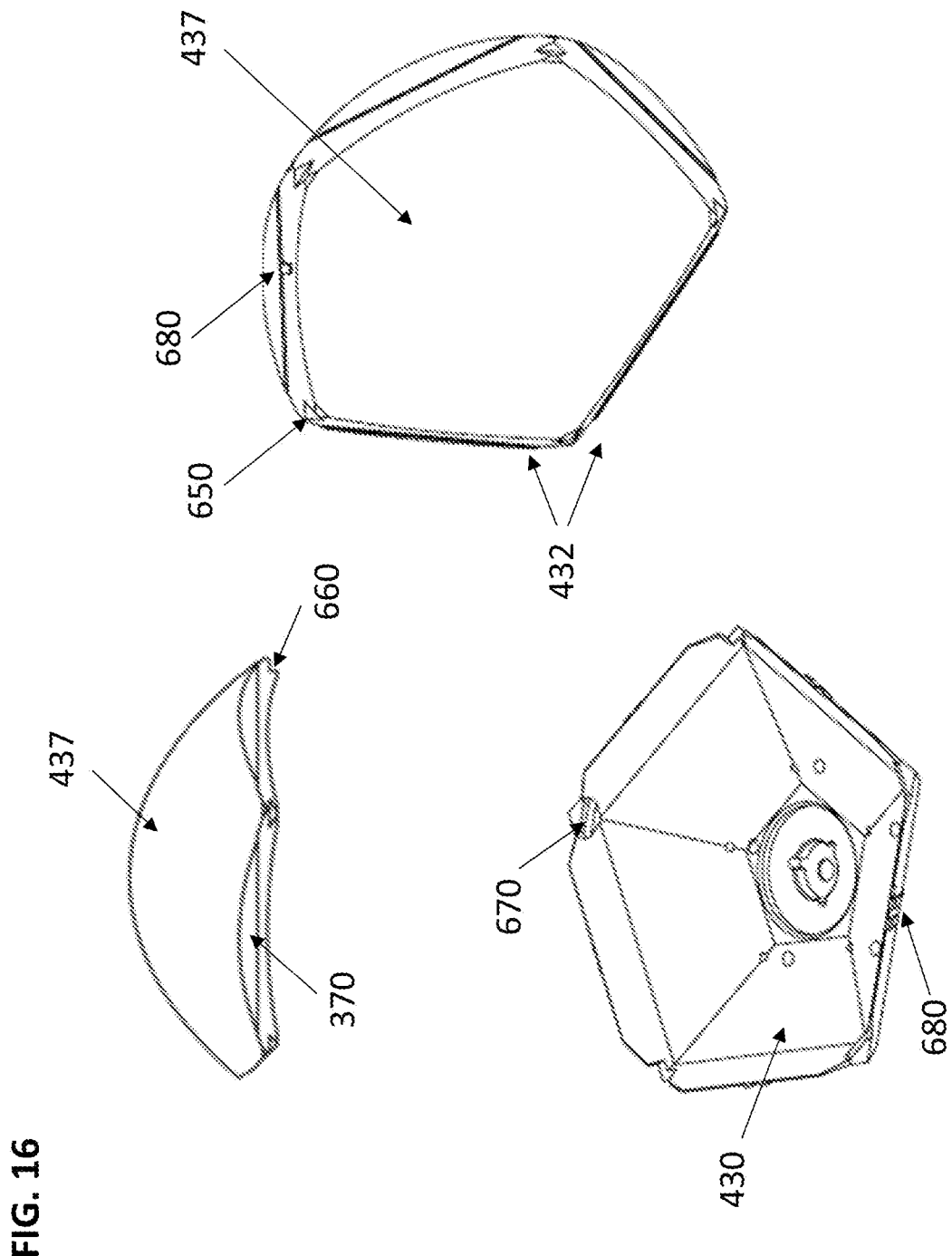
FIG. 16 depicts different views of an outer compressor lens element with lens datums, and an associated lens housing with datum features.

During assembly and alignment of the camera channels, it is also important to properly position the lens elements within the housings. For example, the compressor lens (437) can be provided with datum features along edges 432 that interact with a set of mating datum features on the inside of the lens housing 430. The datum features provided on the lens elements are intended to limit perpendicularity and concentricity error and are designed to be reasonably machined or ground features, or to be mounted onto the ground glass lens bevel surfaces with an adhesive. As shown in FIG. 16, these features can include flat datum surfaces 650 fabricated on the bottom face of the compressor lens at the corner, outside the FOV. Other datums, including adjacent flat edges 660, that can be ground into the round lens element before it was shaped into a pentagon with truncated or beveled edges 370, can be mated with flat surface datums 670 on the lens mount. As glass is typically mounted to metals with adhesives, these flat edge datums can provide a guiding alignment without risk of over constraint. The outer lens element 437 can also be provided with an anti-clocking datum feature 680, likely bonded to one of the beveled surfaces.

Because of these datum features, the chamfered or beveled finishes on the pentagonal lens surfaces can be fabricated with significantly less precision, thus helping to reduce lens cost. Even though FIG. 9 depicts a pentagon-shaped compressor lens or outer lens element 437 and housing 430, these mechanical approaches to reduce mis-alignment errors can also be applied to hexagonally shaped lenses, or lens elements having other polygonal shapes.

Alternately, or in addition, the lens housings 430 can be equipped with one or more tab or post like structures (not shown) that can protrude out from a lens housing out of the nominal conical space or volume and interact with similar protruding structures of an adjacent lens housing, or alternately interact with indented structures of an adjacent lens housing. For example, these protruding structures can be provided in the general vicinity of the sensor 270 and sensor package 265, and be several millimeters in length, and have datum features to help kinematically control a DOF, such as a radial position from the device center, or atilt or rotation of one camera channel to an adjacent camera channel. A camera assembly can have two such protruding structures, arranged symmetrically or asymmetrically about the lens housing and one oriented orthogonally to the other, to control a different degree of freedom. Alternately, or in addition, the camera channels can have lens housings 430 that include one or more protruding tab, or post structures located within the seams 400. For example, such datum structures (not shown) can be provided within the seams, at the polygonal outer face of a camera channel, at a vertex 60, and can protrude out of the nominal conical space or volume and into the seam 400 between the two adjacent channels. Depending on the device design and intended applications, the protruding tab or structures, whether located in the outer seams 400, or more deeply imbedded, such as near the image sensors, can be either be fabricated from a compliant or a stiff material, or a combination thereof. As another alternative, one or more tabs of a given lens housing 430 need not protrude outside the nominal conical volume or frustum, but clamps that bridge from one tab to a tab of an adjacent lens housing can provide the interface or control to limit a degree of freedom.

Figure 19:
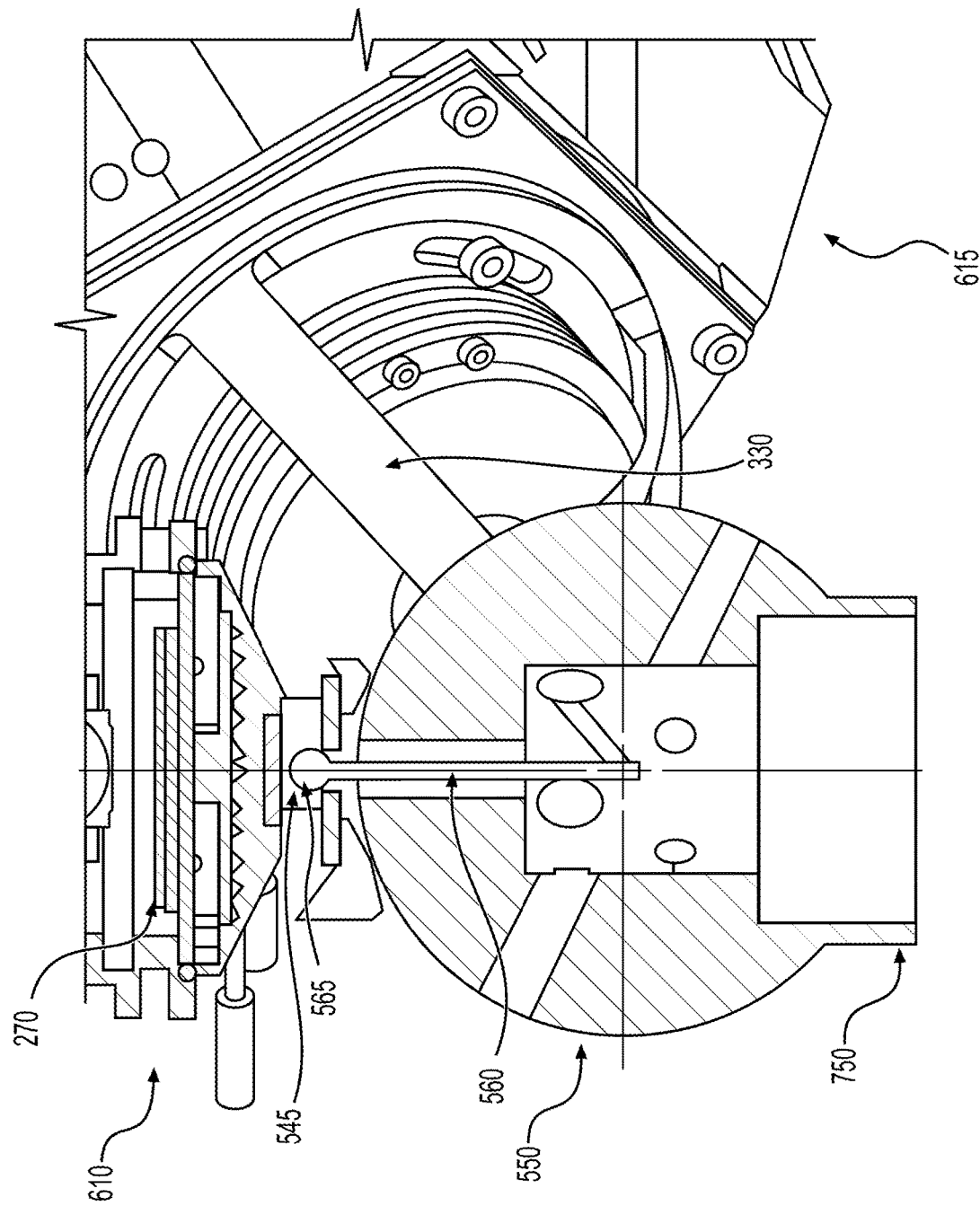
FIG. 19 depicts a view of an alternate design to that of FIG. 10 or FIG. 17, for the mounting of the camera channels to a central support.

FIG. 19 depicts an alternate version of the interface of the camera channels to the mounting structure near the device center to that shown in FIG. 9 and FIG. 17. In particular, FIG. 19 depicts portions of two adjacent camera channels, an upper primary channel 610 in cross-section and a secondary channel 615 in partial perspective. In this case, a tripod or channel centering hub 330 has a socket 545 that provides a concave surface that contacts a nominally matching convex surface of a central hub 550. The central hub 550 is part of a mount mechanical assembly nominally positioned with its center at the device center, and it can be attached to a support post 750. A cable 560, having a ball 565 at an end, can be used to pull or tension the socket 545 against the central hub 550. The primary channel, and each of the secondary channels, can be held together by similar tensioned cables that descend into the support post, where they are fastened and locked. Alternately, the primary channel 610 can be held in place with a tightened bolt (not shown). As compared to the prior approaches of FIG. 9 and FIG. 17, this approach has exchanged the plurality of balls and sockets for an inverted configuration with a plurality of sockets 545 (one per camera channel) contacting one main ball or hub 550. The tensioned cables replace the prior approaches that used retention pins, or latches, or springs. The approach of FIG. 19 can enable numerous camera channels to be simultaneously and robustly pulled into alignment against the ball hub 550, and about the device center. The ball hub 550 can be machined from a precision ball bearing.

It is noted that in the assembly approach depicted in FIG. 9 and FIG. 17, with a primary channel 610, and secondary channels 615, and centering hubs 330 interfacing with a central ball socket array 346, that the available space in the center of the device, into which power and communications cables, cooling lines, and support mechanics must fit can be tight.

As shown in FIG. 13B, an improved camera 920, having a track length 980 between the front lens center and the image plane 950, can be positioned at an offset distance 925 from the image plane 950 to the low parallax volume 992. As one approach to improve the device center congestion, the camera 920, its housing 430 (not shown), and the overall improved device 300, can be designed to provide an axial center offset distance 915 along the optical axis 985 between the low parallax volume 992 and the device center 910, much as previously discussed with respect to FIG. 5C. Designing in an offset distance 915 (e.g., 1-4 mm) can provide extra space for power, communications, or cooling connections, cables, and for mechanical supports for the sensor package 952, or for other structural members. In the example of the camera system 920 depicted in FIG. 13B, the improved low-parallax multi-camera panoramic capture device (300) can have a dodecahedral format, and then the device center 910 is the center of the nominal dodecahedral polygonal structure. This offset distance must be determined during the process of designing the cameras 920 and overall device 300, as it interacts with the optimization of the lens near the edges of the FOV. Thus this optimization can depend on, or interacts with, the seam width, the distortion correction, the control of front color, the optimization for reduced parallax for peripheral rays (edge ray 972) or image rays 975 generally, or for the extent and sub-structure of the LP volume 992, the sizing of the lens elements (particularly for the compressor lens group 955), or the allowance for an extended FOV 215.

As another option to provide more access for cabling, supports, and thermal management hardware, the ball and socket approach of FIG. 17 can be replaced with an internal frame (FIG. 20) with polygonal faces, with access holes to a hollow center. For an improved multi-camera panoramic image capture device 300 constructed in a dodecahedral pattern, the internal frame would also be dodecahedral with pentagonal faces and it would be oriented with the internal pentagonal faces nominally aligned with the external pentagonal geometry. An internal frame can be machined separately and assembled from 2 or more pieces, or it can be made as a single piece structure by casting or 3D printing. Although, the fabrication of a single piece frame could be more complex, the resulting structure can be more rigid and robust, and support tighter mechanical tolerances. For example, a dodecahedral frame with a hollow center could be cast in stainless steel, and then selectively post-casting machined to provide precision datum features. This internal frame can then be provided with flexures or adjustors on all or most of the pentagonal faces, to provide kinematic type adjustments and to reduce or avoid over constraint during device assembly and use. As before, the available adjustors on these internal faces can be different for the secondary channels as compared to a primary channel. Alternately, an internal frame can be at least in part made with a more compliant material, such as brass or Invar. As the central volume of this internal frame can be at least partially hollow, space can then be provided for the electrical cabling, thermal management hardware, and other support structures.

Figure 20:
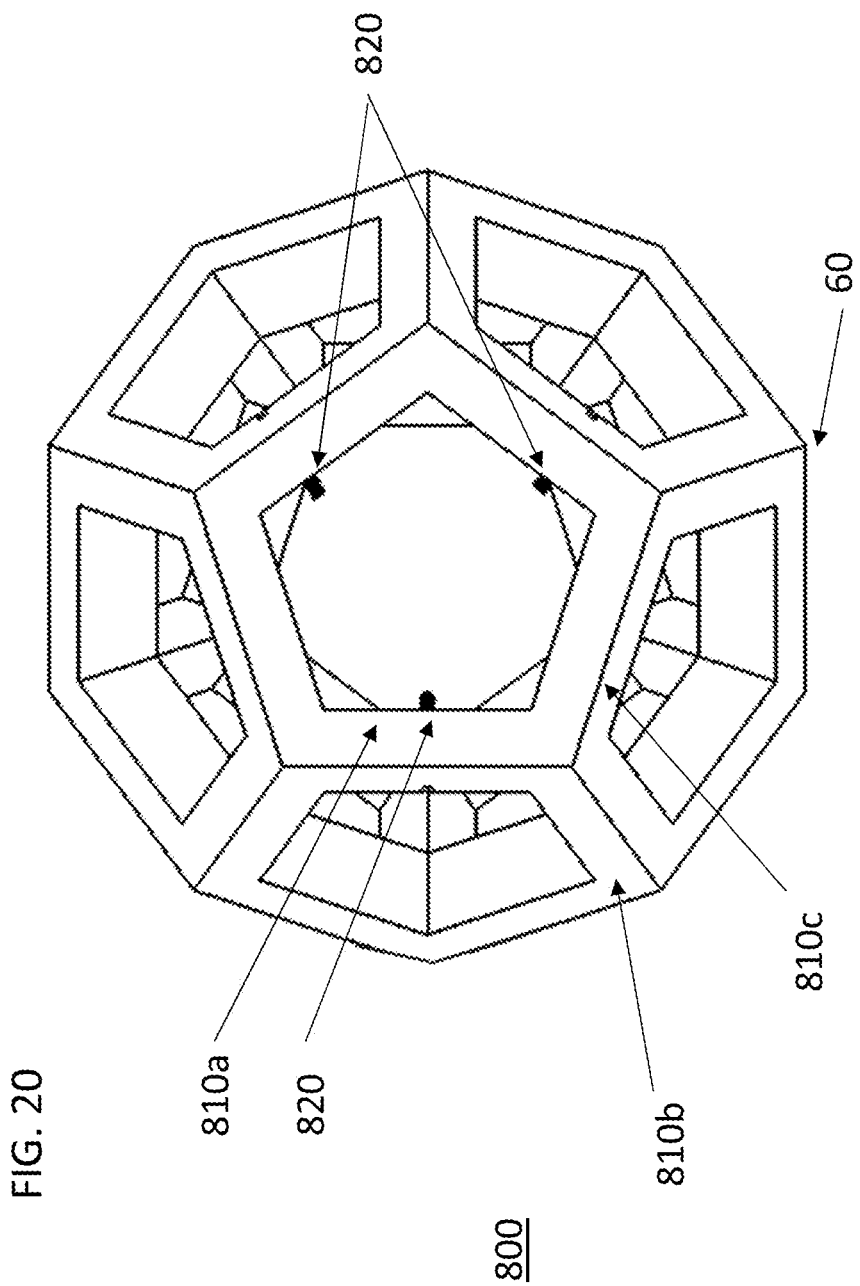
FIG. 20 depicts a view of another alternate design for the mounting of the camera channels to a central support.

FIG. 20 provides an example of such an internal frame 800, with numerous pentagonal faces 810 arranged in a dodecahedral pattern with a hollow center. An internal frame 800 can be designed as a mount mechanical assembly for an 11-camera system, with a support post attaching in the 12th position (similar to FIG. 9 and FIG. 15). A polygonal internal frame, or half or partial internal frame can also be used in a partial or hemispheric system, where the camera assemblies, including images sensors are mounted to the frame. Alternately, a hemispherical system (e.g., see FIG. 21) with an internal frame 800 can use a central hollow space (e.g., a nexus) to enable image light to cross through in reaching image sensors on the far side, including by transiting intervening relay lens systems (725). As shown in FIG. 20, a pentagonal face (810A) can have three adjustors 820, such as set screws or flexures, oriented nominally 120° apart, that can interact with features on the camera housing and thus be used to help align a given camera channel. As previously, the mounting and adjustments for secondary channels can have a different design or configuration than those for a primary channel. As another alternative (not shown), one or more pentagonal faces 810A, 810B, or 810C can be provided with one or more adjustors that can be used to nudge the respective camera channel against a precision v-groove structure (also not shown). These-v-groove structures can be fabricated into, or protruding from, an inside edge of a pentagonal vertex 60 of a pentagonal face. The internal frame approach can be used with other polygonal device structures, such as that for an icosahedron.

Figure 11:
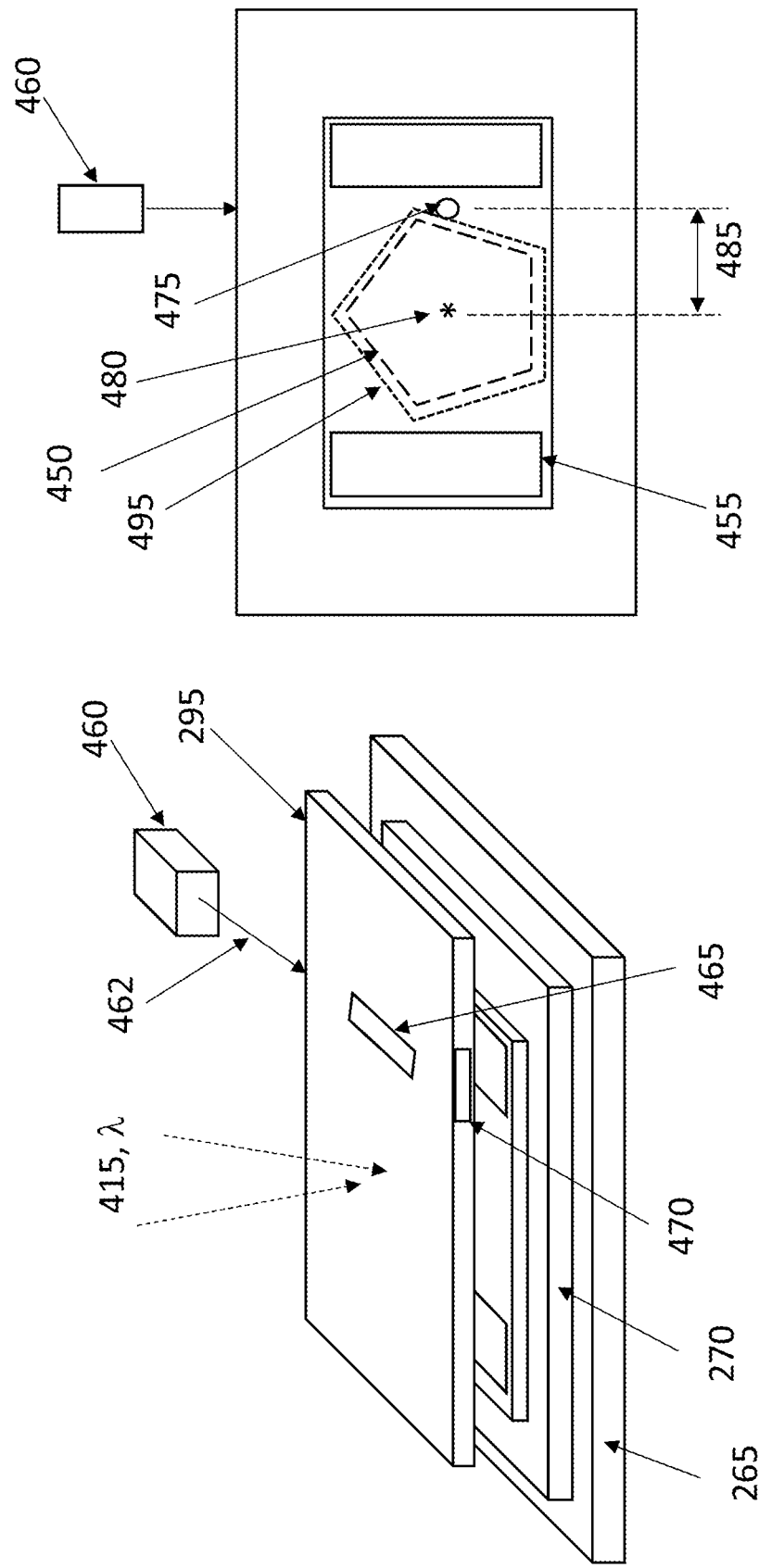
FIG. 11 depicts 3D- and top-down views of a sensor area, masking, and optical fiducial.

FIG. 11 depicts an advantageous hardware configuration in the region of the sensor 270, cover glass 272, and the accompanying sensor package 265 (which can include electronics, cooling and mounting). The cover glass 272 can seal or protect the sensor from the environment. The cover glass 272 can also provide UV or IR cut filtering by means of a thin film interference or dichroic coating, or that function can be provided on a separate window, external filter 295. The UV or IR cut filter reduces the level of the non-visible light incident, that is accompanying the image light 415, to the sensor 270. Alternately, or in additionally, UV and IR cut filtering can be provided with a coating applied to a lens element, including to the outer surface of outer lens element 437 (FIG. 9). The cover glass or filter 295 can also be a UV light absorbing glass and provide UV filtering by a combination of absorption and coating reflectance.

It is recognized that in providing an improved multi-camera panoramic image capture device 300 with outer lens elements 437 having inner beveled edges 370 (FIGS. 10 and 16), that the centering tolerances can be worse as compared to typical lens elements fabricated with conventional cylindrical edges. Such decentering can in turn effect the centering of the FOV captured by the entire camera lens system 320. As one approach for compensation of such errors, the positioning of the effective image centroid or center pixel can be determined either optically or electronically (FIG. 11). As another approach, an improved lens housing 430 can be designed to provide a compensating lateral adjustment for one or more internal lens elements. For example, means to adjust the positioning or tilt of an intermediate inner lens element, such as for a lens element located between the stop and the image sensor, can be provided. The adjustment means can include or use micrometers, pins, shims, flexures, or springs. Z-axis compensators to adjust focus or magnification differences can also be provided within each camera channel by similar mechanisms. The mechanisms to enable compensation can be built in, or internal to the device or a camera, or external, or a combination thereof.

Although the opto-mechanics of FIGS. 8-10 and FIGS. 16-20 can reduce alignment errors for the sensors 270, the camera housings 430, and one or more cameras 320, these design improvements, and other comparable ones, may not provide sufficient accuracy for all configurations or applications of an improved multi-camera capture device 300. As another, or complimentary approach, an optical fiducial system can be provided. In particular, as shown in FIG. 11, a light source 460 can direct light 462 for an optical fiducial into a window or filter 295, within a camera 320 of an improved multi-camera panoramic image capture device 300. The optical fiducial light 462 can be coupled into an edge of the filter 295 and propagates by total internal reflection (TIR) to an output coupler 465, by which it is directed towards the sensor 270, where it provides one or more illuminated spots or areas that function as optical fiducials 475. The optical fiducial light 462 can be low power infrared (IR) light, such as at 785 or 835 nm, and the output coupler 465 can be one or more lenslets, a prismatic feature, or a diffraction grating. The illuminated areas that function as optical fiducials 475 can be focused spots that are only a few sensor pixels wide. The optical fiducial light 462 can be provided by a light source 460 that is mounted in a mechanically stable position relative to the image sensor 270. Fiducial light 462 that remains within the optical substrate of the filter 295, and is light guided towards the opposite edge, can be absorbed by an absorber 470, which can for example be provided with a black paint coating.

FIG. 11 depicts one advantageous approach for providing an optical fiducial 475 that enables FOV tuning for a camera 320, and thus helps limit parallax errors and image overlap or underlap for adjacent cameras in an improved panoramic multi-camera capture device 300. But in general, an optical fiducial can be provided by a light source located proximate to the sensor. As another example, a light source could be mounted on or near the sensor plane, and direct light outwards towards or through the cover glass, so that it reflects off of an optical element, and back towards the image sensor. The light source would be positioned outside the used active area of the sensor, as would a reflective coating. The reflective coating can be a localized metallic or dielectric coating positioned outside the clear aperture that is used by transiting image light. As discussed previously, the light source can then provide at least one illuminating spot of light onto active sensor pixels located outside, but proximate to, the active area used by image light, thereby providing an optical fiducial 475. This concept can also be extended, and optical fiducials can be attached to, or interact with, other components within the system, including lens elements or lens housing structures. As such, the relative motion of particular lens elements or sub-groups thereof, could be monitored to inform the image tracking, cropping, or correction efforts. Additionally, if one or more lens sub-groups or compensators can be actively driven, such as with motors, the resulting data can be useful to inform those corrections.

Figure 12:
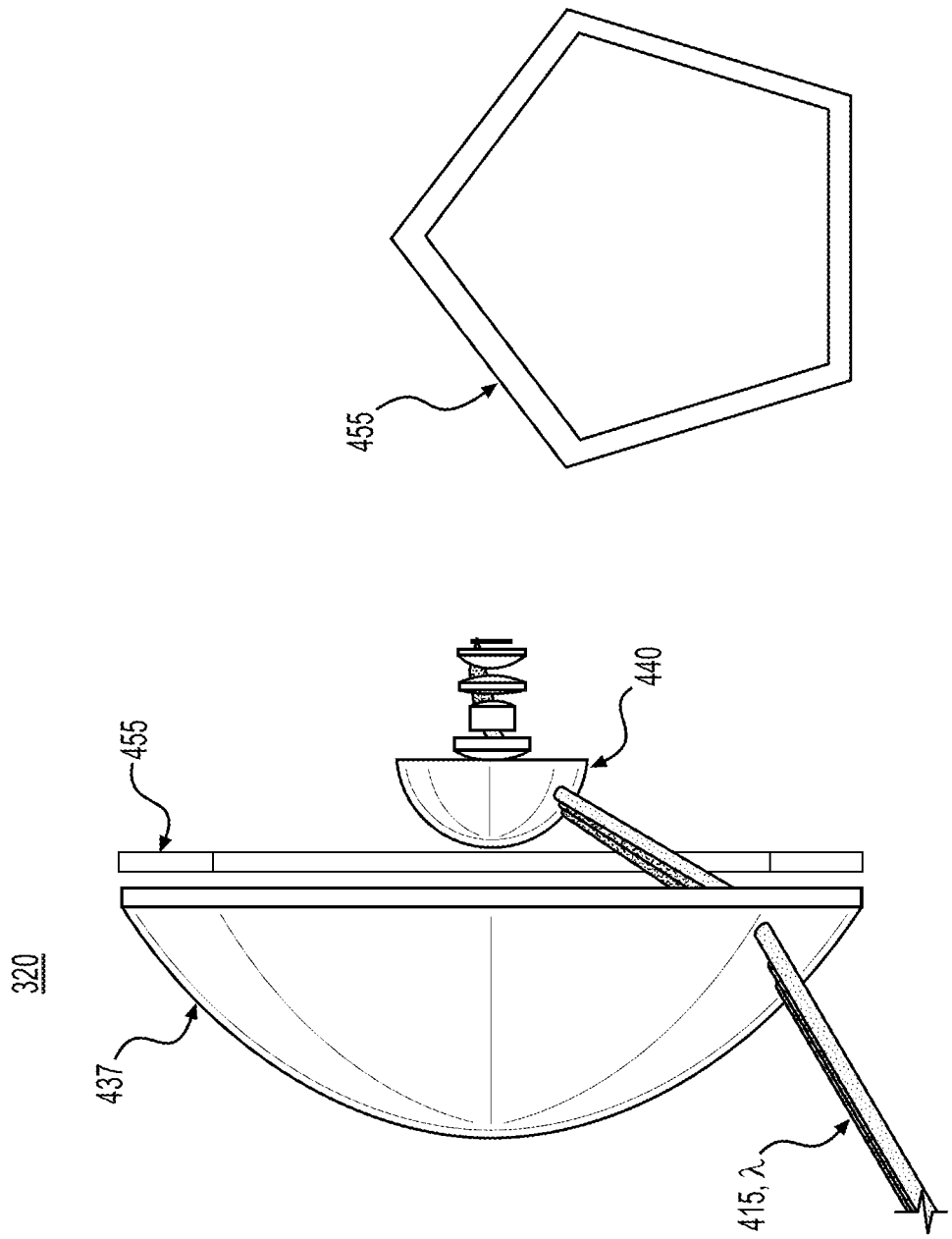
FIG. 12 depicts a baffle.

As shown in FIG. 12, a camera 320 for an improved multi-camera panoramic image capture device 300 can also be equipped with a mask or an internal baffle 455, which can be located between an outer lens element 437, or compressor lens, and the subsequent inner lens elements 440. As suggested by FIG. 9 and FIG. 16, the beveled edges 370 of the outer lens element 137 can be fabricated through a curved outer lens surface, at a set distance from, and parallel to, the nominal edge chief rays 170 that are incident along a straight pentagonal outer edge. The beveled edges 370 can have a curved bevel shapes or profiles. However, it is easier and cheaper to fabricate the outer lens elements 437, and mount them within lens housings 430, if the ground edges (370) have straight bevels or chamfers. This however means that the volume of optical glass along a straight edge of a pentagonal (or hexagonal) outer lens element 437 that can accept light, that then may become stray light, or image light that complicates image mosaicing or tiling, can vary along the beveled lens edges. The baffle 455, provided in FIG. 12, can provide a sharp polygonal edged aperture (e.g., pentagonal or hexagonal) following the shape of the outer lens element 437 and the core FOV 205, and also a blackened surface for blocking and absorbing light outside the intended FOV. Alternatively, the light absorbing baffle 455 can be painted or coated on an internal lens element surface. Thus, the baffle 455 or mask can also define the edges of the transiting image light and thus cast an edge shadow 495 onto the image sensor 270 (see FIG. 11).

The optical fiducial light 462 and the shadow 495 cast by the baffle 455 can be used both individually and in combination to provide an improved multi-camera capture device 300, with reduced parallax errors and reduced image overlap or underlap between cameras. As shown in FIG. 11, incident image light 415 can provide an illuminated image area 450 that is incident to an image sensor that has an active area length and width. For example, a camera 320 that collects uniform image light within a nominally pentagon-shaped core FOV 205 can then provide a pentagon-shaped illuminated area 450 on the sensor 270. This image or illuminated area 450 can underfill a width of the sensor 270, to a greater or lesser extent, depending on the shapes of the illuminated area and the sensor. To be a useful datum, all or most of the projected edge shadow 495 can define boundaries of an illuminated area of active pixels within an underfilled sensor area. In some examples, the edge shadow 495 fills most (e.g., ≥97%) of the active area width. The baffle 455 is acting like a field stop. In cameras 320 without a baffle, the outer lens element can act like the field stop and define the polygonal FOV.

Within the illuminated areas corresponding to the edge shadow 495, there is a smaller illuminated area 450 corresponding to the core FOV 205, and between them, there can be an intermediate extended FOV 215. The extended FOV 215 can be large enough to almost match the size of the edge shadow 495. The difference can be optimized depending on the expected mechanical alignment tolerances for the lens assembly and for positioning the baffle 455, and the optical sharpness or transition width of the projected shadow. Underfill of the sensor active area width allows the core FOV 205, an image centroid, the extended FOV 215, and edge shadow 495 to shift position on the sensor without being clipped. It can be beneficial during a calibration process to establish an image centroid 480 that can then be tracked versus time and exposure conditions. In particular, an initial distance or offset 485 can be determined during a calibration process and stored as a pixel count. Then, if the illuminated image area 450 shifts during or after assembly of the camera 320 into a multi-camera capture device 300, whether due to mechanical or thermal reasons, a new location of an image centroid 480 and the shape, size, and position of the core FOV 205 can be determined and compared to prior saved calibration data.

However, in completing this process, a boundary of the illuminated area 450 that corresponds to the desired image data must be determined. The edge shadow 495 cast by the baffle 455, much as suggested in FIG. 7, can then provide a useful series of fiducial edges or points 210 proximate to, but a bit larger than, the core FOV 205. The shape and position of the shadow or occlusion cast by the baffle 455 can be determined during a bench test of a given camera 320, prior to assembly of that camera 320 into a given multi-camera capture device 300. Similar calibration data can be obtained after that assembly, and then again over time as the camera and device are used, to track changes in the shadow positioning that might occur due to environmental or mechanical initiated changes in the internal mounting or positioning of the lens elements (e.g., 437, 440) or the baffle 455.

In greater detail, the FOV edge defining baffle 455 and the optical fiducial 475 (see FIGS. 11 and 12), can be used in combination to monitor or longitudinally track the position of the image centroid 480 and image area edges, to aid image mosaicing or tiling. In particular, for the purposes of aligning a camera lens 320 for both center and rotation with respect to an image sensor 270, a method of projecting an optical fiducial or casting an optical occlusion onto the image sensor 270, can be used either individually or in combination.

Essentially the baffle 455 or mask casts a multi-edged shadow onto the sensor 270, and the shape of the baffle will be sampled from around the periphery of the projected image or illuminated area 450 captured by the sensor 270 in software or hardware. The shadow edge can be relatively sharp, but can still create a gradient fall off, potentially spanning at least several pixels, between the illuminated area 450 and the dark surround of the projected shadow. The data for the sampled edges or fiducials from around the edges of the occluded area and the shadow gradients can then be used to derive an image centroid 480 of the lens projection. The baffle 455 or occluding shadow 495 can also have an added feature to indicate and derive rotation if needed. A calibration step can be initially used to derive a relationship of the shadow 495 to the lens center and rotation. Additionally, the dimensions and shape of the mask can be accurately measured before installation and compared to the size and shape of the projected shadow 495. The derived relationship of the size, shape, and centroid of the projected shadow 495 can account for an expected or measured difference in the shape and size of the edge shadow 495 compared to the shape and size of the baffle. Other factors that can affect the edge shadow 495, such as mask tilt, and an impact of lens distortion in a fractional field portion (e.g., 0.85-1.01) corresponding to the outer portion of a core FOV 205 and an extended FOV 215, can also be accounted for.

Additionally, as previously described, an optical fiducial 475 can be projected using IR or visible light onto an unused portion of the sensor 270. The pattern formed by the fiducial can then be used to derive the location of the fiducial and be calibrated to the image centroid 480, and the lens center and rotation. A calibration step is initially used to derive the relationship of the optical fiducial 475 to the lens center and rotation and correlated to the distortion characteristics calculated in the calibration process. Additionally, a series of calibration images of the fiducial shadow 495 provided by baffle 455 can be used to locate more distant features (e.g., the corners), and thus to confirm or determine the planarity of the lens to sensor mechanical alignment. Sensor alignment or planarity can be modified using the adjustments previously described in FIG. 8. The combined fiducial method, of using both an optical fiducial 475 and a projected fiducial shadow 495 has the advantage of being more robust in diverse lighting conditions where the edge of the occlusion cast method may be inconsistent or hard to detect.

The method for calibrating with optical fiducials (or with electronic fiducials) and shadow occlusions can be used for a given camera to accurately align the modeled lens distortion derived from a calibration step to the calibrated core FOV 205. The resulting correction data can be stored in matrices or other forms in an on-board look up table (LUT) on a local board that is part of the sensor package, for each camera and sensor. When an image is captured, this correction data can be used to crop a larger image, corresponding to an extended FOV 215, during an initial or interim capture step, down to an image corresponding to a real current core FOV 205. Likewise, other available data, such as for exposure and color corrections, that can be stored locally, can also be applied in real time to the cropped, core FOV sized image, before it is transmitted to a system computer for further image processing, including image seaming or tiling to assemble a panoramic image.

More broadly, in general, during either a real time or post processing step of modifying image data captured by one or more cameras 320 of an improved multi-camera panoramic capture device 300, a method for calibrating optical fiducials and shadow occlusions can be used for a given camera to accurately align the modeled lens distortion derived from a calibration step to the captured image. Then an image can be accurately undistorted as needed, and also corrected to account for other camera intrinsics (e.g., lens focal length, or sensor parameters). This method can be replicated for the multiple cameras 320 of a multi-camera capture device 300 to enable accurate mosaicing or tiling of multiple images together. By matching knowledge of the camera intrinsics accurately to the captured images, the quality of the mosaicing across the boundaries or seams between images captured by adjacent cameras will increase the combined image quality and reduce the errors from the image being misaligned to the calibrated intrinsics initially calculated. As such, the speed of the mosaicing or tiling increases because little or no time can be spent on compute intensive (e.g., optical flow) image feature-based methods to correct for mismatches in alignment, distortion, and lens intrinsics.

FIG. 11 also shows that outer portions of the active area or pixel areas of a rectangular image sensor 270 can be covered or shielded by masks 455. In the case that the sensor 270 is much larger than the image illuminated area 450, use of masks 455 prevents stray light from otherwise being incident to the underlying dark areas. As a result, these pixel values will essentially be "zero" at all times, and their output can be ignored or dumped, which can speed image processing and compression times. Also, it is possible to replace or substitute the light source 460 and optical fiducial 475 with an offset value 485 for an electronic fiducial calculated as a difference in a calibrated location of the centroid 480 to a sensor edge or mask edge. Use of an electronic fiducial can be simpler and cheaper to implement, as compared to the optical fiducial 475, but depending on the mechanical design of the camera housing 430, or a use case for the improved multi-camera capture device 300, it may or may not be as mechanically or functionally robust.

Variations in brightness from scene to scene, or camera to camera, can affect the image content incident within an illuminated area 450 corresponding to a core FOV 205. In particular, image quality and image mosaicing or tiling can vary with content; such as dark scenes to one camera, and a bright scene to an adjacent camera, affecting image mosaicing and exposure levels. These variations not only make it hard to detect image or shadow edges, but also to make it difficult to determine image centroid values to use during image seaming. Furthermore, these exposure variations can make mosaiced images appear tiled along or across the edges. While either an electronic or optical fiducial can be used to help determine image centroids and image edges, an optical fiducial can also be used to enable electronic exposure control correction. Additional exposure correction can be provided by matching the center or average values of adjacent cameras and scenes, to help the mosaiced images blend or match better.

The masks 455 depicted as part of a sensor portion of a camera 320 can be eliminated or reduced if the sensor 270 has a configuration closer to that of the core FOV 205 or the shape of the image illuminated area 450. Replacing a rectangular sensor with an alternate one that is square, or nearly so, makes more effective use of the available space. In particular, much smaller portions of the conical volume that a camera lens assembly can nominally be designed to fit within are lost in supporting unused sensor area. The illuminated area 450 can land on a sensor with a more appropriate active area, and thus increase the effective resolution (in pixels at the sensor, or in pixels/degree relative to the core FOV 205). However, use a of square image sensor can still provide space or pixels to support use of an optical fiducial 475. Alternately, the rectangular image sensor can be replaced with a sensor having an active area optimized for the camera shape, such as to have a hexagonal or pentagonal shape. Having a shape optimized sensor can further ease the optical design, thus making it easier to fit the camera assembly within the nominal conical volume or frustum, and to optimize the "NP point" location and size. Use of a shaped optimized sensor can provide greater freedom for the optical design optimization trade-offs or balance for factors including the relative distance between the image sensor and the NP point, image quality, pupil aberrations, image distortion, and ray constraints for reduced parallax. As a result, the optical resolution (e.g., from the lens) and angular resolution (from the sensor) can be further optimized, and exceed 100 px/deg. However, the design can still have the core FOV 205 underfill the optimized shape sensor, to allow room for image capture of an extended FOV, and to avoid loss of potential image content due to image shifts and rotations. The underfill, if large enough, can still also allow space to provide an optical fiducial 475.

It is noted that for many image sensors 270, the image light is incident directly onto the sensor pixels. However, many commercially available image sensors are further equipped with an integrated lenslet array, overlaying, and aligned to, the pixel array. A given lenslet directs its portion of incident image light to the corresponding underlying pixel. This approach can reduce optical crosstalk between pixels, as the incident image light is more likely to be photo-electrically converted into an electrical signal within the incident pixel than may have been true otherwise. As the pixels have become progressively smaller, this approach has become increasingly common, as a means to improve or maintain image resolution (MTF). Such sensors with integrated lenslet arrays can be used in the cameras 320 of the improved multi-camera capture devices 300.

Alternately, an overlaying lenslet array can provide an array of lenslets, where any given lenslet directs light onto a plurality of image sensor pixels. In this case, direct image resolution can be lost, but with a benefit of gaining a light field capability to provide either stereo image capture or increased depth of focus image capture. This type of light field capability can be designed into a panoramic multi-camera capture device 300, but much of the benefit can then be lost to FOV overlap (FIG. 3). In such systems, the optical designs also can have the entrance pupils at the front or outer lens elements, which can lead to information loss. However, introducing light field capabilities into an improved panoramic multi-camera capture device 300 that has a plurality of adjacent abutting cameras 320 with reduced parallax errors, whether from improved kinematic design, improved opto-mechanical design at the seams 400, or the use of electronic or optical fiducials or shadow edge masks, can improve the performance and value of captured light field data for such systems. Particularly, in such a system, cameras 320 with light field imaging can capture a portion of the available plenoptic light to provide images with an improved depth of focus and object perspective, without either the information loss or complicated image fusing that results from parallax errors.

As noted previously, the width of the seams 400 can be a critical parameter in the design of an improved multi-camera capture device 300, as the seam width affects the parallax error, size of blind regions 165, the size of any compensating image overlap (FIG. 3), and the image processing and mosaicing or tiling time. For example, in cases where an expensive multi-camera capture device 300 is used in controlled environments, narrower seams with small tolerances could be allowed or tolerated. However, a local collision or stress of expensive brittle materials (e.g., glass) should be avoided, as chipping and other damage can result. There are of course other external damage risks, including those from external materials coming in contact with the outer lens elements 437. Thus, as a multi-camera capture device 300 can be an expensive unit, opto-mechanical designs that provide risk mitigation, or protection of the cameras or the device, can be beneficial.

As one remedy, a seam 400 can be filled with a compliant material, such as an RTV or silicone type adhesive. As another remedy, the optical design of the camera lenses can include an outer lens element 437 that is designed to be a polymer or plastic material, such as Zeonex, that is less brittle than is glass. The combined use of a polymer outer lens element 437 and seams 400 filled with compliant materials can further reduce risks.

However, in optical designs, glass usually provides better and more predictable performance than do polymer materials. As one approach, the outer lens element 437 may be designed with a common, more robust and less expensive optical glass, such as BK7. The outer lens elements, whether glass or polymer, can also be overcoated with scratch resistant AR coatings, and oleophobic or hydrophobic coatings. A compliant seam filling adhesive should likewise resist penetration or contamination by water, oils, or other common materials.

It can be advantageous to design the camera lenses 320 with lens elements 435 that include an outer lens element 437, or compressor lens, is more of a meniscus type lens element than previously suggested (FIG. 2A). As an example, as shown in FIG. 13A, the compressor lens element has been split into a compressor lens group, including a first compressor lens element (437) and compressor lens elements 438 that are combined as a doublet. The outer lens element 437 can then more freely be designed to have a partially meniscus type shape, while still providing both some beam or image light compression or re-direction towards a wide angle lens group that include a fourth lens element 442, and the chief light collection to reduce parallax. If the outer lens element is more meniscus like, or generally has a long focal length, it can be flatter, and protrude less above the lens housing 430. Thus, it can also be less likely to accept light rays 410 at extreme angles from object space 405, but from outside the nominal field of view 425, that can successfully reach an image sensor 270 as visible or detectable ghost light. In such a lens design, a second compressor lens element 438, or doublet, provides further optical power, and re-directs the transiting image light inwards towards an inner fourth lens element 442.

Additionally, the camera lenses 320 can be opto-mechanically designed so that the outer lens element 437 can be a field replaceable unit (FRU). One way to aid this approach is to design that lens element to have a more meniscus like shape. The optical mechanical design can be designed to enable an outer lens element 437 to be mounted so that it can also be readily removed and replaced if it is damaged. For example, the outer lens element can be directly mounted into the camera lens housing 430, using datum features such as those shown in FIG. 16, but then be removable using one or more extraction tools. A desolvable adhesive (e.g., glyptal) or hot glue, with a transition temperature above terrestrial extremes, can also be used. A replacement outer lens element can then be mounted in its place. Alternately, the outer lens element can also be in an assembly, mounted to a sub-housing portion that can be removed from the main camera housing 430. In either case, providing a lens design in which the outer lens element has a partial meniscus or long focal length design then reduces the sensitivity of the design, relative to image quality and image location on the sensor, to an inaccurate alignment of a substitute outer lens element. Potentially then, a cast or molded optical element, whether made with a polymer (e.g., acrylic) or a glass (e.g., B270), can also be used. Camera re-calibration using the previously discussed optical or electronic fiducials, or the shadow 495 of a baffle 455, further reduces the risks associated with outer lens replacement.

As another alternative for an improved multi-camera capture device 300, an entire camera 320 can also be designed to be modular, or a potential FRU. In such a case, the camera 320, including the housing 430, and the accompanying lens elements including the outermost compressor lens element 437, can be removed and replaced as a unit. For example, the pressure from the channel loading support 630 can be released or reduced, and the ball pivot of a camera channel can then be released from a ball socket 345, and a replacement camera channel can be inserted in its place. Thereafter, the pressure from the channel loading support 630 can be restored. As the relative positions of the camera channels can shift slightly during this re-assembly process, a process of FOV centering or calibration with fiducials may have to be repeated thereafter. Depending on the complexity of the design, FRU replacement of modular camera lens assemblies may occur in the field, in a service center, or in the factory, but with relative ease and alacrity.

An improved multi-camera capture device 300, and the cameras 320 therein, can also be protected by a dome or a shell (not shown) with nominally concentric inner and outer spherical surfaces through which the device can image. The addition of an outer dome can be used to enclose the nearly spherical device of FIG. 15, or for a nearly hemispheric device like that of FIG. 21, or a device having an alternate geometry or total FOV, within an interior volume. The dome can consist of a pair of mating hemispheric or nearly hemispheric domes that interface at a joint, or be a single nearly hemispheric shell (e.g., for FIG. 21). The transparent dome or shell material can be glass, plastic or polymer, a hybrid or reinforced polymer material, or a robust optical material like ceramic, sapphire, or Alon. The optically clear dome or shell can help keep out environmental contaminants, and likewise if damaged, function as a FRU and be replaced. It can be easier to replace a FRU dome than an entire camera 320 or a FRU type outer lens element or outer lens element assembly. The dome or shell can also be enhanced with AR, oleophobic, or hydrophobic coatings on the outer surface, and AR coatings on the inner surface. Although the use of a dome or shell can reduce the need or burden of also using a carrying case or shipping container, such enclosures can still be useful. Alternately, or in addition, the dome or shell can be faceted, and provide a series of contiguous adjacent lens elements, which can function as the outer lens elements for the associated adjacent camera systems 320. This approach can have the potential advantages of reducing the widths of both the intervening seams 160 (e.g., seam widths ≤0.5 mm) and their associated blind regions 165 and enabling the device center 196 to be coincident with the low parallax volumes 188.

As yet other alternatives, shown in FIGS. 14A and 14B, an improved multi-camera capture device 300, and the cameras 320 and their housings 430 therein, can be designed to enable providing protective fins 510 that protrude from the seams 400, or protective posts 520 that protrude from the vertices (60) or corners where a plurality of adjacent cameras meet. These fins 510 or posts 520 would protrude into object space 405, but can be designed to be outside the captured FOV, by protruding less than the extent of a blind region 165, and they could prevent direct contact by some objects from the outside environment. These fins or posts can also be designed to be rigid enough, with the right aspect ratios of height to thickness, to reduce their risk of buckling. Alternately, the fins or posts can be designed with a somewhat compliant material so as to rebound from a contacting force, or a combination, such as compliant fins and rigid posts can be used in tandem. The posts and fins can be supported by compliant mounting that is imbedded with the seams 400, so that these protective features can revert towards their native designed shape without damaging the cameras 320 or multi-camera capture device 300 during an impact event. Use of darkened fins that protrude, by perhaps a few or tens of millimeters, from the seams 400, can also provide a benefit of reducing acceptance of light rays at extreme incidence angles relative to a camera lens, that can become ghost light that successfully reaches an image sensor 270. Use of fins or posts will only protect the cameras 320 and the multi-camera capture device 300 from a moderate force or impact, and thus for some designs and applications, there could be sufficient value. These fins FIG. 14A or posts of FIG. 14 B can also be sacrificial elements or detachable FRUs themselves. Once they have done their job, or if damaged, they can then be substituted by plugging in replacements (e.g., perhaps into receptacle sockets designed specifically for that purpose).

A prior example was given in which a proposed width of a seam 400 was rather narrow. But to clarify, relative to the design and performance of a multi-camera capture device 300, for chief rays 170 transiting adjacent cameras 320, and for a given object distance, it can be unnecessary to hold the beam to beam separation to complete zero. Rather, a goal can be to have at most a pixel of missing information (or a few pixels, depending on the application) at the object distance of interest. Depending on the allowed seam width and pixel loss, the cameras 320, and multi-camera capture device 300, can be more or less robust, or more or less tolerant of both fabrication tolerances and protective design approaches, including those discussed previously.

In particular, some fabrication tolerances of the cameras 320 (e.g., see FIG. 9), housings 430, outer lens elements 437, and seams 400 can be tolerated or accommodated. In part, the use of the optical or electronic fiducials, or a shadow cast by a baffle, enables greater tolerance or flexibility in collecting low parallax error images from adjacent cameras 320 with little FOV overlap, as these corrective approaches can enable a "centered" image to be found. However, a multi-camera capture device 300 can also be tolerant of some image loss. For example, for a 5 foot object distance, and a device whose cameras support an aggregate 32 Megapixel resolution (an 8k output equirectangular image), a 1 pixel width seam 400 can equate to a 1.2 mm sized gap. If an improved multi-camera capture device 300 is designed to hold the mechanical seams to 3 mm after construction, then the cameras can be designed for a 1.5 mm gap while allowing some FOV overlap (☐☐). The device can have a mechanical design that with tolerances, allows a matching pointing error of at most ☐☐. After the cameras are assembled, the actual rays that are collected parallel to the edge surface that are shared between the camera lenses may shift, but will always be within the pointing error. Thus, a gap or seam 400 can be constrained to be at most 3 mm wide. For some camera designs, and markets or applications, wider seams can be tolerated, in either absolute size (e.g., 4.5 mm seam widths) or in lost image content (e.g., 2-20 pixels per seam). Lost pixels can be compensated for by increasing the FOV overlap or extended FOV 215, between adjacent cameras, to capture overlapped content but at a cost of some parallax errors and some increase in the image processing burden. Although, for modest amounts of extended FOV (e.g., ≤5%), the residual parallax errors (e.g., FIG. 8B) can still be modest. The smaller the seams 400, and the better the knowledge of the position of an image centroid 480, and an image size and shape, then the larger the core FOV 205 can be on the sensor, and the less lens capacity and sensor area can then be devoted to providing a yet larger extended FOV 215.

The seams 400 can be nominally identically wide at the interfaces between abutting adjacent cameras for all cameras 320 in an improved multi-camera capture device 300. Careful camera and camera housing design, and camera to camera mounting (FIGS. 9 and 10) can help this to occur. But nonetheless, the seam widths can vary, either upon device assembly, or during dynamic environmental conditions. For example, on one side of a first camera, a seam width between that camera and an adjacent one can be only 0.75 pixels wide, while simultaneously a seam width between the first camera and another adjacent camera can be 3.25 pixels wide. The seam widths can also vary non-uniformly. The resulting images to the sensors can be shifted or rotated relative to expectations. Thus, such variations can increase the parallax errors for the images captured by these adjacent cameras, and complicate image mosaicing or tiling. However, with the use of electronic or optical fiducials (475), or shadows cast by internal baffles 455, an image centroid and image edges (FIGS. 11 and 12) can be monitored for each camera to enable a quick reference to the nominally calibrated or expected conditions. This reference or correction data can also be compared from one camera to another, with a goal to define effective image centroids and image edges for each camera that effectively best reduces parallax errors for all cameras, either individually, or in aggregate (e.g., average). This information can then be used during image processing to quickly and robustly determine image edges and enable efficient image mosaicing or tiling.

As discussed previously, with respect to FIG. 15, a useful configuration for a multi-camera capture device can be to design and fabricate a generally spherical system, having a plurality of camera lenses distributed in a dodecahedron or truncated icosahedron arrangement. However, an issue that can occur with an improved multi-camera capture device 300 of the types of FIG. 15, is that with the plurality of camera channels and respective image sensors confined within a nominally spherical shape, there is little room to include other components or capabilities. Thus, for some applications, devices with a generally hemispherical configuration, with potential room underneath for other hardware, can be valuable. However, because the outer lens elements and cameras are typically polygonal in shape, a hemispherical device can have a jagged or irregular circumference. Also, in such systems, one or more of the cameras can be designed with folds (e.g., using mirrors or prisms) so that the optical paths extend through the bottom irregular circumferential surface. This construction can provide more room for use of modular sensor units that can be swapped in and out.

Figure 21:
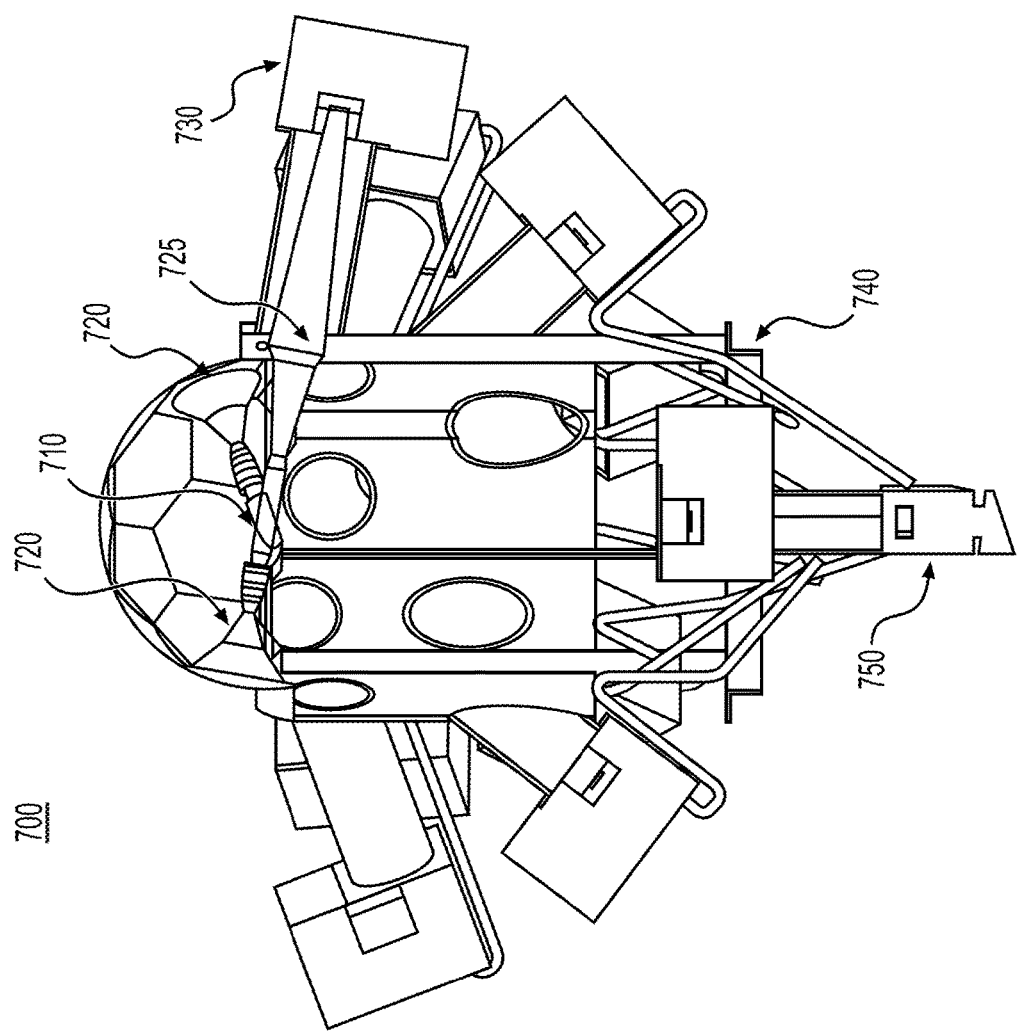
FIG. 21 depicts an alternate configuration for an improved multi-camera projection device.

However, for a "hemispheric" version of a truncated icosahedron, there are 6 camera channels with pentagonal faces, and 10 with hexagonal faces, and it can be difficult to provide space for the opto-mechanics to fold so many optical paths. FIG. 21 depicts an alternative version of an improved multi-camera capture device 700 in which image light collected by the respective camera objective lens systems 720 is directed along a nominally straight optical path, through the nominal image plane, and then through an image relay optical system (725) to a more distant image sensor located in a sensor housing 730. The original image plane provided by an objective or camera lens system is essentially a real intermediate image plane within the larger optical system. It can be re-imaged with a magnification (e.g., 1:1 or 2.75:1) to a subsequent image plane (not shown) where an image sensor is located. Thus, advantageously, the image sensors can be larger, and provide a higher pixel count, and the relay lens systems 725 can re-image the image provided by the objective lenses (720) at an appropriate magnification to nominally fill the more distant sensor with a projected image. FIG. 21 depicts an upper "hemispheric" portion of a truncated icosahedron, with a semi-internal view that reveals portions of two camera objective lens systems 720, each with an associated relay system 725 that extends outside the nominal conical space or volume. Image light from the respective cameras 720 crosses through a central volume or nexus 710 on its way through the respective relay lens systems 725. The relay lens systems 725 can include field lenses (not shown) after the image plane of the camera lenses, but before the nexus, to help contain the space needed for transiting image light. The optics of the relay lens systems 725 can also be coherently designed with the cameras 720, so as to correct or compensate for aberrations thereof.

To provide a hollow central volume or nexus 710 for the imaging light rays from the adjacent camera channels to cross one another and transit the respective relay lens systems 725, an internal frame 800 (e.g., see FIG. 20) with polygonal faces having access holes to allow the image light to transit the hollow center. As previously suggested, an internal polygonal frame can have flexures or adjustors provided on all or most of the polygonal faces, to provide kinematic or quasi-kinematic adjustments and to reduce or avoid over constraint during device assembly and use. However, in this case the hollow space or central volume of this internal frame is primarily provided so as to allow image light rays to transit the central nexus 710, and secondarily can also providing room for electrical cabling and thermal management hardware. Alternately, mirrors (not shown) can also be used in the relay lens paths to redirect the image light so that the overall opto-mechanical structure is more compact. The improved multi-camera capture device 700 also includes a support structure 740, a support post 750, and cabling 760 for supplying power and extracting signal (image) data. The support structure 740 can provide more substantial support of the camera housings 730 than is illustrated in FIG. 21.

FIG. 15 depicts an electronics system diagram for an improved multi-camera capture device 300. In this example, a dodecahedron type device has 11 cameras 320, and an electro-mechanical interface in the twelfth camera position. Image data can be collected from each of the 11 cameras, and directed through an interface input-output module, through a cable or bundle of cables, to a portable computer that can provide image processing, including live image cropping and mosaicing or tiling, as well as camera and device control. The output image data can be directed to an image display, a VR headset, or to further computers, located locally or remotely. Electrical power and cooling can also be provided as needed.

Also, as suggested previously, the performance of a multi-camera capture device, relative to both the opto-mechanics and image quality, can be affected by both internal or external environmental factors. Each of the image sensors 270, and the entirety of the sensor package 265, with the data interface and power support electronics can be localized heat sources. To reduce the thermal impact on the camera lenses, and the images they provide, the mechanical design for an improved multi-camera capture device 300 can isolate the sensors 270 thermally from the lens opto-mechanics. To further help reduce thermal gradients between the sensors and their electronics, and the optics, micro-heat pipes or Peltier devices can be used to cool the sensors and re-direct the heat. The heat can be removed from the overall device by either active or passive cooling provided through the electro-mechanical interface in the twelfth camera position, shown in FIG. 15. This cooling can be provided by convection or conduction (including liquid cooling) or a combination thereof.

As also suggested previously, outside ambient or environmental factors can also affect performance of a multi-camera capture device. These factors can include the effects of the illuminating ambient light, or thermal extremes or changes in the environment. For example, as sun light is typically highly directional, a scenario with outdoor image capture can result in the cameras on one side of the device being brightly illuminated, while the other cameras seeing plenoptic illumination from the scene are in shadows. In such instances, the captured images can show dramatic exposure variations, which can then be modified by exposure correction, which can be provided locally (see FIG. 15). In an improved multi-camera capture device 300, light from an optical fiducial 475 can also be used for exposure correction of captured images. Light or pixel signals from a portion of the peripheral image region, between the edges of the core FOV 205 and the extended FOV 215, can also be used for exposure correction, prior to the image being cropped down to the size of the real current core FOV 205. It is also noted that as extended FOV 215 of a first camera can overlap at least in part with an extended FOV 215 of an adjacent camera, that light level and color comparisons can be made for content or signals that are simultaneously captured by both cameras. The signals or pixel data from these overlapping regions can be used to determine exposure variations between the two cameras, by having a common reference point (e.g., a matched feature point—using SIFT, SURF or a similar algorithm for finding common feature points in the overlap region).

It is noted that the peripheral image or exposure data can also be retained for use in later post image processing. Additionally, exposure correction can also be enabled by imbedding optical detectors in the seams 400, or vertices, between outer lens elements 437. These abrupt exposure differences can also cause spatial and temporal differences in the thermal loading of some image sensors 270, as compared to others, within a multi-camera capture device 300. The previously discussed sensor cooling, whether enabled by heat pipes, heat sinks, liquid cooling, or other means, can be designed to account for such differences. The performance can be validated by finite element analysis (FEA).

Alternately, one or more camera systems can be protected by the attachment of a shield or mask to cover the polygonal shape, from seam to seam, and vertex to vertex, of the outer lens element thereof. Such shields can be provided to cover a single camera lens system, or multiple systems. These shields can be shaped to generally conform to the outer surface shape of the outer lens elements, and they can be used to prevent saturated exposure or overexposure from bright directional light (e.g., solar), or to prevent contamination from a localized directional environmental source. While these caps are nominally detachable, for some user applications, they may remain in use for a prolonged time period. Overly bright exposure, from the sun or other light sources can also be controlled with an image sensor having electronic shuttering or drains, or a physical shutter or an electro-optical neutral density, photochromic, or electrochromic filter, that can, for example be designed into a camera 320, within for example the grouping of inner lens elements 440. Signals to initiate or control electronic or secondary shuttering can be obtained from the image sensor or from other internal or external optical detectors. As another robustness improvement, one or more camera channels can use dichroic color filter arrays integrated into the image sensor package instead of the standard dye-based CFAs.

Environmental influences can also cause a multi-camera capture device to be heated or cooled asymmetrically. The previously discussed nominally kinematic mounting or linkage of adjacent camera housings 430 (see FIGS. 9-10 and FIGS. 17-18) for an improved multi-camera capture device 300 can help reduce this impact, by trying to deflect or average mechanical stresses and limit mechanical displacements. However, it can be additionally beneficial to provide channels or materials to communicate or shift an asymmetrical thermal load to be shared more evenly between or by cameras 320 and their housings 430. With respect to FIG. 9, this can mean that the spaces around the lens housing 430 and the channel centering hub 330, such as the inner volume 390, can be at least partially filled with compliant but high thermal contact, thermally conductive materials (e.g., Sil-Pad (from Henkel Corporation) or CoolTherm (Lord Corporation, Cary NC)) to help spatially average an asymmetrical thermal load or difference. Alternately, or additionally, thermal conductive straps or tapes, such as an adhesive tape in the 88xx series from 3M (St. Paul, MN) can be used. However, at the same time, some of the effect of thermal changes, relative to the imaging performance of the camera lenses 320, can be mitigated by both judicious selection of optical glasses and athermal mounting of the optical elements within the lens housing 430. Taken in combination, an effective design approach can be to enable thermal communication or crosstalk between lenses 320 and their housings 430 to environmental influences, but to simultaneously isolate the lenses and housings from the sensors 270 and their electronics.

An improved camera 320 for use in an improved multi-camera image capture device 300 can also use a tunable lens element to correct for thermally or mechanically induced focus changes (e.g., defocus). This tunable lens can preferentially be located amongst the inner lens elements 440, and can be a liquid crystal or elastic polymer type device, such as an electrically actuated focus tunable lens from Optotune (Dietikon, SW).

The emphasis has been on developing improved cameras 320, that have a polygonal shaped outer lens element and capture and image light from a polygonal FOV, for use in an improved multi-camera image capture device 300. Multiple such adjacent cameras can be used in a nominally spherical device or hemispherical device. However, devices 300 can be developed that have a yet smaller number of cameras and that cover a yet smaller total FOV. For example, systems with only four or six low-parallax, adjacent polygonal cameras can be suitable for some market applications. Additionally, a single camera having a polygonal shaped outer lens element that captures image light with reduced parallax or perspective error, from a nominally matching polygonal shaped FOV can be use in isolation, such as for security or surveillance applications. For example, a single camera, optomechanically designed to fit within the form of $\frac{1}{8}^{th}$ of an octahedron can be mounted in a ceiling corner of a room, and capture image content of the room environment with little or no blind regions. Likewise, the emphasis has been on the development of improved camera lens systems 320 for which parallax errors can be reduced within at least a core FOV 205, while modest extended FOVs 215 (e.g., ≤5% extra) and image capture overlap with adjacent cameras can also be provided. Similarly, it is noted that the present approach can be extended to support possible applications having yet larger overlapping FOVs (e.g., 10-25% extra, or ≈4-10° extra FOV for dodecahedral systems with a nominal Core FOV of 37.45°) of image capture between adjacent cameras, and simultaneous parallax error or perspective error control within at least a core FOV. The camera designs can be extended even further, to provide yet larger overlapping FOVs (e.g., 10-20° extra), but without benefit of reduce parallax for angles much beyond the designed core FOV.

As noted previously, the present approach can be used to design low parallax lens systems for a variety of applications. A method of device development can be outlined, for example, as follows:

1. Define for a customer or an application space, a polygonal device configuration, a resolution, an expected extent of the seams and blind regions, and a minimum object distance. The minimum object distance is the closest distance at which instant image stitching or image combining of low parallax overlapped images can be applied if image processing is acceptable. At this distance, estimate a maximum total gap or seam width for which the image losses or differences are generally imperceptible to a human viewer. For example, for an 8k equirectangular projected image, an expected image loss of $\frac{1}{40}$th % of the output image (along the equator) equates to seams that are 2 pixels wide each. An alternate minimum object distance, for which even modest image processing is not acceptable, and which is further away, can be defined.

2. Design the imaging lenses, while controlling parallax and front color. The design can be further modified to provide an extra or extended FOV in which the parallax can be controlled. This extra FOV can provide margin for the rainbow tinting of the residual front color to be located outside of the Core FOV with some margin.

3. Design the lens and device opto-mechanics. Determine an expected seam width and the expected thickness and wedge variations between and within the seams, from fabrication and assembly tolerance variations. Determine an expected extended FOV overlap to cover the expected mechanical and optical seam widths to be as high or greater than the maximum expected opto-mechanical wedge and thickness variations so that parallel chief rays between adjacent lens systems can be selected without underlap (fields of view that diverge).

4. Update the lens design to provide field of view overlap along the seams between the outer compressor lens elements, to exceed both the maximum expected mechanical variations and residual front color, while controlling parallax therein.

In conclusion, aspects of this disclosure provide improved panoramic multi-camera capture devices having low parallax cameras in which the opto-mechanics synergistically enable image capture by the cameras. An intervening mechanical seam between two adjacent cameras can have a real width and thus impact the ray splitting or the extent of blind regions and number of lost pixels or the value of having an extended FOV. The present application provides several means, structures, and configurations to provide robust and controlled alignment of multiple adjacent cameras within a panoramic device, in part so that the seams can be reliably reduced in width.

In order to push chief rays to the edge of a polygonal surface, aberrations of the entrance pupil, and particularly spherical aberration and axial chromatic aberration of the pupil, should be optimized or reduced. For context, the entrance pupil and exit pupil, which are projected images of the aperture stop in object space and image space respectively, are usually academic curiosities, representing the virtual images of the aperture stop that a person can see when looking into a lens.

In a typical optical system, to provide good image quality, aberrations matter at an image plane, with the typical goal to have small net sums of the individual surface contributions, even though values at individual internal surfaces, whether positive or negative, can be magnitudes larger. Whereas, aberrations at the aperture stop often do not matter much, other than positioning the stop correctly and defining the lens system f-number while minimizing clipping or vignetting of the ray bundles versus field. It is noted that if an object was located at the aperture stop, pupil aberrations would affect the apparent image quality of the image of that object as seen by the person viewing the entrance or exit pupil, although these pupil aberrations are not necessarily representative of the image quality at the image plane.

In low-parallax lenses, on the other hand, pupil aberrations, and particularly entrance pupil aberrations, matter. First, to begin to properly design the lens to control parallax, the entrance pupil must be positioned behind the image plane. Secondly, the aiming of peripheral chief rays from the outer compressor lens element, and towards the low parallax volume, must be controlled. As noted previously, optimizing spherical aberration of the entrance pupil can be an effective way to limit parallax errors. In that context, modest over-corrected or under-corrected optimizing spherical aberration of the entrance pupil can occur, meaning that the non-paraxial chief ray NP points can lead or follow the paraxial NP point respectively. Additionally, axial chromatic aberration of the entrance pupil creates color differences that can affect optimization of spherical aberration of the entrance pupil. Front color, which can be considered to be an artifact of this axial chromatic aberration, and the axial chromatic aberration itself, can be reduced by judicious choice and use of high and low dispersion optical materials within the lens design. Although optimization of the spherical aberration of the entrance pupil or chief ray pointing provides fine control for the non-paraxial, chief ray NP point position and parallax reduction, distortion from the compressor lens group also has an increasing influence, versus increasing field, on the projected chief ray pointing towards a location behind the lens and towards the low parallax volume. The magnitude and characteristics of the distortion, which also defines the chief ray height on the outer surface of the outer compressor lens element, can be significantly determined by the use of aspheric surfaces within the compressor lens group.

Although this discussion has emphasized the design of improved multi-camera image capture devices 300 for use in broadband visible light, or human perceivable applications, these devices can also be designed for narrowband visible applications (modified using spectral filters, ultraviolet (UV), or infrared (IR) optical imaging applications). Polarizers or polarizer arrays can also be used. Additionally, although the imaging cameras 320 have been described as using all refractive designs, the optical designs can also be reflective, or catadioptric and use a combination of refractive and reflective optical elements.

What is claimed is:

1. An imaging device comprising:
a first imaging lens comprising:
a first outer lens element having a polygonal shape comprising a plurality of first sides, and
a first datum feature on a first side of the plurality of first sides;
a second imaging lens comprising:
a second outer lens element having a polygonal shape comprising a plurality of second sides, and
a second datum feature on a second side of the plurality of second sides,
wherein the first datum feature and the second datum feature maintain a spacing between the first side and the second side,
wherein:
the first imaging lens images a first field of view comprising a first nominal field of view and a first extended field of view larger than the first nominal field of view;
the second imaging lens images a second field of view comprising a second nominal field of view and a second extended field of view larger than the second nominal field of view;
the first extended field of view and the second extended field of view overlap at a seam between the first imaging lens and the second imaging lens; and
a residual parallax error within the overlap of the first extended field of view and the second extended field of view is two pixels or less.

2. The imaging device of claim 1, wherein the first datum feature contacts the second datum feature.

3. The imaging device of claim 1, wherein the first datum feature comprises one or more first convexly curved protrusions and the second datum feature comprises one or more second convexly curved protrusions.

4. The imaging device of claim 1, further comprising:
a first housing coupled to the first imaging lens;
a second housing coupled to the second imaging lens; and
a mounting structure located proximate to the center of the imaging device,
wherein the first housing and the second housing are coupled to the mounting structure.

5. The imaging device of claim 4, wherein:
the mounting structure comprises a convex outer surface,
the first housing comprises a first concave surface receiving a first portion of the convex outer surface of the mounting structure, and
the second housing comprises a second concave surface receiving a second portion of the convex outer surface of the mounting structure.

6. The imaging device of claim 4, wherein the mounting structure comprises a plurality of concave portions formed in an outer surface, the first housing comprises a first convex outer surface received in a first concave portion of the plurality of concave portions, and the second housing comprises a second convex outer surface received in a second concave portion of the plurality of concave portions.

7. The imaging device of claim 4, further comprising a first locking feature for retaining the first housing relative to the mounting structure and a second locking feature for retaining the second housing relative to the mounting structure.

8. The imaging device of claim 7, wherein at least one of the first locking feature or the second locking feature includes at least one of a spring, a latch, or a cable.

9. The imaging device of claim 4, wherein the mounting structure comprises an internal frame having a polygonal shape that nominally matches a polygonal shape of the imaging device, with polygonal faces nominally matching the polygonal shapes of the first outer lens element and the second outer lens element.

10. The imaging device of claim 1, wherein:
first projections of first non-paraxial chief rays included in incident light that enters the first outer lens element converge in a first low parallax volume;
second projections of second non-paraxial chief rays included in incident light that enters the second outer lens element converge in a second low parallax volume; and
the first and second low parallax volumes at least partially overlap.

11. The imaging device of claim 10, wherein a first non-paraxial point associated with the first imaging lens and a second non-paraxial point associated with the second imaging lens are nominally coincident with a center of the imaging device.

12. The imaging device of claim 1, further comprising:
an optical fiducial for at least one of tracking a first image centroid at a first image plane of the first imaging lens, tracking a second image centroid at a second image plane of the second imaging lens, or exposure correction.

13. The imaging device of claim 1, further comprising:
an optically transparent dome defining an interior volume, the first imaging lens and the second imaging lens being disposed in the interior volume.

14. A low-parallax imaging device comprising:
a first camera configured to image a first polygonal field of view, the first camera comprising a first housing and a first outer lens having a plurality of first sides defining a first polygonal periphery, wherein the first camera converges a first projection of incident non-paraxial chief rays to a first non-paraxial point within a first low-parallax volume;
a second camera configured to image a second polygonal field of view, the second camera comprising a second housing and a second outer lens having a plurality of second sides defining a second polygonal periphery, a second side of the plurality of second sides contacting a first side of the plurality of first sides at a seam between the first camera and the second camera, wherein the second camera converges a second projection of incident non-paraxial chief rays to a second non-paraxial point within a second low-parallax volume; and
a mounting structure proximate to a center of the imaging device, the mounting structure configured to position the first housing relative to the second housing such that the first low-parallax volume at least partially overlaps the second low-parallax volume,
wherein:
the first outer lens images a first field of view comprising a first nominal field of view and a first extended field of view larger than the first nominal field of view;
the second outer lens images a second field of view comprising a second nominal field of view and a second extended field of view larger than the second nominal field of view;
the first extended field of view and the second extended field of view overlap at a seam between the first outer lens and the second outer lens; and
a residual parallax error within the overlap of the first extended field of view and the second extended field of view is two pixels or less.

15. The low-parallax imaging device of claim 14, wherein the mounting structure comprises a first surface for contacting the first housing and a second surface for contacting the second housing.

16. The low-parallax imaging device of claim 14, wherein the mounting structure defines a hollow center.

17. The low-parallax imaging device of claim 14, wherein the first camera includes a first datum feature on a first side of the plurality of first sides that contacts a second datum feature on a second side of the plurality of second sides.

18. The low-parallax imaging device of claim 14, wherein the mounting structure comprises a channel centering hub with sockets and the first camera housing and the second camera housing have a ball feature that mate with the sockets.

19. The low-parallax imaging device of claim 14, wherein the mounting structure comprises a ball shaped central hub with socket features and the each of the first and second camera housing have a concave socket feature that respectively mates with the ball shaped central hub.

20. An imaging device comprising:
a first imaging lens comprising:
a first outer lens element having a polygonal shape comprising a plurality of first sides, and
a first datum feature on a first side of the plurality of first sides;
a second imaging lens comprising:
a second outer lens element having a polygonal shape comprising a plurality of second sides, and
a second datum feature on a second side of the plurality of second sides,
wherein the first datum feature and the second datum feature maintain a spacing between the first side and the second side,
further comprising:
a first housing coupled to the first imaging lens;
a second housing coupled to the second imaging lens; and
a mounting structure located proximate to the center of the imaging device,
wherein the first housing and the second housing are coupled to the mounting structure,
wherein the mounting structure comprises an internal frame having a polygonal shape that nominally matches a polygonal shape of the imaging device, with polygonal faces nominally matching the polygonal shapes of the first outer lens element and the second outer lens element.

* * * * *